United States Patent
Kaneko et al.

(10) Patent No.: US 7,795,347 B2
(45) Date of Patent: Sep. 14, 2010

(54) MULTI-BRANCHED POLYMER, PROCESS FOR PRODUCING THE SAME, AND APPLICATIONS THEREOF

(75) Inventors: Hideyuki Kaneko, Sodegaura (JP); Tomoaki Matsugi, Sodegaura (JP); Shin-Ichi Kojoh, Sodegaura (JP); Shingo Matsuo, Sodegaura (JP); Nobuo Kawahara, Sodegaura (JP); Norio Kashiwa, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/797,144

(22) Filed: Mar. 11, 2004

(65) Prior Publication Data

US 2004/0220346 A1 Nov. 4, 2004

(30) Foreign Application Priority Data

| Mar. 14, 2003 | (JP) | ............................. 2003-069463 |
| Mar. 14, 2003 | (JP) | ............................. 2003-069464 |
| Mar. 14, 2003 | (JP) | ............................. 2003-069465 |
| Mar. 14, 2003 | (JP) | ............................. 2003-069466 |
| Mar. 14, 2003 | (JP) | ............................. 2003-069467 |
| Mar. 14, 2003 | (JP) | ............................. 2003-069468 |

(51) Int. Cl.
- C08F 10/00 (2006.01)
- C08F 255/00 (2006.01)
- C08F 293/00 (2006.01)
- C08F 295/00 (2006.01)

(52) U.S. Cl. .................. 525/100; 525/178; 525/284; 525/298; 525/299; 525/342; 525/404; 525/419; 525/450

(58) Field of Classification Search ............... 525/299, 525/100, 178, 284, 298, 342, 404, 419, 450
See application file for complete search history.

(56) References Cited

U.S. PATENT DOCUMENTS

| 2,699,457 | A | * | 1/1955 | Ziegler et al. ................ 585/518 |
| 4,292,414 | A | * | 9/1981 | Saito et al. .................. 525/255 |
| 5,030,695 | A | | 7/1991 | Cozewith et al. |
| 5,104,952 | A | | 4/1992 | Babu |
| 5,192,616 | A | | 3/1993 | Babu |
| 5,278,244 | A | | 1/1994 | Babu |
| 5,286,800 | A | | 2/1994 | Chung et al. |
| 5,625,005 | A | | 4/1997 | Mallya et al. |
| 5,807,937 | A | | 9/1998 | Matyjaszewski et al. |
| 5,900,464 | A | | 5/1999 | Letchford et al. |
| 5,939,495 | A | | 8/1999 | Kioka et al. |
| 5,955,557 | A | | 9/1999 | Machida et al. |
| 6,162,866 | A | * | 12/2000 | Wunsch et al. ................ 525/68 |
| 6,169,154 | B1 | | 1/2001 | Machida et al. |
| 6,197,883 | B1 | | 3/2001 | Schimmel et al. |
| 6,288,173 | B1 | | 9/2001 | Schimmel et al. |
| 6,437,070 | B1 | | 8/2002 | Parker et al. |
| 6,552,147 | B2 | | 4/2003 | Parker et al. |
| 6,555,641 | B2 | | 4/2003 | Parker et al. |
| 6,759,454 | B2 | * | 7/2004 | Stephens et al. .............. 524/68 |
| 2002/0156207 | A1 | | 10/2002 | Imuta et al. |
| 2002/0183473 | A1 | * | 12/2002 | Matyjaszewski et al. ..... 526/335 |
| 2003/0023002 | A1 | | 1/2003 | Kojoh et al. |
| 2003/0055179 | A1 | | 3/2003 | Ota et al. |
| 2003/0055189 | A1 | | 3/2003 | Parker et al. |
| 2003/0055190 | A1 | | 3/2003 | Parker et al. |
| 2003/0120003 | A1 | | 6/2003 | Kashiwa et al. |
| 2003/0204022 | A1 | * | 10/2003 | Kennedy et al. ............. 525/242 |
| 2003/0236354 | A1 | * | 12/2003 | Kennedy et al. ............. 525/242 |

FOREIGN PATENT DOCUMENTS

| CN | 1073950 A | 7/1993 |
| DE | 4328004 A | 2/1995 |
| EP | 0 295 026 A2 | 12/1988 |
| EP | 0 856 542 A1 | 5/1998 |
| EP | 0 864 593 A1 | 9/1998 |
| EP | 1 396 504 A2 | 3/2004 |
| EP | 1 408 058 A1 | 4/2004 |
| JP | 47-018656 | 5/1972 |
| JP | 58-217505 A | 12/1983 |
| JP | 63-502286 A | 9/1988 |
| JP | 04-013747 A | 1/1992 |

(Continued)

OTHER PUBLICATIONS

Cossee, Stereoregularity in heterogeneous Ziegler-Natta catalysis, Koninklijke/Shell Lab., Amsterdam, Transactions of the Faraday Society (1962), 58, 1226-32.*

(Continued)

*Primary Examiner*—Jeffrey C Mullis
(74) *Attorney, Agent, or Firm*—Birch, Stewart, Kolasch & Birch, LLP

(57) ABSTRACT

A group of polymers comprising a plurality of polyolefin chains and polar polymer chains and having a multi-branched structure such as a block structure, a graft structure and a star-shaped structure is produced efficiently by polymerizing or reacting a combination of various polar monomers and their polymers i.e. polar polymer chains by using a functional group-containing polyolefin as a macroinitiator, a macromonomer or a reactive polymer. The resulting multi-branched polymer has a specific shape such as a block structure, a graft structure or a star-shaped structure, and has properties of both the polyolefin and polar polymer, thus exhibiting useful performance in various uses in films and compatibilizing agents as a novel polyolefin-based polymer.

8 Claims, 16 Drawing Sheets

FOREIGN PATENT DOCUMENTS

| | | |
|---|---|---|
| JP | 05-295056 A | 11/1993 |
| JP | 6-505035 A | 6/1994 |
| JP | 06-329720 A | 11/1994 |
| JP | 7-316225 A | 12/1995 |
| JP | 8-109218 A | 4/1996 |
| JP | 10-182766 A | 7/1998 |
| JP | 11-293144 A | 10/1999 |
| JP | 2000-103823 A | 4/2000 |
| JP | 2004-091640 A | 3/2004 |
| JP | 2004-300411 | 3/2004 |
| JP | 2004-099907 A | 4/2004 |
| JP | 2004-277533 A | 10/2004 |
| WO | WO-86/03755 A1 | 7/1986 |
| WO | WO-95/11931 A1 | 5/1995 |

OTHER PUBLICATIONS

Roha et al., STN AN 1961:79,666 (1961).*

Roha, M.; Kreider, L. C.; Frederick, M. R.; Beears, W. L. CS B. F. Goodrich Research Center, Brecksville, OH Journal of Polymer Science (1959), 38, 51-61.*

Imuta, Jun-ichi et al., Journal of American Chemical Society, vol. 124, No. 7, (2002) pp. 1176-1177.

Toyota, Akinori et al., Polymer, vol. 43 (2002); pp. 6351-6355.

Abstract of Japanese Patent Laid-Open Publication (Kokai) No. JP-63-305104; Dec. 13, 1998.

Abstract of Japanese Patent Laid-Open Publication (Kokai) No. JP-10-316711; Dec. 2, 1998.

Machine English translation of JP-7-316225-A which was published Dec. 5, 1995.

Machine English translation of JP 05-295056 A, published Nov. 9, 1993.

Machine English translation of JP 10-182766 A, published Jul. 7, 1998.

* cited by examiner

MULTI-BRANCHED POLYMER, PROCESS FOR PRODUCING THE SAME, AND APPLICATIONS THEREOF

This Nonprovisional application claims priority under 35 U.S.C. §119(a) on Patent Application No(s). 2003-069467; 2003-069468; 2003-069466; 2003-069465; 2003-069464 and 2003-069463 filed in JAPAN on Mar. 14, 2003, the entire contents of which are hereby incorporated by reference.

TECHNICAL FIELD

The present invention relates to a multi-branched polymer, a process for producing the same, and uses thereof.

BACKGROUND ART

Polyolefins such as polyethylene (PE) and polypropylene (PP) are light-weight and inexpensive, and have excellent physical properties and processability, and are thus used in various fields such as food packages, clothes/cosmetics/medical containers, automobile parts, communication/electrical instrument parts, civil engineering/building materials, agricultural materials and medical instruments, and occupy a very important position as general-purpose resin. In recent years, however, demand for physical properties of polyolefins has been diversified, and there is a need for polyolefins having properties absent in existing polyolefins, for example polyolefins excellent in heat resistance, polyolefins having a soft feel similar to that of soft polyvinyl chloride and polyolefins endowed with high functions such as printability, coating properties, adhesiveness and compatibility with other polar polymers.

The method of improving the physical properties of the polyolefin to confer high functions includes not only a method that involves regulating the type and molar ratio of monomers and a method that involves changing a random or block monomer sequence, but also a method of copolymerizing a polar monomer such as vinyl acetate or methacrylate with an olefin by radical polymerization and a method of copolymerizing a polar monomer such as maleic anhydride with polyolefin in the presence of a peroxide. In these methods, however, it is difficult to accurately regulate the structure of the polyolefin moiety in the resulting polymer, and there is a limit to the amount and type of the polar monomer introduced.

The known method of conferring the original excellent performance of the polyolefin by incorporation of a polyolefin component having an accurately regulated structure and simultaneously giving functions to the polyolefin by incorporation of a polar polymer component includes a method of coupling reaction of a functional group-containing polyolefin with a polar polymer and a method of producing a block or graft polymer having a polyolefin and a polar polymer bound chemically thereto by using a functional group-containing polyolefin as a macroinitiator or a macromonomer. However, these known methods are limited to block or graft polymers having one kind of polyolefin and one kind of polar polymer bound chemically thereto, and are thus insufficient to confer various physical properties and functions by combining a plurality of polyolefins and a plurality of polar polymers.

Further, it can be expected to produce the production of multi-branched polymers having various structures such as a block structure, a graft structure and a star-shaped structure by combining a plurality of polymer chains, but there are not known techniques of accurately regulating a structure containing both a polyolefin component and a polar polymer component.

Under these circumstances, the present inventors made extensive study for developing polymers which are excellent in productivity, contain a plurality of polyolefin components consisting of various α-olefin homopolymers or copolymers or a plurality of polar polymer components consisting of various polar monomer homopolymers or copolymers in one molecule, and can cover a broad molecular-weight range, and as a result, they found that a macroinitiator, a macromonomer and a reactive polymer, which are obtained by introducing functional groups into polyolefin, can be combined with polar monomers or their various polymers i.e. polar polymers and polymerized or reacted with one another to give a novel multi-branched polymer having a block structure/graft structure/star-shaped structure whose polymer structure is three-dimensionally regulated, and the present invention was thereby completed.

DISCLOSURE OF INVENTION

Hereinafter, the multi-branched polymer of the present invention, the process for producing the same, and applications thereof are described.

The multi-branched polymer according to the present invention is a polymer containing a block structure, a graft structure or a star-shaped structure, which is represented by the following general formula (I):

$$(P^1)_n-X \qquad (I)$$

wherein n is an integer of 2 or more; $P^1$ is a polymer chain having a number-average molecular weight (Mn) of 500 to 1,000,000, selected from a polyolefin chain (A1), a polyolefin chain having polar polymer side chains (A2), a polar polymer chain (A3) and a polar polymer chain having polyolefin side chains (A4); a plurality of $P^1$s may be the same or different provided that every $P^1$ is not the polar polymer chain (A3); when n is 2, at least one $P^1$ is the polar polymer chain having polyolefin side chains (A4); and X is a heteroatom or a heteroatom-containing linking group containing less than 200 atoms in total.

The first preferable multi-branched polymer according to the present invention is a polymer containing a block structure or a graft structure represented by the following general formula (II):

$$(P^2)(P^3)-X^1 \qquad (II)$$

wherein $P^2$ is a polar polymer chain having polyolefin side chains (A4) having a number-average molecular weight (Mn) of 500 to 1,000,000, and $P^3$ is a polymer chain having a number-average molecular weight (Mn) of 500 to 1,000,000, selected from a polyolefin chain (A1), a polyolefin chain having polar polymer side chains (A2), a polar polymer chain (A3) and a polar polymer chain having polyolefin side chains (A4); $P^2$ and $P^3$ may be the same or different; $X^1$ is a linking group containing less than 200 atoms in total containing a group selected from an ester group, an amide group and an ether group.

The second preferable multi-branched polymer according to the present invention is a polymer containing a star-shaped structure having three polymer chains bound to a central nucleus represented by the following general formula (III):

$$(P^4)(P^5)_2-X^2 \qquad (III)$$

wherein $P^4$ is a polyolefin chain (A1) having a number-average molecular weight (Mn) of 500 to 1,000,000; $P^5$ is a polymer chain having a number-average molecular weight (Mn) of 500 to 1,000,000, selected from a polyolefin chain (A1), a polar polymer chain (A3) and a polar polymer chain having polyolefin side chains (A4); three polymer chains represented by $P^4$ and two $P^5$ may be the same or different; $X^2$ is a linking group containing less than 200 atoms in total containing two groups selected from an ether group and an ester group.

The third preferable multi-branched polymer according to the present invention is a polymer containing a star-shaped structure having three or more polymer chains bound to a central nucleus represented by the following general formula (IV):

$$(P^6)_{n'}—X^3 \qquad (IV)$$

wherein n' is an integer of 3 or more; $P^6$ is a polymer chain having a number-average molecular weight (Mn) of 500 to 1,000,000, selected from a polyolefin chain (A1), a polar polymer chain (A3) and a polar polymer chain having polyolefin side chains (A4); a plurality of $P^6$s may be the same or different provided that every $P^6$ is not the polar polymer chain (A3); and $X^3$ is a linking group of less than 200 atoms consisting of a multifunctional low-molecular compound residue derived from a multifunctional low-molecular compound having three or more atoms or groups selected from a halogen atom, a hydroxyl group, a carboxyl group, an acid halide group, an amino group, an epoxy group and an isocyanato group.

The polar polymer chain having polyolefin side chains (A4), contained in the multi-branched polymer according to the present invention, is obtained by homopolymerizing a macromonomer, or copolymerizing two or more macromonomers, selected from a polyolefin macromonomer (M1) represented by the general formula (V), a polyolefin macromonomer (M2) represented by the general formula (VI) and a polyolefin macromonomer (M3) represented by the general formula (VII), or by copolymerizing at least one macromonomer selected from (M1), (M2) and (M3) with at least one monomer (B) selected from organic compounds each having at least one carbon-carbon unsaturated bond.

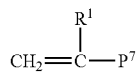

(V)

(VI)

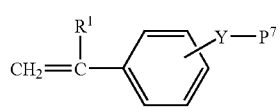

(VII)

wherein $R^1$ is a hydrogen atom or a methyl group, Y is a heteroatom or a heteroatom-containing group, and $P^7$ is a polymer chain obtained by homopolymerizing or copolymerizing an olefin represented by $CH_2=CHR^2$ whereupon $R^2$ is a group or an atom selected from a $C_{1-20}$ hydrocarbon group, a hydrogen atom and a halogen atom.

The polyolefin chain (A1) contained in the multi-branched polymer according to the present invention is a polymer chain obtained by homopolymerizing or copolymerizing an olefin represented by $CH_2=CHR^3$ whereupon $R^3$ is a group or an atom selected from a $C_{1-20}$ hydrocarbon group, a hydrogen atom and a halogen atom.

The polyolefin chain having polar polymer side chains (A2) contained in the multi-branched polymer according to the present invention comprises a unit (C1) represented by the general formula (VIII) and a unit (C2) represented by the general formula (IX):

wherein $R^4$ is a group or an atom selected from a $C_{1-20}$ hydrocarbon group, a hydrogen atom and a halogen atom, $R^5$ is a $C_{1-20}$ hydrocarbon group, Z is a heteroatom or a heteroatom-containing group, and W is a polymer chain obtained by (co)polymerizing an addition-polymerizable monomer (D), a ring-opening polymerizable monomer (E) and at least one monomer selected from polyolefin macromonomers (M1) to (M3) represented by the general formulae (V) to (VII).

The polar polymer chain (A3) contained in the multi-branched polymer according to the present invention is obtained by polymerizing an addition-polymerizable monomer (D) or a ring-opening polymerizable monomer (E).

The thermoplastic resin composition according to the present invention comprises the above-described multi-branched polymer, and is employed in various applications.

Further, the present invention relates to a film, a sheet, an adhesive resin, a compatibilizing agent, a resin modifier, a resin additive, a filler dispersant or a dispersant, which comprises the above-described multi-branched polymer.

Further, the present invention relates to a film, a sheet, an adhesive resin, a compatibilizing agent, a resin modifier, a resin additive, a filler dispersant or a dispersant, which comprises the above-described thermoplastic resin composition.

wherein $R^4$ is a group or an atom selected from a $C_{1-20}$ hydrocarbon group, a hydrogen atom and a halogen atom, $R^5$ is a $C_{1-20}$ hydrocarbon group, Z is a heteroatom or a heteroatom-containing group, and W is a polymer chain obtained by (co)polymerizing an addition-polymerizable monomer (D), a ring-opening polymerizable monomer (E) and at least one monomer selected from polyolefin macromonomers (M1) to (M3) represented by the general formulae (V) to (VII).

The polar polymer chain (A3) contained in the multi-branched polymer according to the present invention is obtained by polymerizing an addition-polymerizable monomer (D) or a ring-opening polymerizable monomer (E).

The thermoplastic resin composition according to the present invention comprises the above-described multi-branched polymer, and is employed in various applications.

Further, the present invention relates to a film, a sheet, an adhesive resin, a compatibilizing agent, a resin modifier, a resin additive, a filler dispersant or a dispersant, which comprises the above-described multi-branched polymer.

Further, the present invention relates to a film, a sheet, an adhesive resin, a compatibilizing agent, a resin modifier, a resin additive, a filler dispersant or a dispersant, which comprises the above-described thermoplastic resin composition.

BRIEF DESCRIPTION OF DRAWINGS

FIG. 1-2 shows the multi-branched polymer of the general formula (II) wherein $P^2$ is the polar polymer chain having polyolefin side chains (A4), and $P^3$ is the polyolefin chain having polar polymer side chains (A2).

FIG. 1-3 shows the multi-branched polymer of the general formula (II) wherein $P^2$ is the polar polymer chain having polyolefin side chains (A4), and $P^3$ is the polar polymer chain (A3).

FIG. 1-4 shows the multi-branched polymer of the general formula (II) wherein $P^2$ is the polar polymer chain having polyolefin side chains (A4), and $P^3$ is the polar polymer chain having polyolefin side chains (A4).

FIG. 2-1 shows the multi-branched polymer of the general formula (III) wherein two $P^5$s are each the polyolefin chain (A1).

FIG. 2-2 shows the multi-branched polymer of the general formula (III) wherein two $P^5$s are each the polar polymer chain (A3).

FIG. 2-3 shows the multi-branched polymer of the general formula (III) wherein two $P^5$s are each the polar polymer chain having polyolefin side chains (A4).

FIG. 2-4 shows the multi-branched polymer of the general formula (III) wherein one of two $P^5$s is the polyolefin chain (A1), and the other is the polar polymer chain (A3).

FIG. 2-5 shows the multi-branched polymer of the general formula (III) wherein one of two $P^5$s is the polyolefin chain (A1), and the other is the polar polymer chain having polyolefin side chains (A4).

FIG. 2-6 shows the multi-branched polymer of the general formula (III) wherein one of two $P^5$s is the polar polymer chain (A3), and the other is the polar polymer chain having polyolefin side chains (A4).

FIG. 3-1 shows the multi-branched polymer of the general formula (IV) wherein n' is 3, and all of three $P^6$s are each the polyolefin chain (A1).

FIG. 3-2 shows the multi-branched polymer of the general formula (IV) wherein n' is 3, and all of three $P^6$s are each the polar polymer chain having polyolefin side chains (A4).

FIG. 3-3 shows the multi-branched polymer of the general formula (IV) wherein n' is 3, and two of three $P^6$s are each the polyolefin chain (A1), and the remainder is the polar polymer chain (A3).

FIG. 3-4 shows the multi-branched polymer of the general formula (IV) wherein n' is 3, and two of three $P^6$s are each the polyolefin chain (A1), and the remainder is the polar polymer chain having polyolefin side chains (A4).

FIG. 3-5 shows the multi-branched polymer of the general formula (IV) wherein n' is 3, and two of three $P^6$s are each the polar polymer chain (A3), and the remainder is the polyolefin chain (A1).

FIG. 3-6 shows the multi-branched polymer of the general formula (IV) wherein n' is 3, and two of three $P^6$s are each the polar polymer chain (A3), and the remainder is the polar polymer chain having polyolefin side chains (A4).

FIG. 3-7 shows the multi-branched polymer of the general formula (IV) wherein n' is 3, and two of three $P^6$s are each the polar polymer chain having polyolefin side chains (A4), and the remainder is the polyolefin chain (A1).

FIG. 3-8 shows the multi-branched polymer of the general formula (IV) wherein n' is 3, and two of three $P^6$s are each the polar polymer chain having polyolefin side chains (A4), and the remainder is the polar polymer chain (A3).

FIG. 3-9 shows the multi-branched polymer of the general formula (IV) wherein n' is 3, and one of three $P^6$s is the polyolefin chain (A1), another one is the polar polymer chain (A3), and the last one is the polar polymer chain having polyolefin side chains (A4).

FIG. 3-10 shows the multi-branched polymer of the general formula (IV) wherein n' is 4, and all of four $P^6$s are each the polyolefin chain (A1).

FIG. 3-11 shows the multi-branched polymer of the general formula (IV) wherein n' is 4, and all of four $P^6$s are each the polar polymer chain having polyolefin side chains (A4).

FIG. 3-12 shows the multi-branched polymer of the general formula (IV) wherein n' is 4, and three of four $P^6$s are each the polyolefin chain (A1), and the remainder is the polar polymer chain (A3).

FIG. 3-13 shows the multi-branched polymer of the general formula (IV) wherein n' is 4, and three of four $P^6$s are each the polyolefin chain (A1), and the remainder is the polar polymer chain having polyolefin side chains (A4).

FIG. 3-14 shows the multi-branched polymer of the general formula (IV) wherein n' is 4, and three of four $P^6$s are each the polar polymer chain (A3), and the remainder is the polyolefin chain (A1).

FIG. 3-15 shows the multi-branched polymer of the general formula (IV) wherein n' is 4, and three of four $P^6$s are each the polar polymer chain (A3), and the remainder is the polar polymer chain having polyolefin side chains (A4).

FIG. 3-16 shows the multi-branched polymer of the general formula (IV) wherein n' is 4, and three of four $P^6$s are each the polar polymer chain having polyolefin side chains (A4), and the remainder is the polyolefin chain (A1).

FIG. 3-17 shows the multi-branched polymer of the general formula (IV) wherein n' is 4, and three of four $P^6$s are each the polar polymer chain having polyolefin side chains (A4), and the remainder is the polar polymer chain (A3).

FIG. 3-18 shows the multi-branched polymer of the general formula (IV) wherein n' is 4, and two of four $P^6$s are each the polyolefin chain (A1), and the remaining two are each the polar polymer chain (A3).

FIG. 3-19 shows the multi-branched polymer of the general formula (IV) wherein n' is 4, and two of four $P^6$s are each the polyolefin chain (A1), and the remaining two are each the polar polymer chain having polyolefin side chains (A4).

FIG. 3-20 shows the multi-branched polymer of the general formula (IV) wherein n' is 4, and two of four $P^6$s are each the polyolefin chain (A1), another one is the polar polymer chain (A3), and the last one is the polar polymer chain having polyolefin side chains (A4).

FIG. 3-21 shows the multi-branched polymer of the general formula (IV) wherein n' is 4, and two of four $P^6$s are each the polar polymer chain (A3), and the remaining two are each the polar polymer chain having polyolefin side chains (A4).

FIG. 3-22 shows the multi-branched polymer of the general formula (IV) wherein n' is 4, and two of four $P^6$s are each the polar polymer chain (A3), another one is the polyolefin chain (A1), and the last one is the polar polymer chain having polyolefin side chains (A4).

FIG. 3-23 shows the multi-branched polymer of the general formula (IV) wherein n' is 4, and two of four $P^6$s are each the polar polymer chain having polyolefin side chains (A4), another one is the polyolefin chain (A1), and the last one is the polar polymer chain (A3).

FIG. 3-24 shows the multi-branched polymer of the general formula (IV) wherein n' is 5, and all of five $P^6$s are each the polyolefin chain (A1).

FIG. 3-25 shows the multi-branched polymer of the general formula (IV) wherein n' is 5, and all of five $P^6$s are each the polar polymer chain having polyolefin side chains (A4).

FIG. 3-26 shows the multi-branched polymer of the general formula (IV) wherein n' is 5, and four of five $P^6$s are each the polyolefin chain (A1), and the remainder is the polar polymer chain (A3).

FIG. 3-27 shows the multi-branched polymer of the general formula (IV) wherein n' is 5, and four of five $P^6$s are each the polyolefin chain (A1), and the remainder is the polar polymer chain having polyolefin side chains (A4).

FIG. 3-28 shows the multi-branched polymer of the general formula (IV) wherein n' is 5, and four of five $P^6$s are each the polar polymer chain (A3), and the remainder is the polyolefin chain (A1).

FIG. 3-29 shows the multi-branched polymer of the general formula (IV) wherein n' is 5, and four of five $P^6$s are each the polar polymer chain (A3), and the remainder is the polar polymer chain having polyolefin side chains (A4).

FIG. 3-30 shows the multi-branched polymer of the general formula (IV) wherein n' is 5, and four of five $P^6$s are each the polar polymer chain having polyolefin side chains (A4), and the remainder is the polyolefin chain (A1).

FIG. 3-31 shows the multi-branched polymer of the general formula (IV) wherein n' is 5, and four of five $P^6$s are each the polar polymer chain having polyolefin side chains (A4), and the remainder is the polar polymer chain (A3).

FIG. 3-32 shows the multi-branched polymer of the general formula (IV) wherein n' is 5, and three of five $P^6$s are each the polyolefin chain (A1), and the remaining two are each the polar polymer chain (A3).

FIG. 3-33 shows the multi-branched polymer of the general formula (IV) wherein n' is 5, and three of five $P^6$s are each the polyolefin chain (A1), and the remaining two are each the polar polymer chain having polyolefin side chains (A4).

FIG. 3-34 shows the multi-branched polymer of the general formula (IV) wherein n' is 5, and three of five $P^6$s are each the polyolefin chain (A1), another one is the polar polymer chain (A3), and the last one is the polar polymer chain having polyolefin side chains (A4).

FIG. 3-35 shows the multi-branched polymer of the general formula (IV) wherein n' is 5, and three of five $P^6$s are each the polar polymer chain (A3), and the remaining two are each the polyolefin chain (A1).

FIG. 3-36 shows the multi-branched polymer of the general formula (IV) wherein n' is 5, and three of five $P^6$s are each the polar polymer chain (A3), and the remaining two are each the polar polymer chain having polyolefin side chains (A4).

FIG. 3-37 shows the multi-branched polymer of the general formula (IV) wherein n' is 5, and three of five $P^6$s are each the polar polymer chain (A3), another one is the polyolefin chain (A1), and the last one is the polar polymer chain having polyolefin side chains (A4).

FIG. 3-38 shows the multi-branched polymer of the general formula (IV) wherein n' is 5, and three of five $P^6$s are each the polar polymer chain having polyolefin side chains (A4), and the remaining two are each the polyolefin chain (A1).

FIG. 3-39 shows the multi-branched polymer of the general formula (IV) wherein n' is 5, and three of five $P^6$s are each the polar polymer chain having polyolefin side chains (A4), and the remaining two are each the polar polymer chain (A3).

FIG. 3-40 shows the multi-branched polymer of the general formula (IV) wherein n' is 5, and three of five $P^6$s are each the polar polymer chain having polyolefin side chains (A4), another one is the polyolefin chain (A1), and the last one is the polar polymer chain (A3).

FIG. 3-41 shows the multi-branched polymer of the general formula (IV) wherein n' is 5, and two of five $P^6$s are each the polyolefin chain (A1), other two are each the polar polymer chain (A3), and the last one is the polar polymer chain having polyolefin side chains (A4).

FIG. 3-42 shows the multi-branched polymer of the general formula (IV) wherein n' is 5, and two of five $P^6$s are each the polyolefin chain (A1), other two are each the polar polymer chain having polyolefin side chains (A4), and the last one is the polar polymer chain (A3).

FIG. 3-43 shows the multi-branched polymer of the general formula (IV) wherein n' is 5, and two of five $P^6$s are each the polar polymer chain (A3), other two are each the polar polymer chain having polyolefin side chains (A4), and the last one is the polyolefin chain (A1).

FIG. 3-44 shows the multi-branched polymer of the general formula (IV) wherein n' is 6, and all of six $P^6$s are each the polyolefin chain (A1).

FIG. 3-45 shows the multi-branched polymer of the general formula (IV) wherein n' is 6, and all of six $P^6$s are each the polar polymer chain having polyolefin side chains (A4).

FIG. 3-46 shows the multi-branched polymer of the general formula (IV) wherein n' is 6, and five of six $P^6$s are each the polyolefin chain (A1), and the last one is the polar polymer chain (A3).

FIG. 3-47 shows the multi-branched polymer of the general formula (IV) wherein n' is 6, and five of six $P^6$s are each the polyolefin chain (A1), and the last one is the polar polymer chain having polyolefin side chains (A4).

FIG. 3-48 shows the multi-branched polymer of the general formula (IV) wherein n' is 6, and five of six $P^6$s are each the polar polymer chain (A3), and the last one is the polyolefin chain (A1).

FIG. 3-49 shows the multi-branched polymer of the general formula (IV) wherein n' is 6, and five of six $P^6$s are each the polar polymer chain (A3), and the last one is the polar polymer chain having polyolefin side chains (A4).

FIG. 3-50 shows the multi-branched polymer of the general formula (IV) wherein n' is 6, and five of six $P^6$s are each the polar polymer chain having polyolefin side chains (A4), and the last one is the polyolefin chain (A1).

FIG. 3-51 shows the multi-branched polymer of the general formula (IV) wherein n' is 6, and five of six $P^6$s are each the polar polymer chain having polyolefin side chains (A4), and the last one is the polar polymer chain (A3).

FIG. 3-52 shows the multi-branched polymer of the general formula (IV) wherein n' is 6, and four of six $P^6$s are each the polyolefin chain (A1), and the remaining two are each the polar polymer chain (A3).

FIG. 3-53 shows the multi-branched polymer of the general formula (IV) wherein n' is 6, and four of six $P^6$s are each the polyolefin chain (A1), and the remaining two are each the polar polymer chain having polyolefin side chains (A4).

FIG. 3-54 shows the multi-branched polymer of the general formula (IV) wherein n' is 6, and four of six $P^6$s are each the polyolefin chain (A1), another one is the polar polymer chain (A3), and the last one is the polar polymer chain having polyolefin side chains (A4).

FIG. 3-55 shows the multi-branched polymer of the general formula (IV) wherein n' is 6, and four of six $P^6$s are each the polar polymer chain (A3), and the remaining two are each the polyolefin chain (A1).

FIG. 3-56 shows the multi-branched polymer of the general formula (IV) wherein n' is 6, and four of six $P^6$s are each the polar polymer chain (A3), and the remaining two are each the polar polymer chain having polyolefin side chains (A4).

FIG. 3-57 shows the multi-branched polymer of the general formula (IV) wherein n' is 6, and four of six $P^6$s are each the polar polymer chain (A3), another one is the polyolefin chain (A1), and the last one is the polar polymer chain having polyolefin side chains (A4).

FIG. 3-58 shows the multi-branched polymer of the general formula (IV) wherein n' is 6, and four of six $P^6$s are each the polar polymer chain having polyolefin side chains (A4), and the remaining two are each the polyolefin chain (A1).

FIG. 3-59 shows the multi-branched polymer of the general formula (IV) wherein n' is 6, and four of six $P^6$s are each the polar polymer chain having polyolefin side chains (A4), and the remaining two are each the polar polymer chain (A3).

FIG. 3-60 shows the multi-branched polymer of the general formula (IV) wherein n' is 6, and four of six $P^6$s are each the polar polymer chain having polyolefin side chains (A4), another one is the polyolefin chain (A1), and the last one is the polar polymer chain (A3).

FIG. 3-61 shows the multi-branched polymer of the general formula (IV) wherein n' is 6, and three of six $P^6$s are each the polyolefin chain (A1), and the remaining three are each the polar polymer chain (A3).

FIG. 3-62 shows the multi-branched polymer of the general formula (IV) wherein n' is 6, and three of six $P^6$s are each the polyolefin chain (A1), and the remaining three are each the polar polymer chain having polyolefin side chains (A4).

FIG. 3-63 shows the multi-branched polymer of the general formula (IV) wherein n' is 6, and three of six $P^6$s are each the polyolefin chain (A1), other two are each the polar polymer chain (A3), and the last one is the polar polymer chain having polyolefin side chains (A4).

FIG. 3-64 shows the multi-branched polymer of the general formula (IV) wherein n' is 6, and three of six $P^6$s are each the polyolefin chain (A1), other two are each the polar polymer chain having polyolefin side chains (A4), and the last one is the polar polymer chain (A3).

FIG. 3-65 shows the multi-branched polymer of the general formula (IV) wherein n' is 6, and three of six $P^6$s are each the polar polymer chain (A3), and the remaining three are each the polar polymer chain having polyolefin side chains (A4).

FIG. 3-66 shows the multi-branched polymer of the general formula (IV) wherein n' is 6, and three of six $P^6$s are each the polar polymer chain (A3), other two are each the polyolefin chain (A1), and the last one is the polar polymer chain having polyolefin side chains (A4).

FIG. 3-67 shows the multi-branched polymer of the general formula (IV) wherein n' is 6, and three of six $P^6$s are each the polar polymer chain (A3), other two are each the polar polymer chain having polyolefin side chains (A4), and the last one is the polyolefin chain (A1).

FIG. 3-68 shows the multi-branched polymer of the general formula (IV) wherein n' is 6, and three of six $P^6$s are each the polar polymer chain having polyolefin side chains (A4), other two are each the polyolefin chain (A1), and the last one is the polar polymer chain (A3).

FIG. 3-69 shows the multi-branched polymer of the general formula (IV) wherein n' is 6, and three of six $P^6$s are each the polar polymer chain having polyolefin side chains (A4), other two are each the polar polymer chain (A3), and the last one is the polyolefin chain (A1).

FIG. 3-70 shows the multi-branched polymer of the general formula (IV) wherein n' is 6, and two of six $P^6$s are each the polyolefin chain (A1), other two are each the polar polymer chain (A3), and the remaining two are each the polar polymer chain having polyolefin side chains (A4).

FIG. 4 shows a TEM image of a four-arm (PMMA-g-EPR) star-shaped polymer.

FIG. 5 shows a TEM image of an EPR/PMMA blend.

FIG. 6 shows a TEM image of a PMMA-g-EPR graft polymer.

BEST MODE FOR CARRYING OUT THE INVENTION

Figure 1:
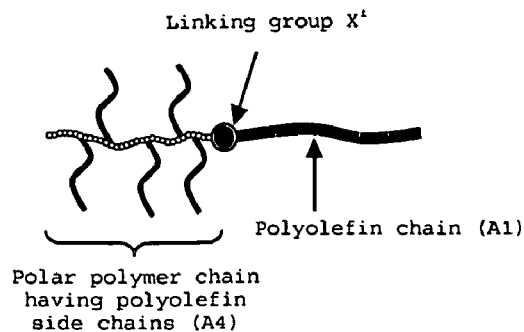
FIG. 1-1 shows the multi-branched polymer of the general formula (II) wherein $P^2$ is the polar polymer chain having polyolefin side chains (A4), and $P^3$ is the polyolefin chain (A1).

The multi-branched polymer of the present invention and applications thereof are described in detail by reference to the best mode thereof.

[1] Multi-Branched Polymer and Units Constituting the Same

The multi-branched polymer according to the present invention is a multi-branched polymer containing a block structure, a graft structure or a star-shaped structure, which is represented by the general formula (I):

$$(P^1)_n-X \qquad (I)$$

wherein $P^1$ is a polymer chain having a number-average molecular weight (Mn) of 500 to 1,000,000, selected from a polyolefin chain (A1), a polyolefin chain having polar polymer side chains (A2), a polar polymer chain (A3) and a polar polymer chain having polyolefin side chains (A4) whereupon a plurality of $P^1$s may be the same or different from one another provided that every $P^1$ shall not be the polar polymer chain (A3); when n is 2, at least one $P^1$ is the polar polymer chain having polyolefin side chains (A4); and X is a heteroatom or a heteroatom-containing linking group containing less than 200 atoms in total.

Hereinafter, the polymer chain $P^1$ is described.

In the formula (I), the polymer chain $P^1$ has a number-average molecular weight (Mn) of 500 to 1,000,000, and is selected from a polyolefin chain (A1), a polyolefin chain having polar polymer side chains (A2), a polar polymer chain (A3) and a polar polymer chain having polyolefin side chains (A4).

The multi-branched polymer of the present invention is a polymer composed of a plurality of polymer chain $P^1$s selected from the polyolefin chain (A1), the polyolefin chain having polar polymer side chains (A2), the polar polymer chain (A3) and the polar polymer chain having polyolefin side chains (A4).

First, the 4 kinds of polymer chains constituting the multi-branched polymer of the present invention are described in detail.

[1-1] Polyolefin Chain (A1)

The polyolefin chain (A1) represents a residue of polyolefin (P—H wherein P is a polyolefin chain, and H is a hydrogen atom) obtained by (co)polymerizing one or more olefins represented by formula (X) below in the presence of a coordination polymerization catalyst containing compounds of the groups 4 to 11 transition metals in the periodic table. For example, the polyolefin residue in the case where ethylene polymerization proceeds ideally without forming a branched chain is represented by $CH_3-(CH_2)_n-$.

$$CH_2=CHR^3 \qquad (X)$$

wherein $R^3$ represents a $C_{1-20}$ hydrocarbon group, a hydrogen atom or a halogen atom.

The $C_{1-20}$ hydrocarbon group includes, for example, a methyl group, ethyl group, propyl group, butyl group, pentyl group, hexyl group, octyl group, decyl group etc. The olefins represented by the formula (X) above include, for example, $C_{4-20}$ linear or branched α-olefins such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicocene; and vinyl halides such as vinyl chloride and vinyl bromide. Preferably used among these exemplary olefins are one or more olefins selected from ethylene, propylene, 1-butene, 1-hexene and 1-octene, particularly preferably ethylene alone, propylene alone, both propylene and ethylene, both ethylene and 1-butene, or both propylene and 1-butene, which are (co)polymerized to prepare the polyolefin chain.

The number-average molecular weight (Mn) of the polyolefin chain (A1) is substantially equal to the Mn of its corresponding polyolefin (P—H), and from the viewpoint of balance between usefulness in physical properties of the multi-branched polymer of the present invention and a polyolefin segment in a resin composition containing the multi-branched polymer and the reactivity of the multi-branched polymer during production, the Mn is usually in the range of 500 to 10,000,000, preferably 500 to 500,000, particularly preferably 500 to 300,000.

[1-2] Polyolefin Chain Having Polar Polymer Side Chains (A2)

The polyolefin chain having polar polymer side chains (A2) is a polymer chain comprising a unit (C1) represented by the formula (VIII) and a unit (C2) represented by the formula (IX).

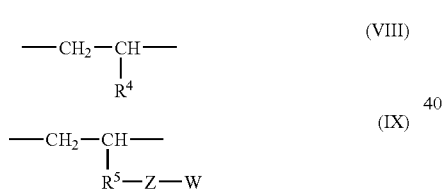

In the formula (VIII), $R^4$ is an atom or a group selected from a $C_{1-20}$ hydrocarbon group, a hydrogen atom or a halogen atom, and the $C_{1-20}$ hydrocarbon group includes, for example, a methyl group, ethyl group, propyl group, butyl group, pentyl group, hexyl group, octyl group, decyl group etc.

In the formulae (IX), $R^5$ is a $C_{1-20}$ hydrocarbon group, Z is a heteroatom or a heteroatom-containing group, and W is a polymer chain obtained by (co)polymerizing an addition-polymerizable monomer (D), a ring-opening-polymerizable monomer (E) and at least one monomer selected from polyolefin macromonomers (M1) to (M3) represented by the general formulae (V) to (VII).

The number-average molecular weight (Mn) of the polyolefin chain (A2) is usually in the range of 500 to 10,000,000, preferably 500 to 500,000, particularly preferably 500 to 300,000. The heteroatom or the heteroatom-containing group represented by Z is specifically a group containing a group selected from an ester group, an ether group and an amide group. Specific structural formulae of Z are as follows:

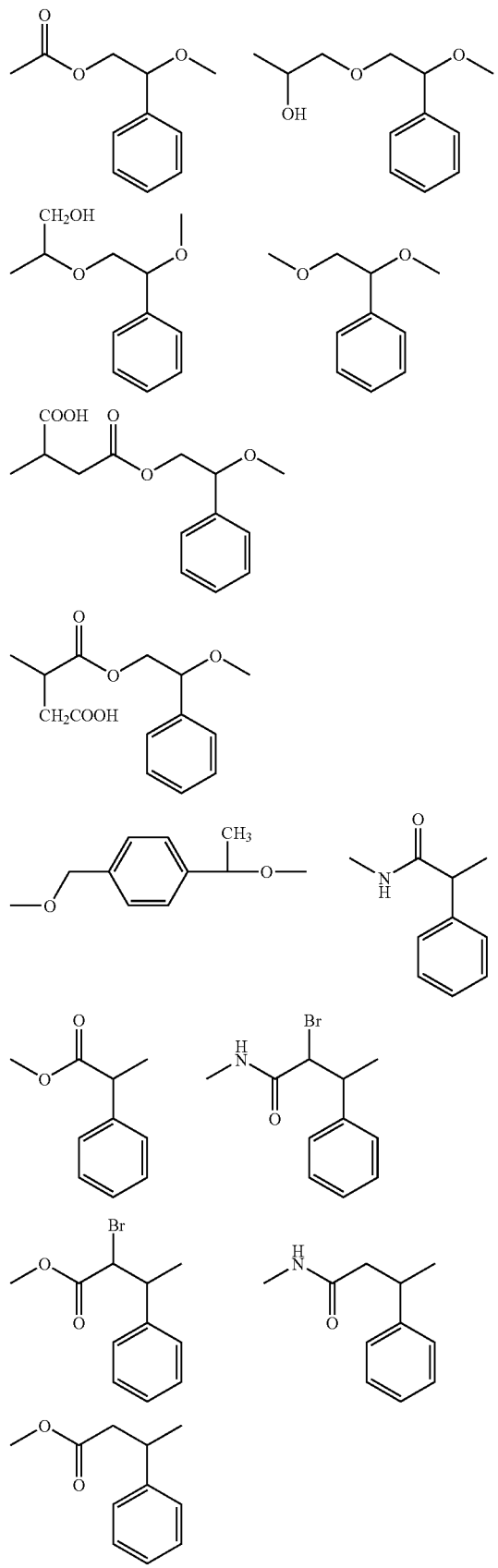

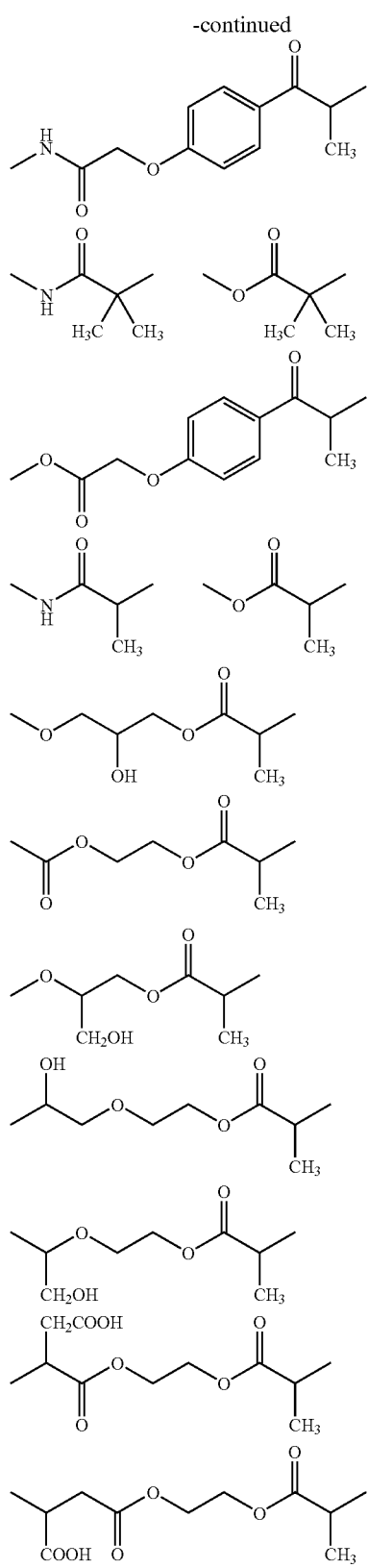

The polymer chain represented by W includes a polymer obtained by (co)polymerizing an addition-polymerizable monomer (D), a ring-opening-polymerizable monomer (E) and at least one monomer selected from polyolefin macromonomers (M1) to (M3) represented by the general formulae (V) to (VII).

The addition-polymerizable monomer (D) is selected from organic compounds each having at least one carbon-carbon unsaturated bond. The carbon-carbon unsaturated bond is a carbon-carbon double bond or a carbon-carbon triple bond. Examples of such organic compounds include (meth)acrylate monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxy silane, (meth)acrylic acid/ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate, styrene monomers such as styrene, vinyl toluene, α-methylstyrene, chlorostyrene, styrenesulfonic acid and salts thereof, fluorine-containing vinyl monomers such as perfluoroethylene, perfluoropropylene and vinylidene fluoride, silicon-containing vinyl monomers such as vinyltrimethoxy silane and vinyltriethoxy silane, maleimide monomers such as maleic anhydride, maleic acid, monoalkyl and dialkyl maleates, fumaric acid, monoalkyl and dialkylfumarates, maleimide, methyl maleimide, ethyl maleimide, propyl maleimide, butyl maleimide, hexyl maleimide, octyl maleimide, dodecyl maleimide, stearyl maleimide, phenyl maleimide and cyclohexyl maleimide, nitrile group-containing vinyl monomers such as acrylonitrile and methacrylonitrile, amide group-containing vinyl monomers such as (meth)acrylamide, N-methyl (meth)acrylamide, N-ethyl (meth)acrylamide, N-propyl (meth)acrylamide, N-isopropyl (meth)acrylamide and N-butyl (meth)acrylamide, vinyl ester monomers such as vinyl acetate, vinyl propionate, vinyl pivalate, vinyl benzoate and vinyl cinnamate, olefinic monomers such as ethylene, propylene and butene, diene monomers such as butadiene and isoprene, vinyl ether monomers such as ethyl vinyl ether and isopropyl vinyl ether, and N-vinylcarbazole, indene, isobutene, vinyl chloride, vinylidene chloride, allyl chloride and allyl alcohol. These organic compounds may be used alone or in combination thereof.

The ring-opening-polymerizable monomer (E) includes oxysilane compounds and lactone compounds. Specific examples include oxysilane compounds such as ethylene oxide, propylene oxide, butylene oxide, styrene oxide and epichlorohydrin, and lactone compounds such as β-propiolactone, α,α-bis(chloromethyl)-β-propiolactone, β-butyrolactone, δ-valerolactone, 1,4-dioxan-2-one, glycoside, lactide, trimethylene carbonate and ε-caprolactone.

The polyolefin macromonomers (M1) to (M3) represented by the general formulae (V) to (VII) include macromonomers produced by the same method as in production of polyolefin macromonomers used in producing the polar polymer having a polyolefin side chain (A4) as described later.

[1-3] Polar Polymer Chain (A3)

The polar polymer chain (A3) includes a polymer chain obtained by polymerizing the addition-polymerizable monomer (D) or the ring-opening polymerizable monomer (E). The number-average molecular weight (Mn) of the polar polymer chain (A3) is usually in the range of 500 to 10,000,000, preferably 500 to 500,000, particularly preferably 500 to 300,000.

[1-4] Polar Polymer Chain Having Polyolefin Side Chains (A4)

The polar polymer chain having polyolefin side chains (A4) is obtained by homopolymerizing a macromonomer, or copolymerizing two or more macromonomers, selected from the polyolefin macromonomer (M1) represented by the general formula (V), the polyolefin macromonomer (M2) represented by the general formula (VI) and the polyolefin macromonomer (M3) represented by the general formula (VII), or by copolymerizing at least one macromonomer selected from (M1), (M2) and (M3) with at least one monomer (B) selected from organic compounds each having at least one carbon-carbon unsaturated bond, and the number-average molecular weight (Mn) of the polar polymer chain having polyolefin side chains (A4) is usually in the range of 500 to 10,000,000, preferably 500 to 500,000, particularly preferably 500 to 300,000.

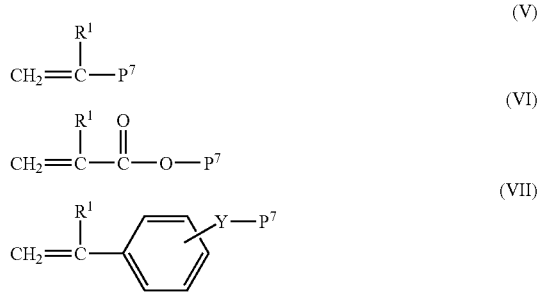

In the formulae (V) to (VII), $R^1$ is a hydrogen atom or a methyl group, and Y is a heteroatom or a heteroatom-containing group which is specifically a linking group containing a group selected from an ester group, an amide group and an ether group.

Specific examples of Y include groups presented by the following chemical formulae: ether linkage-containing groups such as —O—$CH_2$—, —O—$(CH_2)_2$—, —O—$(CH_2)_3$—, —O—$CH(CH_3)$—$CH_2$—, —O—$CH_2$—CH$(CH_3)$—, —O—$(CH_2)_4$—, —O—$CH_2$—CH(OH)—, —O—$CH_2$—CH(OH)—$CH_2$—, —O—$CH_2$—CH(OH)—$(CH_2)_2$—, —O—$CH_2$—CH(OH)—$(CH_2)_3$—, —O—$CH_2$—CH(OH)—$(CH_2)_4$—, —O—$CH_2$—CH(OH)—$CH_2$—O—$CH_2$—, —O—$CH(CH_2OH)$—, —O—$CH(CH_2OH)$—$CH_2$—, —O—$CH(CH_2OH)$—$(CH_2)_2$—, —O—$CH(CH_2OH)$—$(CH_2)_3$—, —O—$CH(CH_2OH)$—$(CH_2)_4$—, —O—$CH(CH_2OH)$—$CH_2$—O—$CH_2$—, —CH(OH)—$CH_2$—O—, —CH(OH)—$CH_2$—O—$CH_2$—, —CH(OH)—$CH_2$—O—$(CH_2)_2$—, —CH(OH)—$CH_2$—O—$(CH_2)_3$—, —CH(OH)—$CH_2$—O—$(CH_2)_4$—, —CH($CH_2OH$)—O—, —CH($CH_2OH$)—O—$CH_2$—, —CH($CH_2OH$)—O—$(CH_2)_2$—, —CH($CH_2OH$)—O—$(CH_2)_3$— and —CH($CH_2OH$)—O—$(CH_2)_4$—; carboxylate-containing groups such as —(CO)O—, —(CO)O—$CH_2$—, —(CO)O—$(CH_2)_2$—, —(CO)O—$(CH_2)_3$—, —(CO)O—$(CH_2)_4$—, —O(CO)—, —O(CO)—$CH_2$—, —O(CO)—$(CH_2)_2$—, —O(CO)—$(CH_2)_3$—, —O(CO)—$(CH_2)_4$—, —(CO)O(CO)—, —(CO)O(CO)—$CH_2$—, —(CO)O(CO)—$(CH_2)_2$—, —(CO)O(CO)—$(CH_2)_3$—, —(CO)O(CO)—$(CH_2)_4$—, —C(COOH)—$CH_2$—(CO)O—, —C(COOH)—$CH_2$—(CO)O—$CH_2$—, —C(COOH)—$CH_2$—(CO)O—$(CH_2)_2$—, —C(COOH)—$CH_2$—(CO)O—$(CH_2)_3$—, —C($CH_2COOH$)—(CO)O—, —C($CH_2COOH$)—(CO)O—$CH_2$—, —C($CH_2COOH$)—(CO)O—$(CH_2)_2$— and —C($CH_2COOH$)—(CO)O—$(CH_2)_3$—; amide-containing groups such as —NH(CO)—, —NH(CO)—$CH_2$—, —NH(CO)—$(CH_2)_2$—, —NH(CO)—$(CH_2)_3$—, —NH(CO)—$(CH_2)_4$—, —(CO)NH—, —(CO)NH—$CH_2$—, —(CO)NH—$(CH_2)_2$—, —(CO)NH—$(CH_2)_3$— and —(CO)NH—$(CH_2)_4$—; and carbaminate-containing groups such as —O(CO)NH—, —O(CO)NH—$CH_2$—, —O(CO)NH—$(CH2)_2$—, —O(CO)NH—$(CH_2)_3$— and —O(CO)NH—$(CH_2)_4$—.

$P^7$ is a polymer chain obtained by homopolymerizing or copolymerizing olefins represented by $CH_2$=$CHR^2$ wherein $R^2$ is a group or an atom selected from a $C_{1-20}$ hydrocarbon group, a hydrogen atom and a halogen atom.

Hereinafter, the polyolefin macromonomers (M1), (M2) and (M3) serving as the starting material of the polar polymer chain having polyolefin side chains (A4) are described in detail.

[1-4a] Polyolefin Macromonomer (M1)

The polyolefin macromonomer (M1) represented by the general formula (V) is a polyolefin macromonomer having a vinyl group or a vinylidene group at the terminal thereof, and for example, the macromonomer (M1) can be produced by homopolymerizing or copolymerizing olefins represented by the above-mentioned $CH_2$=$CHR^2$ in the presence of an olefin polymerization catalyst. The olefin polymerization catalyst used in production of the macromonomer (M1) may be any catalyst known in the art. As the catalyst known in the art, a magnesium-carrying titanium catalyst can be exemplified by a catalyst described in for example EP0641807A, a metallocene catalyst can be exemplified by a catalyst described in for example EP250601A, and a postmetallocene catalyst can be exemplified by a catalyst containing a transition metal complex disclosed in the literatures below. As the compound containing the group 13 element in the periodic table, which constitutes the olefin polymerization catalyst, those compounds described in EP0641807A and EP250601A supra can be used without limitation, but the organoaluminum compound or the organoboron compound is preferably used.

(1) M. Brookhart et al., J. Am. Chem. Soc., 117, 6414 (1995)
(2) D. H. Mc Conville et al., Macromolecules, 29, 5241 (1996)
(3) R. H. Grubbs et al., Organometallics, 17, 3149 (1998)
(4) EP874005A As the post-metallocene catalyst, a phenoxyimine compound represented by the general formula (XI), disclosed in EP874005A, is preferably used.

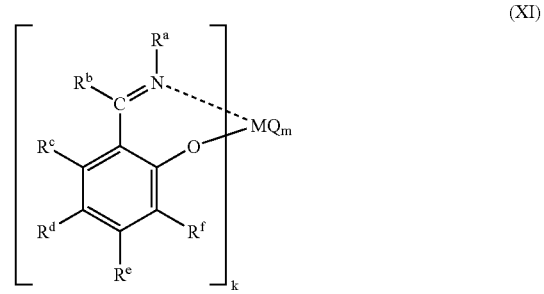

wherein M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^c$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

The polyolefin macromonomer (M1) represented by the general formula (V) is produced by a solvent suspension polymerization method or by a suspension polymerization method using a liquid olefin as solvent. When the solvent suspension polymerization is carried out, a hydrocarbon inert to the polymerization reaction can be used as the polymerization solvent. Examples of such inert hydrocarbon solvents include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene, and a combination thereof. Among these, aliphatic hydrocarbons are particularly preferably used.

When the magnesium-carrying titanium catalyst system is used, a solid titanium catalyst component (a) or its preliminary polymerization catalyst in the polymerization system is used usually in an amount of about 0.0001 to 50 mmol, preferably about 0.001 to 10 mmol in terms of titanium atom per L of the polymerization volume. An organometallic compound catalyst component (b) is used in such an amount that the metal atom in the catalyst component (b) is usually in an amount of 1 to 2000 moles, preferably 2 to 1000 moles, per mole of titanium atom in the solid titanium catalyst component (a) in the polymerization system. An electron donor is used usually in an amount of 0.001 to 10 moles, preferably 0.01 to 5 moles, per mole of metal atom in the organometallic compound catalyst component (b).

When the metallocene catalyst is used as the catalyst, the concentration of a metallocene compound (c) in the polymerization system is usually 0.00005 to 0.1 mmol, preferably 0.0001 to 0.05 mmol, per L of the polymerization volume. An organoaluminum oxy compound (d) is used in an amount of 5 to 1000, preferably 10 to 400, in terms of molar ratio (Al/M) of aluminum atom (A1) to transition metal atom (M) in the metallocene compound (c). When the organometallic compound catalyst component (b) is used, it is used usually in an amount of about 1 to 300 moles, preferably about 2 to 200 moles, per mole of transition metal atom in the metallocene compound (c).

The hydrogen concentration in the polymerization process is 0 to 0.01 mole, preferably 0 to 0.005 mole, and still more preferably 0 to 0.001 mole, per mole of the monomer. The olefin polymerization can be carried out by liquid-phase polymerization such as solution polymerization or suspension polymerization or by gaseous-phase polymerization. The reaction solvent used in suspension polymerization can be the above-mentioned inert solvent or an olefin that is liquid at the reaction temperature. The polymerization temperature is usually 70° C. or more, preferably in the range of 80 to 150° C., more preferably 85 to 140° C., and still more preferably 90 to 130° C., and the pressure is usually normal pressure to 10 MPa, preferably normal pressure to 5 MPa. The polymerization can be carried out in a batch system, a semi-continuous system or a continuous system, and when the polymerization is conducted in two or more divided stages, the reaction conditions may be the same or different.

When the phenoxyimine catalyst is used as the catalyst, at least one compound selected from, for example, a transition metal compound containing a ligand having a phenoxyimine skeleton represented by the general formula (XI), an organoaluminum oxy compound (d), and a compound forming an ion pair by reacting with the phenoxyimine compound can be used. If necessary, the phenoxyimine catalyst carried on a particulate carrier can also be used. When olefins are polymerized by using the polymerization catalyst, the phenoxyimine compound is used usually in an amount of $10^{-12}$ to $10^{-2}$ mole, preferably $10^{-10}$ to $10^{-3}$ mole, per L of the reaction volume.

The temperature for polymerization of olefins by using the olefin polymerization catalyst is usually in the range of −50 to +200° C., preferably 0 to 170° C. The polymerization pressure is usually normal pressure to 100 kg/cm², preferably normal pressure to 50 kg/cm², and the polymerization reaction can also be carried out in a batch system, a semi-continuous system or a continuous system. Further, the polymerization can be carried out in two or more divided stages.

[1-4b] Polyolefin Macromonomer (M2)

The polyolefin macromonomer (M2) represented by the general formula (VI), which is a polyolefin chain having an acryloyl group or a methacryloyl group at the terminal thereof, is a polyolefin macromonomer obtained for example by successively conducting the following steps (A) and (B).

<<Step (A)>> A step of producing a polyolefin having a hydroxyl group at the terminal of a polyolefin chain $P^7$, represented by the following general formula (XII):

$$P^7\text{—OH} \qquad \qquad (XII)$$

wherein $P^7$ has the same meaning as defined for $P^7$ in the general formulae (V) to (VII) above.

<<Step (B)>> A step of converting the terminal hydroxyl group in the polyolefin chain $P^7$ obtained in the step (A) into an acryloyl group or a methacryloyl group.

Now, each step is described in detail.

<<Step (A)>>

The polyolefin having a hydroxyl group at the terminal of the polyolefin chain $P^7$, represented by the general formula (XII) above, can be produced for example by producing a polyolefin modified at the terminal thereof in the presence of an olefin polymerization catalyst, then subjecting the terminal group in the polyolefin modified at the terminal thereof to substitution reaction with a compound having a functional group structure, and subjecting the product to solvolysis, or by subjecting the terminal group in the polyolefin modified at the terminal thereof to substitution reaction with a compound giving a structure which upon solvolysis, forms a functional group, and subjecting the product to solvolysis.

Hereinafter, the process of the present invention is divided into the step of producing the polyolefin modified at the terminal thereof and the step of converting the polyolefin modified at the terminal thereof into the polyolefin having a hydroxyl group at the terminal thereof represented by the general formula (XII) above.

<Production of the Polyolefin Modified at the Terminal Thereof>

The polyolefin modified at the terminal thereof has, for example, a structure represented by the following general formula (XIII):

wherein $P^7$ has the same meaning as defined for $P^7$ in the general formulae (V) to (VII). The method of producing the polyolefin modified at the terminal thereof represented by the formula (XIII) above is roughly classified into:

(Method 1), that is, a method of polymerizing an olefin in the presence of an olefin polymerization catalyst containing a compound (α) containing the group 13 element in the periodic table, and (Method 2), that is, a method of producing the polyolefin modified at the terminal thereof by reacting a polyolefin having an unsaturated bond at the terminal thereof (hereinafter, also called "polyolefin unsaturated at the terminal thereof") with a compound (β) containing the group 13 element in the periodic table. The terminal modified group (—$AlR^7R^8$) in the formula (XIII) is a terminal group obtained by using an organoaluminum compound as the compound (α) or (β) containing the group 13 element in the periodic table. Usually, $R^7$ and $R^8$ may be the same or different from each other and each represent a $C_{1-20}$ hydrocarbon group, a hydrogen atom or a halogen atom. Now, (Method 1) is described, and (Method 2) will be described later.

In the above-mentioned (Method 1), the olefin polymerization catalyst used in production of the polyolefin modified at the terminal thereof is preferably the same as the known conventional catalyst used in production of the polyolefin macromonomer (M1) represented by the general formula (V).

<Production of the Polyolefin (XII) Having a Hydroxyl Group at the Terminal Thereof>

The thus produced polyolefin modified at the terminal thereof represented by the general formula (XIII) is obtained usually as slurry. Then, (1) the —$AlR^7R^8$ group in the resulting polyolefin modified at the terminal thereof is subjected to substitution reaction with a compound having a functional group structure and then subjected to solvolysis, or (2) the —$AlR^7R^8$ group in the resulting polyolefin modified at the terminal thereof is subjected to substitution reaction with a compound having a structure which upon solvolysis, forms a functional group, and then subjected to solvolysis, thus producing a polyolefin having a hydroxyl group at the terminal thereof, represented by the following general formula (XII):

wherein $P^7$ has the same meaning as defined above. The compound having a functional group structure includes a halogen gas, methyl chloroformate and phthalic chloride. The compound having a structure which upon solvolysis, forms a functional group includes oxygen, carbon monoxide and carbon dioxide.

The substitution reaction of the —$AlR^7R^8$ group in the resulting polyolefin modified at the terminal thereof with the compound having a functional group structure or the compound having a structure which upon solvolysis, forms a functional group is carried out usually at a temperature of 0 to 300° C., preferably 10 to 200° C., for 0 to 100 hours, preferably 0.5 to 50 hours. After the substitution reaction is carried out, the solvolysis temperature is usually a temperature of 0 to 100° C., preferably 10 to 80° C., and the solvolysis time is 0 to 100 hours, preferably 0.5 to 50 hours. The solvent used in solvolysis includes methanol, ethanol, propanol, butanol, water etc.

The above-mentioned (Method 2) is a method of producing the polyolefin (XII) having a hydroxyl group at the terminal thereof by reacting a polyolefin having an unsaturated bond at one terminal thereof (also referred to in the following description as "polyolefin unsaturated at the terminal thereof") with a compound containing the group 13 element in the periodic table, for example an organoaluminum compound or an organoboron compound, to form the polyolefin modified at the terminal thereof represented by the general formula (XIII), and then converting the terminal into a hydroxyl group in the same manner as described above.

The polyolefin unsaturated at the terminal thereof is produced by using the same olefin and the same olefin polymerization catalyst under the same polymerization conditions as in production of the polyolefin chain $P^7$.

The polyolefin unsaturated at the terminal thereof obtained in this manner is reacted with the compound containing the group 13 element in the periodic table, to convert the terminal into a terminal having the group 13 element bound thereto. Also when the resulting polyolefin is a mixture of the polyolefin having the group 13 element bound to one terminal thereof and the polyolefin having an unsaturated bond at one terminal thereof, the unsaturated bond at one terminal of the polyolefin can be converted into a terminal having the group 13 element bound thereto is needed.

The compound containing the group 13 element in the periodic table, used in the reaction, can be exemplified by an organoaluminum compound or an organoboron compound, and this compound is particularly preferably trialkyl aluminum, dialkyl aluminum halide or a boron compound having one or more hydrogen-boron bonds, and it is particularly preferable that the organoaluminum is dialkyl aluminum halide, and the organoboron compound is 9-borabicyclo[3,3,1]nonane.

The reaction of the polyolefin unsaturated at the terminal thereof with the compound containing the group 13 element in the periodic table is carried out for example in the following manner.

i) 0.1 to 50 g polypropylene having a vinylidene group at the terminal thereof and 5 to 1000 ml of 0.01 to 5 moles/L diisobutyl aluminum halide in octane are mixed and refluxed for 0.5 to 6 hours.

ii) 0.1 to 50 g polypropylene having a vinylidene group at the terminal thereof, 5 to 1000 ml anhydrous tetrahydrofuran, and 0.1 to 50 ml of 0.05 to 10 moles/L 9-borabicyclo[3,3,1]nonane in tetrahydrofuran are mixed and stirred at 20 to 65° C. for 0.5 to 24 hours.

Using the polyolefin unsaturated at the terminal thereof as a starting material, the polyolefin modified at the terminal thereof represented by the general formula (XIII) is produced in the manner described above. One terminal of the resulting polyolefin has the group 13 element bound thereto, and the group 13 element in the periodic table is preferably aluminum.

The polyolefin having a hydroxyl group at the terminal thereof, represented by the general formula (XII), can also be produced by copolymerizing the same olefin as the olefin used in production of the polyolefin chain ($P^7$), with an olefin having a hydroxyl group, in the presence of the coordination polymerization catalyst containing a transition metal compound used in production of the polyolefin chain ($P^7$). The method of selectively introducing the olefin having a hydroxyl group into the terminal of the polymer includes, for example, a method described in J. Am. Chem. Soc., 124, 1176 (2002).

The olefin having a hydroxyl group used in copolymerization include, for example, unsaturated alcohols having a linear hydrocarbon moiety, such as allyl alcohol, 4-penten-1-ol, 5-hexen-1-ol, 6-hepten-1-ol, 8-nonen-1-ol and 10-undecen-1-ol.

<<Step (B)>>

The polyolefin having an acryloyl group or a methacryloyl group at the terminal thereof, represented by the general formula (VI), is obtained by reacting the polyolefin having a hydroxyl group at the terminal thereof, represented by the general formula (XII), with acrylic halide, methacrylic halide, acrylic acid or methacrylic acid.

The method of reacting the polyolefin having a hydroxyl group at the terminal thereof with acrylic halide, methacrylic halide, acrylic acid or methacrylic acid can be carried out by any known methods without limitation, for example by:

i) a method of reacting the polyolefin having a hydroxyl group at the terminal thereof with acrylic halide or methacrylic halide such as acrylic chloride, methacrylic chloride or the like in the presence of a base such as triethylamine, or ii) a method of reacting the polyolefin having a hydroxyl group at the terminal thereof with acrylic acid or methacrylic acid in the presence of an acid catalyst.

In the reaction, acrylic halide, methacrylic halide, acrylic acid or methacrylic acid is used in the range of 0.1 to 1000 moles, preferably 0.2 to 500 moles, per mole of hydroxyl group at the terminal of the polyolefin. The reaction temperature is usually −100 to 150° C., preferably 0 to 120° C., and the reaction time is usually 0.1 to 48 hours, preferably 0.5 to 12 hours. The polyolefin macromonomer (M2) represented by the general formula (VI) is thus produced.

[1-4c] Polyolefin Macromonomer (M3)

The polyolefin macromonomer (M3) represented by the general formula (VII) is a polyolefin macromonomer (M3) obtained by reacting a styrene derivative represented by the following general formula (XIV):

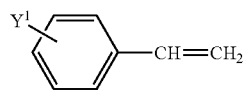

(XIV)

wherein $Y^1$ is a group containing a functional group selected from a halogen atom, a hydroxyl group, a carboxyl group, an acid halide group, an epoxy group, an amino group and an isocyanato group, with a functional group-containing polyolefin represented by the following general formula (XV):

$$P^7—Y^2 \quad (XV)$$

wherein $P^7$ is the same as in formulae (V) to (VII), and $Y^2$ is a functional group selected from a hydroxyl group, an amino group, an epoxy group, a carboxyl group, an acid halide group, and an acid anhydride group.

Hereinafter, the polyolefin macromonomer (M3) is described in more detail.

Examples of styrene derivatives represented by the general formula (XIV) include, for example, halogen-containing styrene derivatives such as m-chlorostyrene, p-chlorostyrene, m-bromostyrene, p-bromostyrene, m-iodostyrene, p-iodostyrene, m-chloromethylstyrene, p-chloromethylstyrene, m-bromomethylstyrene, p-bromomethylstyrene, m-iodomethylstyrene, p-iodomethylstyrene, p-(2-chloroethyl)styrene, p-(2-bromoethyl)styrene, p-(3-chloropropyl)styrene, p-(3-bromopropyl)styrene, p-(4-chlorobutyl)styrene, p-(4-bromobutyl)styrene, p-(5-chloropentyl)styrene, p-(5-bromopentyl)styrene, p-(6-chlorohexyl)styrene and p-(6-bromohexyl)styrene, hydroxyl group-containing styrene derivatives such as m-hydroxystyrene, p-hydroxystyrene, m-hydroxymethylstyrene, p-hydroxymethylstyrene, p-(2-hydroxyethyl)styrene, p-(3-hydroxypropyl)styrene and p-(4-hydroxybutyl)styrene, carboxyl group-containing styrene derivatives such as 3-vinylbenzoic acid, 4-vinylbenzoic acid, (3-vinylphenyl)acetic acid, (4-vinylphenyl)acetic acid, 3-(4-vinylphenyl)propionic acid, 4-(4-vinylphenyl)butanoic acid, 5-(4-vinylphenyl)pentanoic acid and 6-(4-vinylphenyl)hexanoic acid, acid halide group-containing styrene derivatives such as 3-vinylbenzoic acid chloride, 4-vinylbenzoic acid chloride, 3-vinylbenzoic acid bromide, 4-vinylbenzoic acid bromide, 3-vinylbenzoic acid iodide, 4-vinylbenzoic acid iodide, (3-vinylphenyl)acetic acid chloride, (4-vinylphenyl)acetic acid chloride, 3-(4-vinylphenyl)propionic acid chloride, 4-(4-vinylphenyl)butanoic acid chloride, 5-(4-vinylphenyl)pentanoic acid chloride and 6-(4-vinylphenyl)hexanoic acid chloride, amino group-containing styrene derivatives such as 3-vinyl aniline, 4-vinyl aniline, 3-vinyl benzyl amine, 4-vinyl benzyl amine, 2-(4-vinylphenyl)ethylamine, 3-(4-vinylphenyl)propyl amine, 4-(4-vinylphenyl)butylamine and 5-(4-vinylphenyl)pentylamine, epoxy group-containing styrene derivatives such as glycidyl-(3-vinylbenzyl)ether and glycidyl-(4-vinylbenzyl)ether, and isocyanato group-containing styrene derivatives such as 3-isocyanatostyrene, 4-isocyanatostyrene, 3-isocyanatomethylstyrene, 4-isocyanatomethylstyrene, 4-(2-isocyanatoethyl)styrene, 4-(3-isocyanatopropyl)styrene and 4-(4-isocyanatobutyl)styrene.

The functional group-containing polyolefin represented by the general formula (XV) can be converted into the polyolefin represented by the general formula (XII) by producing the polyolefin having a group containing the group 13 element in the periodic table described in Step (A) for the polyolefin macromonomer (M2), followed by conversion thereof by the following method a or b into the polyolefin represented by the general formula (XII) wherein $Y^2$ in the formula (XV) is a hydroxyl group.

(Method a) wherein a group containing the group 13 element in the periodic table, present in the polyolefin, is subjected to substitution reaction with the compound having a functional group structure and then subjected to solvolysis, or (Method b) wherein a group containing the group 13 element in the periodic table, present in the polyolefin, is subjected to substitution reaction with the compound having a structure which upon solvolysis, forms a functional group, and then subjected to solvolysis.

The polyolefin having a functional group represented by the general formula (XV) wherein $Y^2$ is an epoxy group can also be produced according to a method described in e.g.

JP-A63-305104 by epoxylating the unsaturated bond in the polyolefin unsaturated at the terminal thereof produced by the above method. Specifically, the polyolefin having a functional group can be produced by reacting the polyolefin unsaturated at the terminal thereof produced by the above-described method, with 1) a mixture of an organic acid such as formic acid or acetic acid and hydrogen peroxide or 2) an organic peroxide such as m-chloroperbenzoic acid.

The polyolefin having a functional group represented by the general formula (XV) wherein $Y^2$ is an acid anhydride group can be produced by thermally reacting the polyolefin unsaturated at the terminal thereof produced by the above method, with e.g. maleic anhydride according to a method described in e.g. Makromol. Chem. Macromol. Symp., 48/49, 317 (1991) or Polymer, 43, 6351 (2002), whereby the acid anhydride is introduced into the terminal.

Further, the polyolefin having a functional group represented by the general formula (XV) wherein $Y^2$ is a carboxyl group can be produced by oxidizing the polyolefin having a hydroxyl group represented by the general formula (XII) to convert the hydroxyl group into a carboxyl group.

The polyolefin having a functional group at the terminal thereof represented by the general formula (XV) can also be produced by copolymerizing the same olefin as used in production of the polyolefin chain ($P^7$) with an olefin having a functional group in the presence of the coordination polymerization catalyst containing a transition metal compound used in production of the polyolefin chain ($P^7$). The method of selectively introducing the olefin having a functional group into the terminal of the polymer includes, for example, a method described in J. Am. Chem. Soc., 124, 1176 (2002).

The olefin having a functional group used in copolymerization includes unsaturated alcohols having a liner hydrocarbon moiety, such as allyl alcohol, 4-penten-1-ol, 5-hexen-1-ol, 6-hepten-1-ol, 8-nonen-1-ol and 10-undecen-1-ol, unsaturated carboxylic acids such as 5-hexenoic acid, 6-heptenoic acid, 7-octenoic acid, 8-nonenoic acid and 9-decenoic acid, unsaturated amines such as allyl amine, 5-hexene amine and 6-heptene amine, (2,7-octadienyl) succinic anhydride, pentapropenyl succinic anhydride, unsaturated acid anhydrides wherein in the above unsaturated carboxylic acids, carboxylic acid groups are replaced by carboxylic anhydride groups, unsaturated carboxylic acid halides wherein in the above unsaturated carboxylic acids, carboxylic acid groups are replaced by carboxylic acid halide groups, and unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene and 11-epoxy-1-undecene.

The combination of the styrene derivative represented by the general formula (XIV) and the polyolefin having a functional group represented by the general formula (XV) in producing the polyolefin macromonomer (M3) having a styryl group at the terminal of polyolefin chain $P^7$ includes, but is not limited to, the following combinations:

(C1) The styrene derivative represented by the general formula (XIV) wherein $Y^1$ is a group containing a carboxyl group and the polyolefin having a functional group at the terminal thereof represented by the general formula (XV) wherein $Y^2$ is a hydroxyl group.

(C2) The styrene derivative represented by the general formula (XIV) wherein $Y^1$ is a group containing a carboxyl group and the polyolefin having a functional group at the terminal thereof represented by the general formula (XV) wherein $Y^2$ is an amino group.

(C3) The styrene derivative represented by the general formula (XIV) wherein $Y^1$ is a group containing a hydroxyl group and the polyolefin having a functional group at the terminal thereof represented by the general formula (XV) wherein $Y^2$ is an epoxy group.

(C4) The styrene derivative represented by the general formula (XIV) wherein $Y^1$ is a group containing a hydroxyl group and the polyolefin having a functional group at the terminal thereof represented by the general formula (XV) wherein $Y^2$ is a carboxyl group.

(C5) The styrene derivative represented by the general formula (XIV) wherein $Y^1$ is a group containing a hydroxyl group and the polyolefin having a functional group at the terminal thereof represented by the general formula (XV) wherein $Y^2$ is an acid anhydride group.

(C6) The styrene derivative represented by the general formula (XIV) wherein $Y^1$ is a group containing a hydroxyl group and the polyolefin having a functional group at the terminal thereof represented by the general formula (XV) wherein $Y^2$ is an acid halide group.

(C7) The styrene derivative represented by the general formula (XIV) wherein $Y^1$ is a group containing an acid halide group and the polyolefin having a functional group at the terminal thereof represented by the general formula (XV) wherein $Y^2$ is a hydroxyl group.

(C8) The styrene derivative represented by the general formula (XIV) wherein $Y^1$ is a group containing an acid halide group and the polyolefin having a functional group at the terminal thereof represented by the general formula (XV) wherein $Y^2$ is an amino group.

(C9) The styrene derivative represented by the general formula (XIV) wherein $Y^1$ is a group containing a halogen and the polyolefin having a functional group at the terminal thereof represented by the general formula (XV) wherein $Y^2$ is a hydroxyl group.

(C10) The styrene derivative represented by the general formula (XIV) wherein $Y^1$ is a group containing an epoxy group and the polyolefin having a functional group at the terminal thereof represented by the general formula (XV) wherein $Y^2$ is a hydroxyl group.

(C11) The styrene derivative represented by the general formula (XIV) wherein $Y^1$ is a group containing an amino group and the polyolefin having a functional group at the terminal thereof represented by the general formula (XV) wherein $Y^2$ is a carboxyl group.

(C12) The styrene derivative represented by the general formula (XIV) wherein $Y^1$ is a group containing an amino group and the polyolefin having a functional group at the terminal thereof represented by the general formula (XV) wherein $Y^2$ is an acid halide group.

(C13) The styrene derivative represented by the general formula (XIV) wherein $Y^1$ is a group containing an amino group and the polyolefin having a functional group at the terminal thereof represented by the general formula (XV) wherein $Y^2$ is an acid anhydride group.

(C14) The styrene derivative represented by the general formula (XIV) wherein $Y^1$ is a group containing an isocyanato group and the polyolefin having a functional group at the terminal thereof represented by the general formula (XV) wherein $Y^2$ is a hydroxyl group.

The molar ratio of the styrene derivative represented by the general formula (XIV) to the polyolefin having a functional group represented by the general formula (XV) in production of the polyolefin macromonomer (M3) having a styryl group at the terminal thereof in the present invention is usually in the range of 0.01 to 100, more preferably 0.1 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These can be used alone or as a suitable mixture thereof.

For the reaction of the styrene derivative represented by the general formula (XIV) with the polyolefin having a functional group represented by the general formula (XV), a condensation agent can be added if necessary to allow the reaction to proceed efficiently.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide)hydrochloride, polyphosphoric acid, acetic anhydride, carbonyl diimidazole and p-toluene sulfonyl chloride.

The reaction of the styrene derivative represented by the general formula (XIV) with the polyolefin having a functional group represented by the general formula (XV) is carried out preferably in the presence of a basic catalyst. Examples of the basic catalyst include organic amines such as triethylamine, diisopropyl ethyl amine, N,N-dimethyl aniline, piperidine, pyridine, 4-dimethyl aminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride, potassium hydride, lithium hydride and n-butyl lithium.

When the styrene derivative represented by the general formula (XIV) and the polyolefin having a functional group represented by the general formula (XV) wherein the functional group is a carboxyl group are used, the polymer can be produced by reacting such compounds with e.g. phosphorus pentachloride or thionyl chloride to form their corresponding acid chloride compounds and then reacting the resulting polyolefin having a functional group represented by the general formula (XV) with the resulting styrene derivative represented by the general formula (XIV) in a suitable solvent.

Further, when the styrene derivative having a group containing a halogen atom represented by the general formula (XIV) is used, the polymer can be produced by converting the polyolefin having a functional group represented by the general formula (XV) wherein $Y^2$ is a hydroxyl group into an alkoxide by a metal alkoxidizing agent and then reacting the alkoxide with the styrene derivative represented by the general formula (XIV) in a suitable solvent. The metal alkoxidizing agent includes, for example, metal sodium, metal potassium, sodium hydride, potassium hydride, and soda amide.

The polyolefin macromonomer (M3) having a styryl group at the terminal of the polyolefin chain $P^7$, represented by the general formula (VII), is thus produced.

The polar polymer chain having polyolefin side chains (A4) is a homopolymer of the polyolefin macromonomer (M1), (M2) or (M3) or a copolymer of the polyolefin macromonomer and at least one monomer (B) selected from organic compounds each having at least one carbon-carbon unsaturated bond.

The polar polymer chain having polyolefin side chains (A4) can be obtained through radical polymerization, anion polymerization or coordination polymerization by polymerizing the polyolefin macromonomer (M1), (M2) or (M3) alone or a mixture of the polyolefin macromonomer and at least one monomer (B) selected from organic compounds each having at least one carbon-carbon unsaturated bond.

The monomer (B) is selected from organic compounds each having at least one carbon-carbon unsaturated bond. The carbon-carbon unsaturated bond is a carbon-carbon double bond or a carbon-carbon triple bond. Examples of such organic compounds include (meth)acrylate monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth) acrylate, γ-(methacryloyloxypropyl) trimethoxy silane, (meth)acrylic acid/ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate, styrene monomers such as styrene, vinyl toluene, α-methylstyrene, chlorostyrene, styrenesulfonic acid and salts thereof, fluorine-containing vinyl monomers such as perfluoroethylene, perfluoropropylene and vinylidene fluoride, silicon-containing vinyl monomers such as vinyltrimethoxy silane and vinyltriethoxy silane, maleimide monomers such as maleic anhydride, maleic acid, monoalkyl and dialkyl maleates, fumaric acid, monoalkyl and dialkyl fumarates, maleimide, methyl maleimide, ethyl maleimide, propyl maleimide, butyl maleimide, hexyl maleimide, octyl maleimide, dodecyl maleimide, stearyl maleimide, phenyl maleimide and cyclohexyl maleimide, nitrile group-containing vinyl monomers such as acrylonitrile and methacrylonitrile, amide group-containing vinyl monomers such as (meth)acrylamide, N-methyl (meth)acrylamide, N-ethyl (meth)acrylamide, N-propyl (meth)acrylamide, N-isopropyl (meth)acrylamide and N-butyl (meth)acrylamide, vinyl ester monomers such as vinyl acetate, vinyl propionate, vinyl pivalate, vinyl benzoate and vinyl cinnamate, olefinic monomers such as ethylene, propylene and butene, diene monomers such as butadiene and isoprene, and vinyl chloride, vinylidene chloride, allyl chloride and allyl alcohol. These organic compounds may be used alone or in combination thereof.

[2] First Preferable Multi-Branched Polymer

The first preferable multi-branched polymer according to the present invention is a polymer containing a block structure or a graft structure represented by the general formula (II):

$$(P^2)(P^3)\text{—}X^1 \qquad (II)$$

wherein $P^2$ is the polar polymer chain having polyolefin side chains (A4) having a number-average molecular weight (Mn) of 500 to 1,000,000; $P^3$ is a polymer chain having a number-average molecular weight (Mn) of 500 to 1,000,000 selected from the polyolefin chain (A1), the polyolefin chain having polar polymer side chains (A2), the polar polymer chain (A3) and the polar polymer chain having polyolefin side chains (A4); and $P^2$ and $P^3$ may be the same or different.
$X^1$ is a linking group containing less than 200 atoms in total containing a group selected from an ester group, an amide group and an ether group, and examples thereof are shown below:
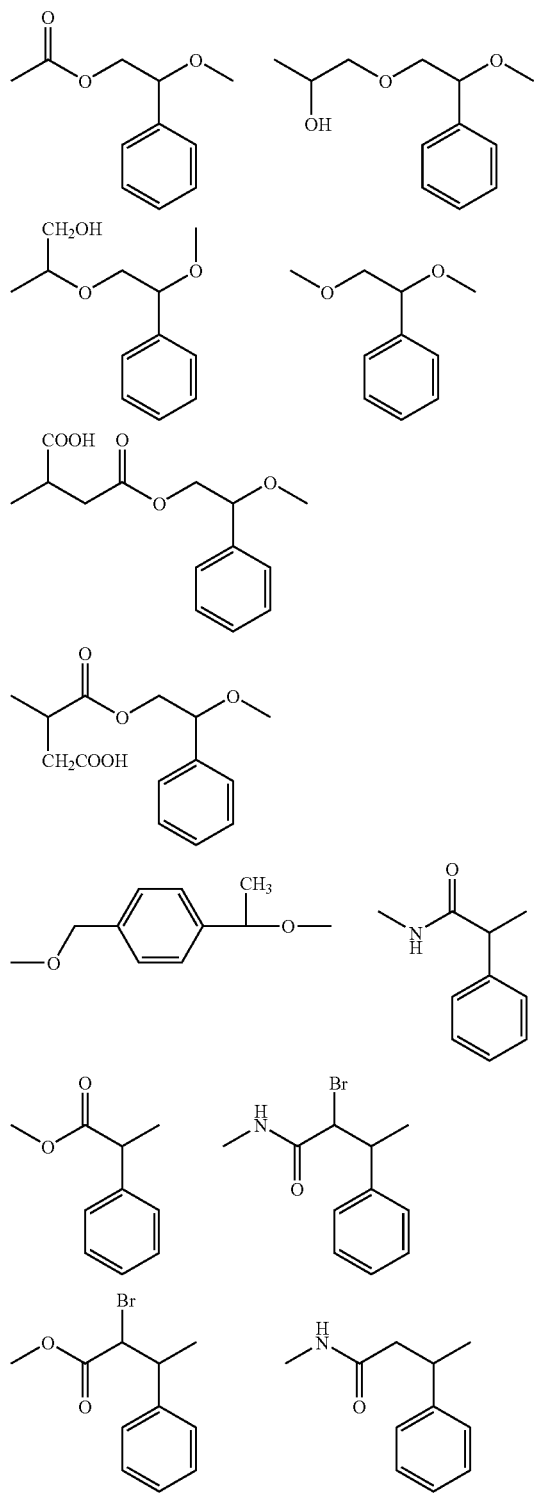
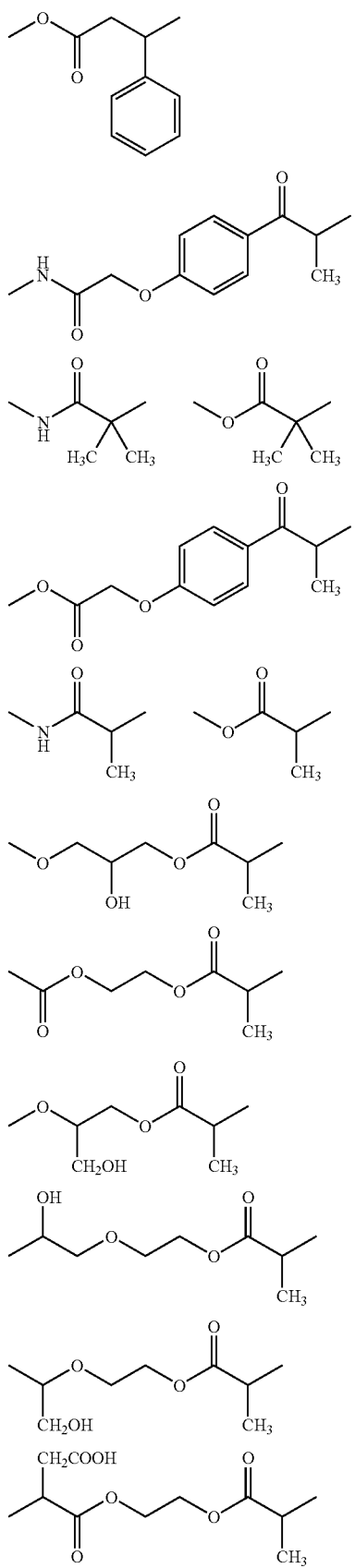

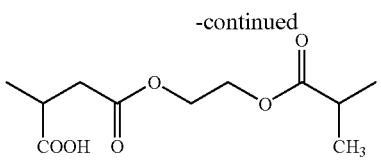

The combination of the polymer chains constituting the multi-branched polymer represented by the general formula (II) is for example as follows.

(1) The multi-branched polymer shown in FIG. 1-1 wherein $P^2$ is the polar polymer chain having polyolefin side chains (A4), and $P^3$ is the polyolefin chain (A1).

Figures 1, 2:
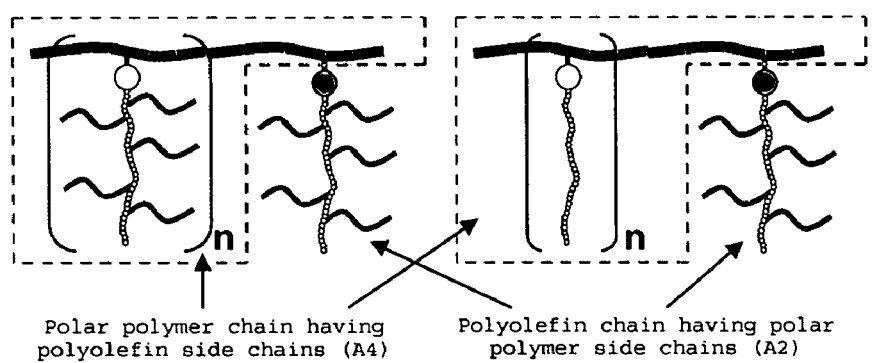

(2) The multi-branched polymer shown in FIG. 1-2 wherein $P^2$ is the polar polymer chain having polyolefin side chains (A4), and $P^3$ is the polyolefin chain having polar polymer side chains (A2).

Figures 1, 2, 3:
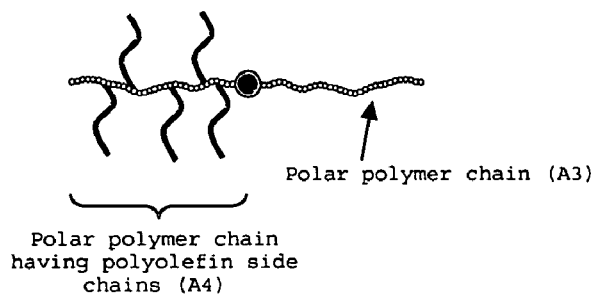

(3) The multi-branched polymer shown in FIG. 1-3 wherein $P^2$ is the polar polymer chain having polyolefin side chains (A4), and $P^3$ is the polar polymer chain (A3).

(4) The multi-branched polymer shown in FIG. 1-4 wherein $P^2$ is the polar polymer chain having polyolefin side chains (A4), and $P^3$ is the polar polymer chain having polyolefin side chains (A4).

Hereinafter, the process for producing the multi-branched polymer according to the present invention is described in more detail.

[2-1] Multi-Branched Polymer Wherein $P^2$ is the Polar Polymer Chain Having Polyolefin Side Chains (A4), and $P^3$ is the Polyolefin Chain (A1)

The multi-branched polymer represented by the general formula (II) wherein $P^2$ is the polar polymer chain having polyolefin side chains (A4) and $P^3$ is the polyolefin chain (A1), as shown in 1-1, is produced by successively conducting the following steps Q1, Q2 and Q3, for example.

<<Step Q1>> A step of producing the polyolefin having a functional group at the terminal thereof represented by the general formula (XVI):

$$P^8\text{—}X^4 \quad\quad\quad (XVI)$$

wherein $X^4$ is a group containing a functional group selected from a group containing the group 13 element in the periodic table, a hydroxyl group, an amino group, an epoxy group, a carboxyl group, an acid halide group, and an acid anhydride group, and $P^8$ is the same as the polyolefin chain (A1).

<<Step Q2>> A step of converting the functional group-containing group represented by $X^4$ in the general formula (XVI) into a group having an ability to initiate radical polymerization or anion polymerization.

<<Step Q3>> A step of producing the multi-branched polymer consisting of the polyolefin chain (A1) and the polar polymer chain having polyolefin side chains (A4) by homopolymerizing a macromonomer, or copolymerizing two or more macromonomers, selected from the polyolefin macromonomers (M1), (M2) and (M3) represented by the general formulae (V) to (VII) or by copolymerizing at least one macromonomer selected from (M1), (M2) and (M3) with at least one monomer (B) selected from organic compounds each having at least one carbon-carbon unsaturated bond, in the presence of the polyolefin having a group having an ability to initiate radical polymerization or anion polymerization as a polymerization initiator obtained in the step Q2.

Hereinafter, the process for producing the multi-branched polymer of the present invention is described in more detail by reference to the respective steps.

<<Step Q1>>

Step Q1 is a step of producing the polyolefin represented by the general formula (XVI), having at the terminal thereof a functional group-containing group selected from a group containing the group 13 element in the periodic table, a hydroxyl group, an amino group, an epoxy group, a carboxyl group, an acid halide group and an acid anhydride group. The polyolefin having a functional group-containing group at the terminal thereof is produced in the same manner as in producing e.g. the terminal-modified polyolefin represented by the general formula (XIII) and the functional group-containing polyolefin represented by the general formula (XV), but the present invention is not limited to such methods.

<<Step Q2>>

Step Q2 is a step of converting the terminal functional group in the polyolefin obtained in the step A1 into a group having an ability to initiate radical polymerization or anion polymerization. The group having an ability to initiate radical polymerization can be exemplified by for example a group having a nitroxide-containing group bound thereto and generating a radical by thermal cleavage, as disclosed in, for example, Chem. Rev., 101, 3661 (2001) and a group having a terminal halogen atom-containing group bound thereto and generating a radical upon addition of ruthenium, copper chloride or a complex having such transition metal atom, and a group having an azo-containing group or oxygen-oxygen bond-containing group bound thereto and generating a radical by thermal cleavage, as disclosed in Chem. Rev., 101, 2921 (2001) and Chem. Rev., 101, 3689 (2001).

The method of converting the terminal functional group contained in the polyolefin represented by the general formula (XVI) into a group having an ability to initiate radical polymerization includes a method that involves reacting compound (F) having both a group having an ability to initiate radical polymerization and a functional group capable of reacting with the terminal functional group contained in the polyolefin represented by the general formula (XVI), with the polyolefin having a functional group at the terminal thereof represented by the general formula (XVI).

Examples of the compound (F) having both a group having an ability to initiate radical polymerization and a functional group capable of reacting with the terminal functional group contained in the polyolefin represented by the general formula (XVI) can be exemplified by the following compounds:

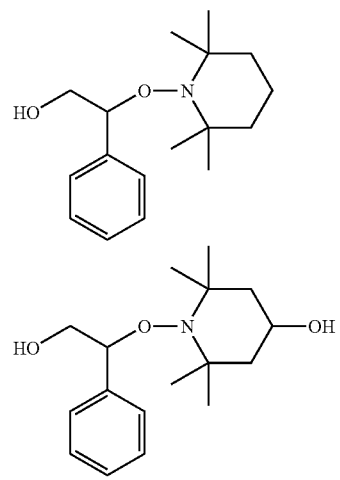

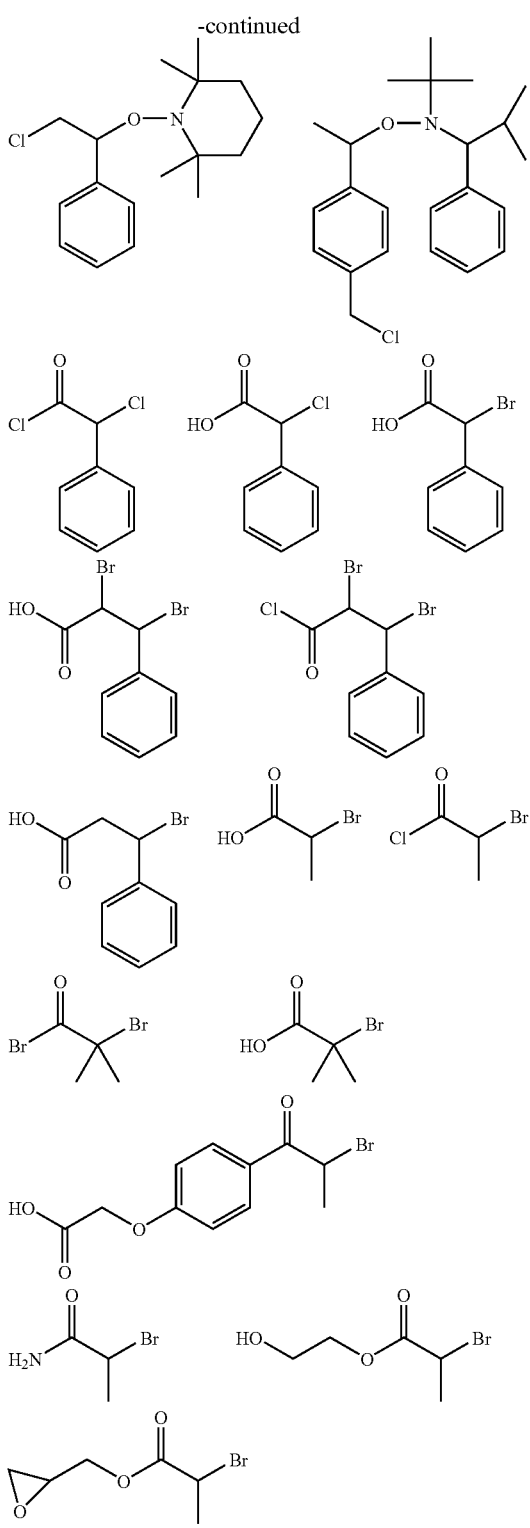

Examples of the compound (F) include functional group-containing azo compounds such as 2,2'-azobis(2-cyanopropanol), 3,3'-azobis(3-cyanobutanol), 4,4'-azobis(4-cyanopentanol), 5,5'-azobis(5-cyanohexanol), 6,6'-azobis(6-cyanoheptanol), 7,7'-azobis(7-cyanooctanol), 4,4'-azobis(4-cyanopentanoic acid), 5,5'-azobis(5-cyanohexanoic acid), 6,6'-azobis(6-cyanoheptanoic acid), 7,7'-azobis(7-cyanooctanoic acid), 4,4'-azobis(4-cyanopentanoic acid chloride), 5,5'-azobis(5-cyanohexanoic acid chloride), 6,6'-azobis(6-cyanoheptanoic acid chloride) and 7,7'-azobis(7-cyanooctanoic acid chloride).

In addition to the method of conversion by reaction with these compounds, a method disclosed in for example Prog. Polym. Sci., 27, 39 (2002) can be used to convert the terminal functional group into a functional group having an ability to initiate radical polymerization. That is, the polyolefin having a group containing the group 13 element in the periodic table can be oxidized to introduce an oxygen-oxygen bond having an ability to initiate radical polymerization into between the group 13 element in the periodic table and a carbon atom. The oxygen-oxygen bond thus obtained is thermally homocleaved to function as a radical polymerization initiator.

The method of converting the terminal functional group of the polyolefin represented by the general formula (XVI) into a compound having an ability to initiate anion polymerization includes, for example, a method that involves reacting a polyolefin having a hydroxyl group at the terminal thereof with an alkali metal such as metal lithium or metal potassium, an alkali metal hydride such as lithium hydride or potassium hydride, or an alkyl aluminum compound such as trimethyl aluminum, triethyl aluminum or triisobutyl aluminum thereby converting the polyolefin into a metal alkoxide-containing polyolefin.

When the amount of the compound (F) having both a group having an ability to initiate radical polymerization and a functional group capable of reacting with the terminal functional group contained in the polyolefin represented by the general formula (XVI), relevant to the terminal functional group contained in the polyolefin represented by the general formula (XVI), is too low in conversion of the terminal functional group contained in the polyolefin represented by the general formula (XVI) into a group having an ability to initiate radical polymerization or anion polymerization, the degree of conversion of the terminal functional group contained in the polyolefin is decreased, and thus the yield of the multi-branched polymer obtained in the step Q3 is lowered, while when the amount of the compound (F) is too high, the unreacted compound (F) remains, and a homopolymer may be produced as a byproduct in the step A3, and thus the molar ratio thereof to the terminal functional group contained in the polyolefin represented by the general formula (XVI) is usually 0.1 to 100, preferably 0.3 to 50, and more preferably 0.5 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These solvents can be used alone or as a mixture thereof.

The reaction of the polyolefin having a functional group at the terminal thereof represented by the general formula (XVI) with the compound (F) is carried out preferably in the presence of a condensation agent and a basic catalyst, depending on the type of the functional group participating in the reaction.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

Examples of the basic catalyst include organic amines such as triethylamine, diisopropyl ethyl amine, N,N-dimethyl aniline, piperidine, pyridine, 4-dimethyl aminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride and n-butyl lithium.

The reaction temperature is usually −100° C. to 200° C., preferably −50° C. to 150° C. The reaction is varied depending on the reaction temperature and the type and amount of the compound (C) and the polyolefin having a functional group, but is usually 1 to 48 hours.

When the polyolefin having a functional group represented by the general formula (XVI) and the compound (F) wherein the functional group is a carboxyl group are used, the polymer can be produced by reacting it with e.g. phosphorus pentachloride or thionyl chloride to form the corresponding acid chloride compound and then reacting the resulting compound with the corresponding compound (F) or the polyolefin having a functional group represented by the general formula (XVI) in a suitable solvent and a base.

Step Q3 is a step of polymerizing a graft polymer chain from the terminal of polyolefin by homopolymerizing a macromonomer, or copolymerizing two or more macromonomers, selected from the polyolefin macromonomers (M1), (M2) and (M3) represented by the general formulae (V) to (VII) or by copolymerizing at least one macromonomer selected from (M1), (M2) and (M3) with at least one monomer (B) selected from organic compounds each having at least one carbon-carbon unsaturated bond, by using as a macroinitiator the polyolefin having a functional group having an ability to initiate radical polymerization or anion polymerization obtained in the steps Q1 and Q2.

In the presence of the polyolefin initiator having an ability to initiate radical polymerization or anion polymerization obtained in the steps Q1 and Q2, the multi-branched polymer according to the present invention is produced by polymerizing a single macromonomer or two or more macromonomers selected from the polyolefin macromonomers (M1), (M2) and (M3) or by copolymerizing at least one macromonomer selected from (M1), (M2) and (M3) with the at least one monomer (B) selected from organic compounds each having at least one carbon-carbon unsaturated bond.

The radical polymerization according to the present invention is carried out if necessary in the presence of a catalyst. Examples of the catalyst include CuBr, CuCl, RuCl, RuCl$_2$, FeCl, FeCl$_2$ etc. When the catalyst is used, the amount of the catalyst used is varied depending on the amount of the terminal group which is present at the terminal of the polyolefin and has an ability to initiate radical polymerization, but is usually 0.1 to 100 equivalents, preferably 0.5 to 50 equivalents, relative to the amount of the terminal group having an ability to initiate radical polymerization. Coordinating fatty amines or aromatic amines may be added to increase the solubility of the catalyst in the reaction system, or alkoxy aluminum may be added as a reaction accelerator.

The solvent usable in radical polymerization may be any solvent insofar as the reaction is not inhibited, and examples thereof include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbon solvents such as chlorobenzene, dichlorobenzene, trichlorobenzene, methylene chloride, chloroform, carbon tetrachloride and tetrachloroethylene, alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxy anisole. Suspension polymerization or emulsion polymerization can be carried out using water as the solvent. These solvents may be used alone or as a mixture of two or more thereof. By using these solvents, the reaction solution preferably becomes a uniform phase, but may become a plurality of heterogeneous phases.

The reaction temperature may be any temperature at which the radical polymerization reaction proceeds, and varied depending on the degree of polymerization of the desired polymer, the type and amount of the radical polymerization initiator and solvent used, but the reaction temperature is usually −100° C. to 250° C., preferably −50° C. to 180° C., and still more preferably 0° C. to 160° C. The reaction can be carried out under reduced pressure, at normal pressures or under pressure depending on the case. The polymerization reaction is conducted preferably in an inert gas atmosphere such as nitrogen or argon.

The solvent usable in anion polymerization includes, for example, aliphatic hydrocarbons such as hexane and heptane, alicyclic hydrocarbons such as cyclopentane and cyclohexane, aromatic hydrocarbons such as benzene and toluene, and ether solvents such as diethyl ether, dioxane, tetrahydrofuran (THF), monogrime and digrime. These solvents can be used alone or in combination of two or more thereof. In particular, aromatic hydrocarbons and ether solvents are preferably used. The polymerization is carried out usually at a temperature of −100° C. to 100° C., preferably −80° C. to 80° C., more preferably −70° C. to 70° C. and for 1 minute to 500 hours, preferably 10 minutes to 300 hours, more preferably 15 minutes to 150 hours.

The multi-branched polymer of the present invention represented by the general formula (II) wherein $P^2$ is the polar polymer chain having polyolefin side chains (A4) and $P^3$ is the polyolefin chain (A1), as shown in FIG. 1-1, is produced by conducting the steps Q1 to Q3 successively.

Alternatively, the multi-branched polymer represented by the general formula (II) wherein $P^2$ is the polar polymer chain having polyolefin side chains (A4) and $P^3$ is the polyolefin chain (A1), as shown in FIG. 1-1, can also be produced by conducting the following steps Q4, Q5 and Q6 successively.

<<Step Q4>> A step of producing the polyolefin having a functional group at the terminal thereof represented by the general formula (XVI).

<<Step Q5>> A step of producing the polar polymer having both a functional group at the terminal thereof and polyolefin side chains represented by the following general formula (XVII):

$$P^9\text{—}X^5 \qquad (XVII)$$

wherein $X^5$ is a heteroatom or a heteroatom-containing group, and $P^9$ is the polar polymer chain having polyolefin side chains (A4).

<<Step Q6>> A step of binding the polyolefin having a functional group at the terminal thereof represented by the general formula (XVI), to the polar polymer having both a functional group at the terminal thereof and polyolefin side chains represented by the general formula (XVII).

Hereinafter, the process for producing the multi-branched polymer of the present invention is described in detail by reference to the respective steps.

<<Step Q4>>

Step Q4 can make use of the same method as in the step Q1.

<<Step Q5>>

Step Q5 is a step of producing the polar polymer having both a functional group at the terminal thereof and polyolefin side chains. This polymer is produced by homopolymerizing a macromonomer, or copolymerizing two or more macromonomers, selected from the polyolefin macromonomers (M1), (M2) and (M3) used in the step Q3, or by copolymerizing at least one macromonomer selected from (M1), (M2) and (M3) with at least one monomer (B) selected from organic compounds each having at least one carbon-carbon unsaturated bond, in the presence of the compound (F) used as an initiator in the step Q2, having both a group having an ability to initiate radical polymerization and a functional group capable of reacting with the terminal functional group contained in the polyolefin represented by the general formula (XVI). The resulting polar polymer having polyolefin side chains represented by the general formula (XVII) has an initiator-derived functional group at the terminal thereof.

<<Step Q6>>

Step Q6 is a step of coupling reaction of the polyolefin having a functional group at the terminal thereof obtained in the step Q4, with the polar polymer having both a functional group at the terminal thereof and polyolefin side chains obtained in the step Q5. To conduct this step, the combination of the functional group $X^4$ contained in the polyolefin represented by the general formula (XVI) and the terminal functional group $X^5$ contained in the polar polymer having polyolefin side chains represented by the general formula (XVII) includes, but is not limited, to the following combinations:

(1) The polyolefin having a functional group at the terminal thereof represented by the general formula (XVI) wherein $X^4$ is a carboxyl-containing group, and the polar polymer having both a functional group at the terminal thereof and polyolefin side chains represented by the general formula (XVII) wherein $X^5$ is a hydroxyl-containing group.

(2) The polyolefin having a functional group at the terminal thereof represented by the general formula (XVI) wherein $X^4$ is a carboxyl-containing group, and the polar polymer having both a functional group at the terminal thereof and polyolefin side chains represented by the general formula (XVII) wherein $X^5$ is an amino-containing group.

(3) The polyolefin having a functional group at the terminal thereof represented by the general formula (XVI) wherein $X^4$ is a hydroxyl-containing group, and the polar polymer having both a functional group at the terminal thereof and polyolefin side chains represented by the general formula (XVII) wherein $X^5$ is an epoxy-containing group.

(4) The polyolefin having a functional group at the terminal thereof represented by the general formula (XVI) wherein $X^4$ is a hydroxyl-containing group, and the polar polymer having both a functional group at the terminal thereof and polyolefin side chains represented by the general formula (XVII) wherein $X^5$ is a carboxyl-containing group.

(5) The polyolefin having a functional group at the terminal thereof represented by the general formula (XVI) wherein $X^4$ is a hydroxyl-containing group, and the polar polymer having both a functional group at the terminal thereof and polyolefin side chains represented by the general formula (XVII) wherein $X^5$ is an acid halide-containing group.

(6) The polyolefin having a functional group at the terminal thereof represented by the general formula (XVI) wherein $X^4$ is an acid halide-containing group, and the polar polymer having both a functional group at the terminal thereof and polyolefin side chains represented by the general formula (XVII) wherein $X^5$ is a hydroxyl-containing group.

(7) The polyolefin having a functional group at the terminal thereof represented by the general formula (XVI) wherein $X^4$ is an acid halide-containing group, and the polar polymer having both a functional group at the terminal thereof and polyolefin side chains represented by the general formula (XVII) wherein $X^5$ is an amino-containing group.

(8) The polyolefin having a functional group at the terminal thereof represented by the general formula (XVI) wherein $X^4$ is a hydroxyl-containing group, and the polar polymer having both a functional group at the terminal thereof and polyolefin side chains represented by the general formula (XVII) wherein $X^5$ is a halogen-containing group.

(9) The polyolefin having a functional group at the terminal thereof represented by the general formula (XVI) wherein $X^4$ is an epoxy-containing group, and the polar polymer having both a functional group at the terminal thereof and polyolefin side chains represented by the general formula (XVII) wherein $X^5$ is a hydroxyl-containing group.

(10) The polyolefin having a functional group at the terminal thereof represented by the general formula (XVI) wherein $X^4$ is an amino-containing group, and the polar polymer having both a functional group at the terminal thereof and polyolefin side chains represented by the general formula (XVII) wherein $X^5$ is a carboxyl-containing group.

(11) The polyolefin having a functional group at the terminal thereof represented by the general formula (XVI) wherein $X^4$ is an amino-containing group, and the polar polymer having both a functional group at the terminal thereof and polyolefin side chains represented by the general formula (XVII) wherein $X^5$ is an acid halide-containing group.

The reactions conditions such as the reaction solvent, reaction temperature, reaction time, and condensation agent and basic catalyst used in the reaction of the polyolefin having a functional group at the terminal thereof represented by the general formula (XVI), with the polar polymer having both a functional group at the terminal thereof and polyolefin side chains represented by the general formula (XVII), can be the same conditions as in reaction of the polyolefin having a functional group at the terminal thereof represented by the general formula (XVI) with the compound (F) in the above step A2 in conversion into a group having an ability to radical polymerization or anion polymerization.

The multi-branched polymer represented by the general formula (II) wherein $P^2$ is the polar polymer chain having polyolefin side chains (A4) and $P^3$ is the polyolefin chain (A1), as shown in FIG. 1, is produced by conducting the steps Q4 to Q6 successively.

The multi-branched polymer formed by the method described above is isolated by distilling away the solvent used in the polymerization or the unreacted monomer or by using a known method such as re-precipitation with a non-solvent.

[2-2] Multi-Branched Polymer Wherein $P^2$ is the Polar Polymer Chain Having Polyolefin Side Chains (A4) and $P^3$ is the Polyolefin Chain Having Polar Polymer Side Chains (A2)

The multi-branched polymer represented by the general formula (II) wherein $P^2$ is the polar polymer chain having polyolefin side chains (A4) and $P^3$ is the polyolefin chain having polar polymer side chains (A2), as shown in FIG. 1-2, is produced, for example, by conducting the following steps B1, B2 and B3 successively.

<<Step B1>> A step of synthesizing a functional group-containing olefin polymer containing two or more functional groups selected from a group containing the group 13 element in the periodic table, a hydroxyl group, an amino group, an epoxy group, a carboxyl group, an acid halide group and an acid anhydride group.

<<Step B2>> A step of converting the functional groups contained in the olefin polymer obtained in the step B1 into groups having an ability to initiate radical polymerization or anion polymerization.

<<Step B3>> A step of producing a graft polymer by homopolymerizing a macromonomer, or copolymerizing two or more macromonomers, selected from the polyolefin macromonomers (M1), (M2) and (M3) represented by the general formulae (V) to (VII), or by copolymerizing at least one macromonomer selected from (M1), (M2) and (M3) with at least one monomer (B) selected from organic compounds each having at least one carbon-carbon unsaturated bond, by using as a polymerization initiator the olefin polymer having groups having an ability to initiate radical polymerization or anion polymerization obtained in the step B2.

Hereinafter, a preferable example of the process for producing the multi-branched polymer of the present invention is described by reference to the respective steps.

<<Step B1>>

Step B1 is a step of producing the olefin polymer (G) having two or more functional groups selected from a group containing the group 13 element in the periodic table, a hydroxyl group, an amino group, an epoxy group, a carboxyl group, an acid halide group and an acid anhydride group.

The olefin polymer having functional groups (G) can be produced by copolymerizing an olefin represented by $CH_2=CHR^9$ with an olefin having a functional group in the presence of a known olefin polymerization catalyst such as a Ziegler-Natta catalyst or a metallocene catalyst. $R^9$ is a group or an atom selected from a $C_{1-20}$ hydrocarbon group, a hydrogen atom and a halogen atom.

Examples of the olefin represented by $CH_2=CHR^9$ include ethylene, propylene, butene, pentene, hexene, octene, decene etc.

The olefin having a functional group used in copolymerization includes unsaturated alcohols having a liner hydrocarbon moiety, such as allyl alcohol, 4-penten-1-ol, 5-hexen-1-ol, 6-hepten-1-ol, 8-nonen-1-ol and 10-undecen-1-ol, unsaturated carboxylic acids such as 5-hexenoic acid, 6-heptenoic acid, 7-octenoic acid, 8-nonenoic acid and 9-decenoicacid, unsaturated amines such as allylamine, 5-hexene amine and 6-hepteneamine, (2,7-octadienyl)succinic anhydride, pentapropenyl succinic anhydride, unsaturated acid anhydrides wherein in the above unsaturated carboxylic acids, carboxylic acid groups are replaced by carboxylic anhydride groups, unsaturated carboxylic acid halides wherein in the above unsaturated carboxylic acids, carboxylic acid groups are replaced by carboxylic acid halides, unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene and 11-epoxy-1-undecene, and unsaturated boron compounds such as 9-allyl-9-borabicyclo[3.3.1]nonane, 9-but-3-enyl-9-borabicyclo[3.3.1]nonane, 9-pent-4-enyl-9-borabicyclo[3.3.1]nonane, 9-hex-5-enyl-9-borabicyclo[3.3.1]nonane, 9-hept-6-enyl-9-borabicyclo[3.3.1]nonane, 9-oct-7-enyl-9-borabicyclo[3.3.1]nonane, 9-non-8-enyl-9-borabicyclo[3.3.1]nonane, and 9-dec-9-enyl-9-borabicyclo[3.3.1]nonane.

<<Step B2>>

Step B2 is a step of converting the functional groups in the olefin polymer having functional groups (G) obtained in the step B1 into groups having an ability to initiate radical polymerization or anion polymerization. The group having an ability to initiate radical polymerization is exemplified by, for example, a group having a nitroxide-containing group bound thereto and generating a radical by thermal cleavage, as disclosed in Chem. Rev., 101, 3661 (2001), and a group having a terminal halogen atom bound thereto and generating a radical upon addition of ruthenium, copper chloride or a complex having such transition metal atom, as disclosed in Chem. Rev., 101, 2921 (2001) and Chem. Rev., 101, 3689 (2001).

The method of converting the terminal functional groups contained in the olefin polymer having functional groups (G) into groups having an ability to initiate radical polymerization includes a method that involves reacting a compound (H) having both a group having an ability to initiate radical polymerization and a functional group capable of reacting with the functional group contained in the olefin polymer having functional groups (G), with the olefin polymer having functional groups (G).

The compound (H) having both a group having an ability to initiate radical polymerization and a functional group capable of reacting with the functional group contained in the olefin polymer having functional groups (G) can be exemplified by the same compound as the above-mentioned compound (F).

The method of converting the functional group of the olefin polymer having functional groups (G) into a compound having an ability to initiate anion polymerization includes, for example, a method that involves reacting an olefin polymer having a hydroxyl group with an alkali metal such as metal lithium or metal potassium, an alkali metal hydride such as lithium hydride or potassium hydride, or an alkyl aluminum compound such as trimethyl aluminum, triethyl aluminum, triisobutyl aluminum or trihexyl aluminum thereby converting it into a metal alkoxide-containing olefin polymer.

When the amount of the compound (H) having both a group having an ability to initiate radical polymerization and a functional group capable of reacting with the functional group contained in the olefin polymer containing functional groups (G), relevant to the functional group contained in the olefin polymer containing functional groups (G), is too low in conversion of the functional group contained in the olefin polymer having functional groups (G) into a group having an ability to initiate radical polymerization or anion polymerization, the degree of conversion of the functional groups contained in the olefin polymer having functional groups (G) is decreased, and thus the yield of the multi-branched polymer obtained in the step B3 is lowered, while when the amount of the compound (H) is too high, the unreacted compound (H) remains, and a homopolymer may be produced as a byproduct in the step B3. Accordingly, the molar ratio of the compound (H) to the functional group contained in the olefin polymer having functional groups (G) is usually 0.1 to 100, preferably 0.3 to 50, and more preferably 0.5 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These solvents can be used alone or as a suitable mixture thereof.

The reaction of the olefin polymer having functional groups (G) with the compound (H) is carried out preferably in the presence of a condensation agent and a basic catalyst, depending on the type of the functional group participating in the reaction.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

Examples of the basic catalyst include organic amines such as triethylamine, diisopropyl ethyl amine, N,N-dimethyl aniline, piperidine, pyridine, 4-dimethyl aminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride and n-butyl lithium.

The reaction temperature is usually −100° C. to 200° C., preferably −50° C. to 150° C. The reaction time is varied depending on the reaction temperature and the type and amount of the compound (H) and the olefin polymer having functional groups (G), but is usually 1 to 48 hours.

When the olefin polymer having functional groups (G) wherein the functional groups are carboxyl group is used, the olefin polymer is reacted first with e.g. phosphorus pentaoxide or thienyl chloride to convert it into the corresponding acid chloride compound which is then reacted with the compound (H) in the presence of a base in a suitable solvent.

<<Step B3>>

Step 3 is a step of giving a polar polymer chain having polyolefin side chains to the olefin polymer having functional groups having an ability to initiate radical polymerization or anion polymerization obtained in the step B2 by homopolymerizing a macromonomer, or copolymerizing two or more macromonomers, selected from the polyolefin macromonomers (M1), (M2) and (M3) represented by the general formulae (V) to (VII) or by copolymerizing at least one macromonomer selected from (M1), (M2) and (M3) with the at least one monomer (B) selected from organic compounds each having at least one carbon-carbon unsaturated bond, by using as a macroinitiator the olefin polymer having functional groups having an ability to initiate radical polymerization or anion polymerization obtained in the steps B1 and B2.

The multi-branched polymer according to the present invention is produced by homopolymerizing the polyolefin macromonomer (M1), (M2) or (M3) or copolymerizing two or more polyolefin macromonomers (M1), (M2) and (M3) or by copolymerizing at least one macromonomer selected from (M1), (M2) and (M3) with the at least one monomer (B) selected from organic compounds each having at least one carbon-carbon unsaturated bond in the presence of the olefin polymer having functional groups having an ability to initiate radical polymerization or anion polymerization obtained in steps B1 and B2. Preferable polymerization conditions used herein are the same as in the step A3.

The multi-branched polymer of the present invention represented by the general formula (II) wherein $P^2$ is the polar polymer chain having polyolefin side chains (A4) and $P^3$ is the polyolefin chain having polar polymer side chains (A2), as shown in FIG. 2, is produced by conducting the steps B1 to B3 successively.

Further, the multi-branched polymer of the present invention represented by the general formula (II) wherein $P^2$ is the polar polymer chain having polyolefin side chains (A4) and $P^3$ is the polyolefin chain having polar polymer side chains (A2), as shown in FIG. 1-2, can also be produced by conducting e.g. the following steps B4, B5 and B6 successively.

<<Step B4>> A step of synthesizing the functional group-containing olefin polymer (G) containing two or more functional groups selected from a group containing the group 13 element in the periodic table, a hydroxyl group, an amino group, an epoxy group, a carboxyl group, an acid halide group and an acid anhydride group.

<<Step B5>> A step of producing the polar polymer having both a functional group at the terminal thereof and polyolefin side chains represented by the general formula (XVII).

<<Step B6>> A step of binding the functional group-containing olefin polymer (G) obtained in the step B4 to the polar polymer having both a functional group at the terminal thereof and polyolefin side chains represented by the general formula (XVII).

Hereinafter, a preferable example of the process for producing the multi-branched polymer of the present invention is described by reference to the respective steps.

<<Step B4>>

Step B4 can make use of the same method as in the step B1.

<<Step B5>>

Step B5 is a step of producing the polar polymer having both a functional group at the terminal thereof and polyolefin side chains. This polymer can be produced by e.g. the same method as in the step A5. The resulting polar polymer having polyolefin side chains represented by the general formula (XVII) has an initiator-derived functional group at the terminal thereof.

<<Step B6>>

Step B6 is a step of coupling reaction of the functional group-containing olefin polymer (G) obtained in the step B4 with the polar polymer having both a functional group at the terminal thereof and polyolefin side chains represented by the general formula (XVII) obtained in the step B5. To conduct this step, the combination of the functional group contained in the functional group-containing olefin polymer (G) and the terminal functional group $X^5$ contained in the polymer represented by the general formula (XVII) includes, but is not limited, to the following combinations:

(1) The functional group-containing olefin polymer (G) having a carboxyl group as the functional group, and the polar polymer having both a functional group at the terminal thereof and polyolefin side chains represented by the general formula (XVII) wherein $X^5$ is a hydroxyl-containing group.

(2) The functional group-containing olefin polymer (G) having a carboxyl group as the functional group, and the polar polymer having both a functional group at the terminal thereof and polyolefin side chains represented by the general formula (XVII) wherein $X^5$ is an amino-containing group.

(3) The functional group-containing olefin polymer (G) having a hydroxyl group as the functional group, and the polar polymer having both a functional group at the terminal thereof and polyolefin side chains represented by the general formula (XVII) wherein $X^5$ is an epoxy-containing group.

(4) The functional group-containing olefin polymer (G) having a hydroxyl group as the functional group, and the polar polymer having both a functional group at the terminal thereof and polyolefin side chains represented by the general formula (XVII) wherein $X^5$ is a carboxyl-containing group.

(5) The functional group-containing olefin polymer (G) having a hydroxyl group as the functional group, and the polar polymer having both a functional group at the terminal thereof and polyolefin side chains represented by the general formula (XVII) wherein $X^5$ is an acid halide-containing group.

(6) The functional group-containing olefin polymer (G) having an acid halide group as the functional group, and the polar polymer having both a functional group at the terminal thereof and polyolefin side chains represented by the general formula (XVII) wherein $X^5$ is a hydroxyl-containing group.

(7) The functional group-containing olefin polymer (G) having an acid halide group as the functional group, and the polar polymer having both a functional group at the terminal thereof and polyolefin side chains represented by the general formula (XVII) wherein $X^5$ is an amino-containing group.

(8) The functional group-containing olefin polymer (G) having a hydroxyl group as the functional group, and the polar polymer having both a functional group at the terminal thereof and polyolefin side chains represented by the general formula (XVII) wherein $X^5$ is a halogen-containing group.

(9) The functional group-containing olefin polymer (G) having an epoxy group as the functional group, and the polar polymer having both a functional group at the terminal thereof and polyolefin side chains represented by the general formula (XVII) wherein $X^5$ is a hydroxyl-containing group.

(10) The functional group-containing olefin polymer (G) having an amino group as the functional group, and the polar polymer having both a functional group at the terminal thereof and polyolefin side chains represented by the general formula (XVII) wherein $X^5$ is a carboxyl-containing group.

(11) The functional group-containing olefin polymer (G) having an amino group as the functional group, and the polar polymer having both a functional group at the terminal thereof and polyolefin side chains represented by the general formula (XVII) wherein $X^5$ is an acid halide-containing group.

The reactions conditions such as the reaction solvent, reaction temperature, reaction time, and condensation agent and basic catalyst used in the reaction of the functional group-containing olefin polymer (G) with the polar polymer having both a functional group at the terminal thereof and polyolefin side chains represented by the general formula (XVII) can be the same conditions as in the step B2 of reacting the functional group-containing olefin polymer (G) with the compound (H) to convert the functional group into a group having an ability to initiate radical polymerization or anion polymerization.

The multi-branched polymer of the present invention represented by the general formula (II) wherein $P^2$ is the polar polymer chain having polyolefin side chains (A4) and $P^3$ is the polyolefin chain having polar polymer side chains (A2), as shown in FIG. 2, is produced by conducting the steps B4 to B6 successively.

The polymer formed by the method described above is isolated by distilling away the solvent used in the polymerization or the unreacted monomer or by using a known method such as re-precipitation with a non-solvent.

[2-3] Multi-Branched Polymer Wherein $P^2$ is the Polar Polymer Chain Having Polyolefin Side Chains (A4) and $P^3$ is the Polar Polymer Chain (A3)

The multi-branched polymer represented by the general formula (II) wherein $P^2$ is the polar polymer chain having polyolefin side chains (A4) and $P^3$ is the polar polymer chain (A3), as shown in FIG. 1-3, is produced preferably by any one of the following processes:

<<Process a>> a process that involves polymerizing the polar polymer chain having polyolefin side chains (A4) and then polymerizing the polar polymer chain (A3);

<<Process b>> a process that involves polymerizing the polar polymer chain (A3) and then polymerizing the polar polymer chain having polyolefin side chains (A4); and <<Process c>> a process that involves polymerizing the polar polymer chain having polyolefin side chains (A4) and the polar polymer chain (A3) separately and then coupling both the segments.

Hereinafter, these methods are described.

<<Process a>>

A process that involves polymerizing the polar polymer chain having polyolefin side chains (A4) and then polymerizing the polar polymer chain (A3).

[Process for Producing the Polar Polymer Chain Having Polyolefin Side Chains (A4)]

The polar polymer chain having polyolefin side chains (A4) is produced by homopolymerizing a macromonomer, or copolymerizing two or more macromonomers, selected from the polyolefin macromonomers (M1), (M2) and (M3) represented by the general formulae (V) to (VII), or by copolymerizing at least one macromonomer selected from (M1), (M2) and (M3) with the at least one monomer (B) selected from organic compounds each having at least one carbon-carbon unsaturated bond.

In the radical polymerization, use can be made of an initiator used generally as a living radical polymerization initiator such as an initiator having a nitroxide-containing group and generating a radical by thermal cleavage, as disclosed in, for example, Chem. Rev., 101, 3661 (2001), and an initiator containing a group having a terminal halogen atom and generating a radical upon addition of ruthenium, copper chloride or a complex having such transition metal atom, as disclosed in Chem. Rev., 101, 2921 (2001) and Chem. Rev., 101, 3689 (2001). Examples of such initiators include adducts between a peroxide such as benzoyl peroxide or dicumyl peroxide and a nitroxyl compound such as 2,2,6,6-tetramethylpiperidine-1-oxyl (TEMPO) or 4-oxo-TEMPO, haloalkanes such as carbon tetrachloride and chloroform, haloketones such as trichloroacetone and dichloromethyl phenyl ketone, haloesters such as methyl trichloroacetate, methyl dichloroacetate, ethyl 2-chloroisobutyrate, ethyl 2-bromoisobutyrate, ethyl 2-chloropropionate and ethyl 2-bromopropionate, haloalkyl benzenes such as chlorophenyl ethane, bromophenyl ethane and benzyl chloride, and sulfonic acid halides such as benzene sulfonic acid chloride, toluene sulfonic acid chloride and methyl sulfonic acid chloride.

The radical polymerization according to the present invention is carried out if necessary in the presence of a catalyst. Examples of the catalyst include CuBr, CuCl, RuCl, $RuCl_2$, FeCl, $FeCl_2$ etc. When the catalyst is used, the amount of the catalyst used is varied depending on the amount of the terminal group present at the terminal of the polyolefin and having an ability to initiate radical polymerization, and the amount of the catalyst is usually 0.1 to 100 equivalents, preferably 0.5 to 50 equivalents, relative to the amount of the terminal group having an ability to initiate radical polymerization. Coordinating fatty amines or aromatic amines may be added to increase the solubility of the catalyst in the reaction system, or alkoxy aluminum may be added as a reaction accelerator.

The usable solvent may be any solvent insofar as the reaction is not inhibited. Examples thereof include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbon solvents such as chlorobenzene, dichlorobenzene, trichlorobenzene, methylene chloride, chloroform, carbon tetrachloride and tetrachloroethylene, alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxy anisole. Suspension polymerization or emulsion polymerization can be carried out using water as the solvent. These solvents may be used alone or as a mixture of two or more thereof. By using these solvents, the reaction solution preferably becomes a uniform phase, but may become a plurality of heterogeneous phases.

The reaction temperature may be any temperature at which the polymerization reaction proceeds, and varied depending on the degree of polymerization of the desired polymer, the type and amount of the radical polymerization initiator and solvent used, but the reaction temperature is usually −100° C. to 250° C., preferably −50° C. to 180° C., and still more preferably 0° C. to 160° C. The reaction can be carried out under reduced pressure, at normal pressures or under pressure depending on the case. The polymerization reaction is conducted preferably in an inert gas atmosphere such as nitrogen or argon.

The thus obtained polar polymer chain having polyolefin side chains (A4) contains, at the terminal thereof, a halogen atom and a nitroxide compound derived from the initiator, and can thus serve as a macroinitiator to extend the polymer chain in subsequent radical polymerization.

As the anion polymerization initiator in anion polymerization, any initiators used in usual anion polymerization can be used, and use can be made of organolithium compounds such as, for example, butyl lithium, propyl lithium, ethyl lithium and methyl lithium, Grignard reagent etc.

The usable solvent includes, for example, aliphatic hydrocarbons such as hexane and heptane, alicyclic hydrocarbons such as cyclopentane and cyclohexane, aromatic hydrocarbons such as benzene and toluene, and ether solvents such as diethyl ether, dioxane, tetrahydrofuran (THF), monogrime and digrime. These solvents can be used alone or in combination of two or more thereof. In particular, aromatic hydrocarbons and ether solvents are preferably used. The polymerization is carried out usually at a temperature of −100° C. to 100° C., preferably −80° C. to 80° C., more preferably −70° C. to 70° C. and for 1 minute to 500 hours, preferably 10 minutes to 300 hours, more preferably 15 minutes to 150 hours.

The thus obtained polar polymer chain having polyolefin side chains (A4) contains, at the terminal thereof, a lithium atom etc. derived from the polymerization initiator, and can thus serve as a macroinitiator to extend the polymer chain in subsequent anion polymerization.

[Process for Producing the Multi-Branched Polymer]

The thus obtained polar polymer chain having polyolefin side chains (A4) has, at the terminal thereof, a group having an ability to initiate radical polymerization or anion polymerization, and can thus polymerize the polar polymer chain (A3) following the polymerization of the polar polymer chain having polyolefin side chains (A4). Polymerization of the polar polymer chain (A3) is carried out by e.g. a method of radial polymerization or anion polymerization of the addition-polymerizable monomer (D) by using an initiator the polar polymer chain having polyolefin side chains (A4) obtained above. Further, when a specific hydroxyl-containing compound, for example, 2-phenyl-2-(2,2,6,6-tetramethylpiperidin-1-yloxy)-ethanol, 1-(2-hydroxy-1-phenylethoxy)-2,2,6,6-tetramethylpiperidin-4-ol or 2-hydroxyethyl 2-bromopropionate is used as a radical polymerization initiator in production of the polar polymer chain having polyolefin side chains (A4), the hydroxyl group is introduced into the terminal of the polar polymer chain having polyolefin side chains (A4) and is thus converted into a ring-opening polymerization initiator with which the ring-opening polymerizable monomer (E) can be subjected to ring-opening polymerization.

In radical polymerization using the polar polymer chain having polyolefin side chains (A4) as a macroinitiator, the same conditions as the polymerization conditions in production of the polar polymer chain having polyolefin side chains (A4) by radical polymerization can apply.

In anion polymerization using the polar polymer chain having polyolefin side chains (A4) as a macroinitiator, the same conditions as the polymerization conditions in production of the polar polymer chain having polyolefin side chains (A4) by anion polymerization can apply.

When the polar polymer chain having polyolefin side chains (A4) has a hydroxyl group at the terminal thereof, this terminal hydroxyl group is reacted with a potassium compound such as metal potassium and potassium hydride or an alkyl aluminum compound such as trimethyl aluminum, triethyl aluminum and triisobutyl aluminum, thus converting it into a metal alkoxide by which the ring-opening polymerizable monomer (E) can be polymerized. As the polymerization conditions, the same conditions as the polymerization conditions in production of the polar polymer chain having polyolefin side chains (A4) by anion polymerization can apply.

<<Process b>>

A process that involves polymerizing the polar polymer chain (A3) and then polymerizing the polar polymer chain having polyolefin side chains (A4).

[Process for Producing the Polar Polymer Chain (A3)]

Polymerization of the polar polymer chain (A3) is carried out by a method of polymerizing the addition-polymerizable monomer (D) by using the same initiator as used in production of e.g. the polar polymer chain having polyolefin side chains (A4). In the terminal of the polar polymer chain (A3) thus obtained, a functional group derived from the initiator is present as described above, to enable extension of the polymer chain. As the polymerization conditions such as the solvent and reaction temperature used in the polymerization, the same conditions as in production of e.g. the polar polymer chain having polyolefin side chains (A4) can apply.

[Process for Producing the Multi-Branched Polymer]

The polar polymer chain (A3) obtained above has, at the terminal thereof, a group having an ability to initiate radical polymerization or anion polymerization, and can thus polymerize the polar polymer chain having polyolefin side chains (A4) following polymerization of the polar polymer chain (A3). By using e.g. the polar polymer chain (A3) obtained above as the macroinitiator, polymerization of the polar polymer chain having polyolefin side chains (A4) is carried out by polymerizing a single macromonomer or two or more macromonomers selected from the above-mentioned (M1), (M2) and (M3) or by copolymerizing at least one macromonomer selected from (M1), (M2) and (M3) with the at least one monomer (B) selected from organic compounds each having at least one carbon-carbon unsaturated bond.

In radical polymerization using the polar polymer chain (A3) as a macroinitiator, the same conditions as the polymerization conditions in producing the polar polymer chain having polyolefin side chains (A4) by radical polymerization can apply.

In anion polymerization using the polar polymer chain (A3) as a macroinitiator, the same conditions as the polymerization conditions in producing the polar polymer chain having polyolefin side chains (A4) by anion polymerization can apply.

<<Process c>>

A process that involves polymerizing the polar polymer chain having polyolefin side chains (A4) and the polar polymer chain (A3) separately and then coupling both the polymer chains.

[Process for Producing the Polar Polymer Chain Having Polyolefin Side Chains (A4)]

The polar polymer chain having polyolefin side chains (A4) can be obtained by polymerizing a single macromonomer or two or more macromonomers selected from the above-mentioned (M1) (M2) and (M3) or by copolymerizing at least one macromonomer selected from (M1), (M2) and (M3) with the at least one monomer (B) selected from organic compounds each having at least one carbon-carbon unsaturated bond.

The initiator used in the radical polymerization should have a structure having both a group having an ability to initiate radical polymerization and a functional group selected from a hydroxyl group, a carboxyl group, an acid halide group, an amino group and an epoxy group. The specific structure of the initiator is exemplified by the structure of the compound (F).

As the conditions such as the reaction solvent and reaction temperature in the radical polymerization, the same conditions as in producing the polar polymer chain having polyolefin side chains (A4) can apply.

The thus obtained polar polymer chain having polyolefin side chains (A4) has, at the terminal thereof, a functional group selected from a hydroxyl group, a carboxyl group, an acid halide group, an amino group and an epoxy group which are derived from the initiator used in the polymerization.

[Process for Producing the Polar Polymer Chain (A3)]

Production of the polar polymer chain (A3) is carried out by, for example, a method of radical polymerization of the addition-polymerizable monomer (D) with the same initiator as in production of the polar polymer chain having polyolefin side chains (A4), that is, the initiator having a structure having both a group having an ability to initiate radical polymerization and a functional group selected from a hydroxyl group, a carboxyl group, an acid halide group, an amino group and an epoxy group.

As the conditions such as reaction solvent and reaction temperature in radical polymerization, the same conditions as in production of e.g. the polar polymer chain having polyolefin side chains (A4) can apply.

The polar polymer chain (A3) thus obtained has, at the terminal thereof, a functional group selected from a hydroxyl group, a carboxyl group, an acid halide group, an amino group and an epoxy group which are derived from the initiator used in the polymerization.

[Process for Producing the Multi-Branched Polymer]

Using the polar polymer chain having polyolefin side chains (A4) and the polar polymer chain (A3) which are produced separately by the methods described above, the functional groups present at the terminals of both the segments can be reacted with each other to produce the multi-branched polymer of the present invention.

In production of the multi-branched polymer of the present invention, the combination of the functional group present at the terminal of the polar polymer chain having polyolefin side chains (A4) and the functional group present at the terminal of the polar polymer chain (A3) includes, but is not limited to, the following combinations:

(1) The polar polymer chain having polyolefin side chains (A4) having a carboxyl group at the terminal thereof, and the polar polymer chain (A3) having a hydroxyl group at the terminal thereof.

(2) The polar polymer chain having polyolefin side chains (A4) having a carboxyl group at the terminal thereof, and the polar polymer chain (A3) having an amino group at the terminal thereof.

(3) The polar polymer chain having polyolefin side chains (A4) having a hydroxyl group at the terminal thereof, and the polar polymer chain (A3) having an epoxy group at the terminal thereof.

(4) The polar polymer chain having polyolefin side chains (A4) having a hydroxyl group at the terminal thereof, and the polar polymer chain (A3) having a carboxyl group at the terminal thereof.

(5) The polar polymer chain having polyolefin side chains (A4) having a hydroxyl group at the terminal thereof, and the polar polymer chain (A3) having an acid halide group at the terminal thereof.

(6) The polar polymer chain having polyolefin side chains (A4) having an acid halide group at the terminal thereof, and the polar polymer chain (A3) having a hydroxyl group at the terminal thereof.

(7) The polar polymer chain having polyolefin side chains (A4) having an acid halide group at the terminal thereof, and the polar polymer chain (A3) having an amino group at the terminal thereof.

(8) The polar polymer chain having polyolefin side chains (A4) having a halogen-containing group at the terminal thereof, and the polar polymer chain (A3) having a hydroxyl group at the terminal thereof.

(9) The polar polymer chain having polyolefin side chains (A4) having an epoxy group at the terminal thereof, and the polar polymer chain (A3) having a hydroxyl group at the terminal thereof.

(10) The polar polymer chain having polyolefin side chains (A4) having an amino group at the terminal thereof, and the polar polymer chain (A3) having a carboxyl group at the terminal thereof.

(11) The polar polymer chain having polyolefin side chains (A4) having an amino group at the terminal thereof, and the polar polymer chain (A3) having an acid halide group at the terminal thereof.

In production of the multi-branched polymer of the present invention, the molar ratio of the polar polymer chain (A3) to the polar polymer chain having polyolefin side chains (A4) is usually 0.01 to 100, preferably 0.1 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethyl formamide and dimethyl sulfoxide. These can be used alone or as a suitable mixture thereof.

For the reaction of the terminal functional group of the polar polymer chain having polyolefin side chains (A4) with the terminal functional group of the polar polymer chain (A3), a condensation agent can be added if necessary to allow the reaction to proceed efficiently.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

The reaction of the terminal functional group of the polar polymer chain having polyolefin side chains (A4) with the terminal functional group of the polar polymer chain (A3) is carried out preferably in the presence of a basic catalyst. Examples of the basic catalyst include organic amines such as triethylamine, diisopropyl ethyl amine, N,N-dimethyl aniline, piperidine, pyridine, 4-dimethyl aminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride, potassium hydride, lithium hydride and n-butyl lithium.

When the polar polymer chain having polyolefin side chains (A4) having a functional group at the terminal thereof and the polar polymer chain (A3) having a functional group at the terminal thereof wherein the functional group is a carboxyl group are used, the polymer can be produced by reacting these polymers with e.g. phosphorus pentachloride or thionyl chloride to form the corresponding acid chloride compounds and then reacting the resulting polar polymer chain having polyolefin side chains (A4) having a functional group at the terminal thereof with the resulting polar polymer chain (A3) having a functional group at the terminal thereof in a suitable solvent.

The multi-branched polymer of the present invention represented by the general formula (II) wherein $P^2$ is the polar polymer chain having polyolefin side chains (A4) and $P^3$ is the polar polymer chain (A3), as shown in FIG. 1-3, is thus produced.

The multi-branched polymer formed by the method described above is isolated by distilling away the solvent used in the polymerization or the unreacted monomer or by using a known method such as re-precipitation with a non-solvent.

[2-4] Multi-Branched Polymer Wherein $P^2$ is the Polar Polymer Chain Having Polyolefin Side Chains (A4) and $P^3$ is the Polar Polymer Chain Having Polyolefin Side Chains (A4)

The multi-branched polymer represented by the general formula (II) wherein $P^2$ is the polar polymer chain having polyolefin side chains (A4) and $P^3$ is also the polar polymer chain having polyolefin side chains (A4), as shown in FIG. 1-4, is produced preferably by either of the following methods:

<<Process R-1>> a process that involves polymerizing the first polar polymer chain having polyolefin side chains (A4) and then polymerizing the second polar polymer chain having polyolefin side chains (A4); and <<Process R-2>> a process that involves polymerizing the first polar polymer chain having polyolefin side chains (A4) and the second polar polymer chain having polyolefin side chains (A4) separately and then coupling both the polymer chains. Hereinafter, these processes are described in detail.

<<Process R-1>>

A process that involves polymerizing the first polar polymer chain having polyolefin side chains (A4) and then polymerizing the second polar polymer chain having polyolefin side chains (A4).

[Process for Producing the First Polar Polymer Chain Having Polyolefin Side Chains (A4)]

The process for producing the first polar polymer chain having polyolefin side chains (A4) includes the same method as in producing the polar polymer chain having polyolefin side chains (A4) in the method of producing the multi-branched polymer represented by the general formula (II) wherein $P^2$ is the polar polymer chain having polyolefin side chains (A4) and $P^3$ is the polar polymer chain (A3), as shown in FIG. 1-3, wherein (a) the polar polymer chain having polyolefin side chains (A4) is polymerized and then the polar polymer chain (A3) is polymerized.

The first polar polymer chain having polyolefin side chains (A4) thus obtained contains, at the terminal thereof, an initiator-derived halogen atom or nitroxide compound, a lithium atom etc., and can thus serve as a macroinitiator to extend the polymer chain by subsequent radical polymerization or anion polymerization.

[Process for Producing the Multi-Branched Polymer]

The first polar polymer chain having polyolefin side chains (A4) obtained above has, at the terminal thereof, a group having an ability to initiate radical polymerization or anion polymerization, and can thus polymerize the second polar polymer chain having polyolefin side chains (A4) following polymerization of the polar polymer chain having polyolefin side chains (A4). By using e.g. the first polar polymer chain having polyolefin side chains (A4) obtained above as the initiator, the second polar polymer chain having polyolefin side chains (A4) can be obtained by polymerizing a single macromonomer or two or more macromonomers selected from the above-mentioned (M1), (M2) and (M3) or by copolymerizing at least one macromonomer selected from (M1), (M2) and (M3) with the at least one monomer (B) selected from organic compounds each having at least one carbon-carbon unsaturated bond. Further, when a specific hydroxyl-containing compound, for example, 2-phenyl-2-(2,2,6,6-tetramethylpiperidin-1-yloxy)-ethanol, 1-(2-hydroxy-1-phenylethoxy)-2,2,6,6-tetramethylpiperidin-4-ol or 2-hydroxyethyl 2-bromopropionate is used as a radical polymerization initiator in production of the first polar polymer chain having polyolefin side chains (A4), the hydroxyl group is introduced into the terminal of the polar polymer chain having polyolefin side chains (A4), thus converting the polymer chain into an anion polymerization initiator to effect anion copolymerization of a single macromonomer or two or more macromonomers selected from the above-mentioned (M1), (M2) and (M3) or a combination of at least one macromonomer selected from (M1), (M2) and (M3) and the at least one monomer (B) selected from organic compounds each having at least one carbon-carbon unsaturated bond.

In radical polymerization using the first polar polymer chain having polyolefin side chains (A4) as a macroinitiator, the same conditions as the polymerization conditions in producing e.g. the polar polymer chain having polyolefin side chains (A4) by radical polymerization can apply.

In anion polymerization using the first polar polymer chain having polyolefin side chains (A4) a macroinitiator, the same conditions as the polymerization conditions in producing e.g.

the polar polymer chain having polyolefin side chains (A4) by anion polymerization can apply.

When the first polar polymer chain having polyolefin side chains (A4) has a hydroxyl group at the terminal thereof, this terminal hydroxyl group is reacted with a potassium compound such as metal potassium and potassium hydride, or an alkyl aluminum compound such as trimethyl aluminum, triethyl aluminum or triisobutyl aluminum thereby converting it into a metal alkoxide to effect anion copolymerization of a single macromonomer or two or more macromonomers selected from the above-mentioned (M1), (M2) and (M3) or a combination of at least one macromonomer selected from (M1), (M2) and (M3) and the at least one monomer (B) selected from organic compounds each having at least one carbon-carbon unsaturated bond. As the polymerization conditions, the same conditions as the polymerization conditions in producing the first polar polymer chain having polyolefin side chains (A4) by anion polymerization can apply.

<<Process R-2>22

A process that involves polymerizing the first polar polymer chain having polyolefin side chains (A4) and the second polar polymer chain having polyolefin side chains (A4) separately and then coupling both the polymer chains.

[Process for Producing the First and Second Polar Polymer Chains Having Polyolefin Side Chains (A4)]

The first and second polar polymer chains having polyolefin side chains (A4) can be obtained by polymerizing a single macromonomer or two or more macromonomers selected from the above-mentioned (M1), (M2) and (M3) or a combination of at least one macromonomer selected from (M1), (M2) and (M3) and at least one monomer (B) selected from organic compounds each having at least one carbon-carbon unsaturated bond.

The initiator used in the radical polymerization should have a structure having both a group having an ability to initiate radical polymerization and a functional group selected from a hydroxyl group, a carboxyl group, an acid halide group, an amino group and an epoxy group. The specific structure of the initiator is exemplified by the same structure as that of the compound (F).

As the conditions such as the reaction solvent and the reaction temperature in the radical polymerization, the same conditions as in producing e.g. the polar polymer chain having polyolefin side chains (A4) can apply.

The first and second polar polymer chains having polyolefin side chains (A4) thus obtained have, at the terminal thereof, a functional group selected from a hydroxyl group, a carboxyl group, an acid halide group, an amino group and an epoxy group which are derived from the initiator used in the polymerization.

[Process for Producing the Multi-Branched Polymer]

Using the first and second polar polymer chains having polyolefin side chains (A4) which were produced separately by the method described above, the functional groups present at the terminals of both the segments can be reacted to produce the multi-branched polymer of the present invention.

In production of the multi-branched polymer of the present invention, the combination of the functional groups present at the terminals of the first and second polar polymer chains having polyolefin side chains (A4) includes, but is not limited to, the following combinations:

(1) The polar polymer chain having polyolefin side chains (A4) having a carboxyl group at the terminal thereof, and the polar polymer chain having polyolefin side chains (A4) having a hydroxyl group at the terminal thereof.

(2) The polar polymer chain having polyolefin side chains (A4) having a carboxyl group at the terminal thereof, and the polar polymer chain having polyolefin side chains (A4) having an amino group at the terminal thereof.

(3) The polar polymer chain having polyolefin side chains (A4) having a hydroxyl group at the terminal thereof, and the polar polymer chain having polyolefin side chains (A4) having an epoxy group at the terminal thereof.

(4) The polar polymer chain having polyolefin side chains (A4) having a hydroxyl group at the terminal thereof, and the polar polymer chain having polyolefin side chains (A4) having an acid halide group at the terminal thereof.

(5) The polar polymer chain having polyolefin side chains (A4) having an acid halide group at the terminal thereof, and the polar polymer chain having polyolefin side chains (A4) having an amino group at the terminal thereof.

(6) The polar polymer chain having polyolefin side chains (A4) having a halogen-containing group at the terminal thereof, and the polar polymer chain having polyolefin side chains (A4) having a hydroxyl group at the terminal thereof.

In production of the multi-branched polymer of the present invention, the molar ratio of one polar polymer chain having polyolefin side chains (A4) to the other polar polymer chain having polyolefin side chains (A4) is usually 0.01 to 100, preferably 0.1 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These can be used alone or as a suitable mixture thereof.

For the reaction of the terminal functional group of one polar polymer chain having polyolefin side chains (A4) with the terminal functional group of the other polar polymer chain having polyolefin side chains (A4), a condensation agent can be added if necessary to allow the reaction to proceed efficiently.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

The reaction of the terminal functional group of one polar polymer chain having polyolefin side chains (A4) with the terminal functional group of the other polar polymer chain having polyolefin side chains (A4) is carried out preferably in the presence of a basic catalyst. Examples of the basic catalyst include organic amines such as triethylamine, diisopropyl ethyl amine, N,N-dimethyl aniline, piperidine, pyridine, 4-dimethyl aminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride, potassium hydride, lithium hydride and n-butyl lithium.

When one polar polymer chain having polyolefin side chains (A4) having a functional group at the terminal thereof and the other polar polymer chain having polyolefin side chains (A4) having a functional group at the terminal thereof wherein the functional group is a carboxyl group are used, the polymer can be produced by reacting one polar polymer chain with e.g. phosphorus pentachloride or thionyl chloride to form the corresponding acid chloride compound and then reacting the product with the other polar polymer chain having polyolefin side chains (A4) having a functional group at the terminal thereof in a suitable solvent.

In this manner, the multi-branched polymer of the present invention represented by the general formula (II) wherein $P^2$ is the polar polymer chain having polyolefin side chains (A4) and $P^3$ is also the polar polymer chain having polyolefin side chains (A4), as shown in FIG. 1-4, is produced.

The polymer formed by the method described above is isolated by distilling away the solvent used in the polymerization or the unreacted monomer or by using a known method such as re-precipitation with a non-solvent.

[3] Second Preferable Multi-Branched Polymer

The second preferable multi-branched polymer according to the present invention is a polymer containing a block structure or a graft structure represented by the general formula (III):

$$(P^4)(P^5)_2\text{—}X^2 \quad (III)$$

wherein $P^4$ is a polyolefin chain (A1) having a number-average molecular weight (Mn) of 500 to 1,000,000; $P^5$ is a polymer chain having a number-average molecular weight (Mn) of 500 to 1,000,000 selected from a polyolefin chain (A1), a polar polymer chain (A3) and a polar polymer chain having polyolefin side chains (A4); and three polymer chains represented by $P^4$ and two $P^5$s may be the same or different from one another.

$X^2$ is a linking group containing less than 200 atoms in total containing two groups selected from an ether group and an ester group, and examples thereof include:

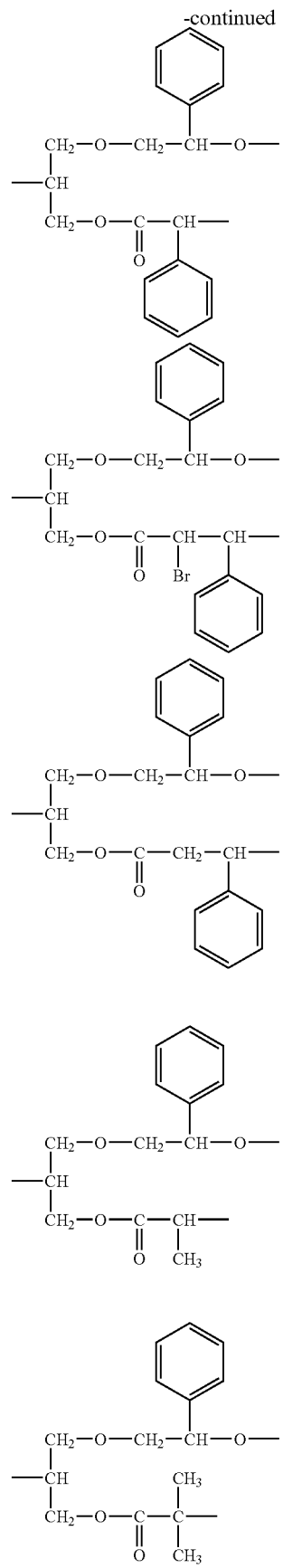

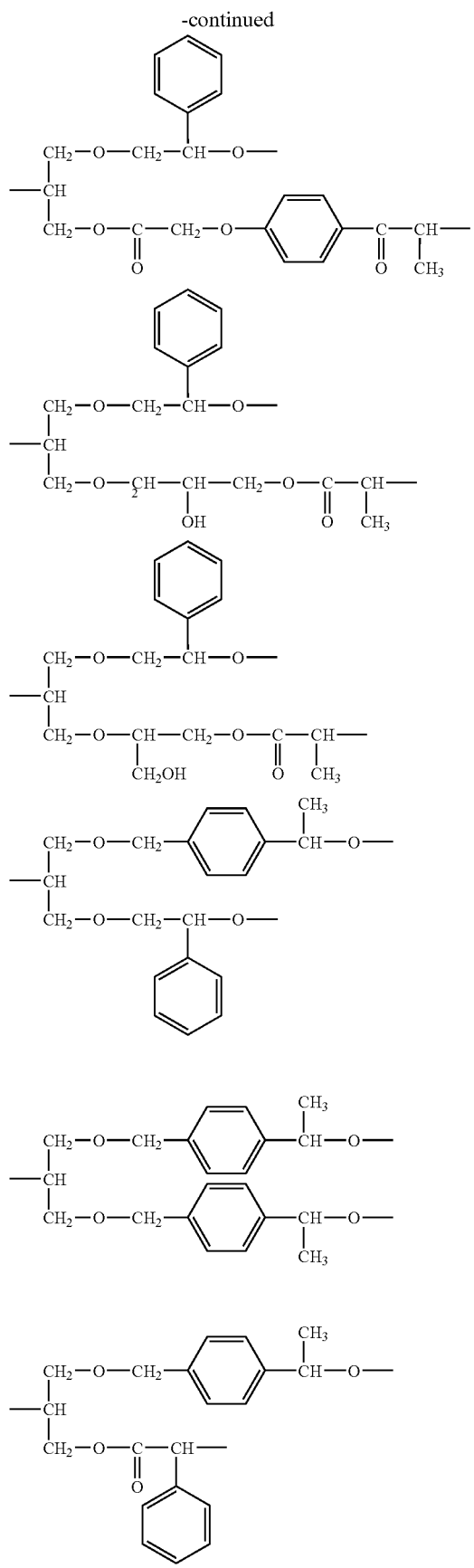
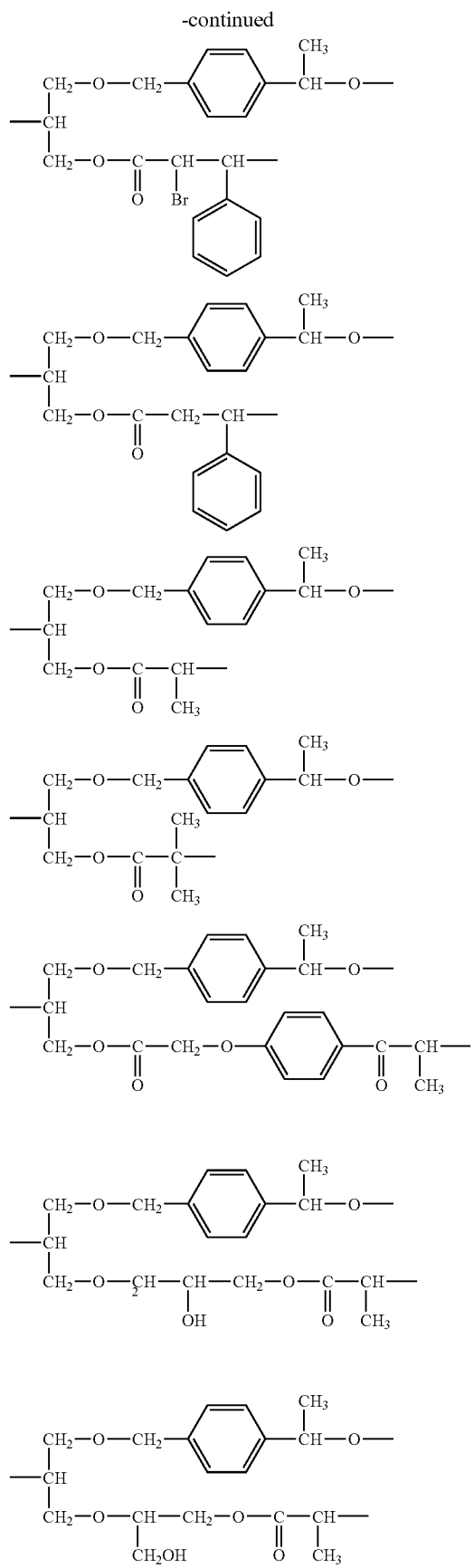

-continued
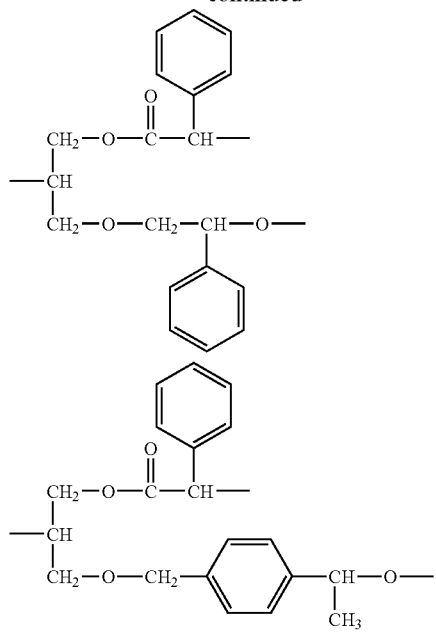
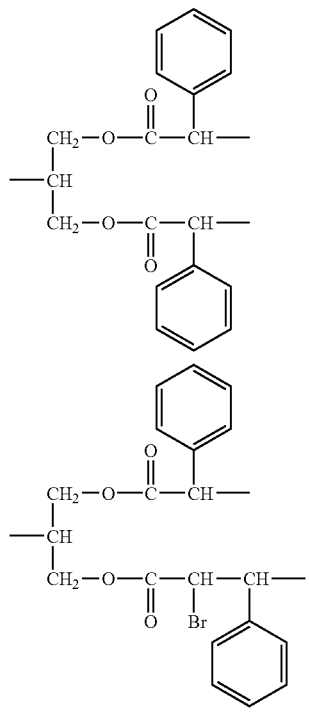
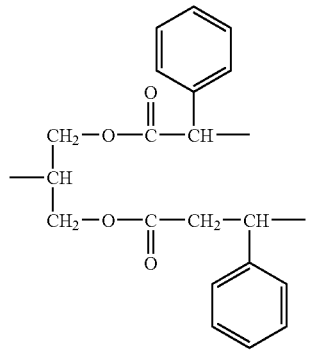
-continued
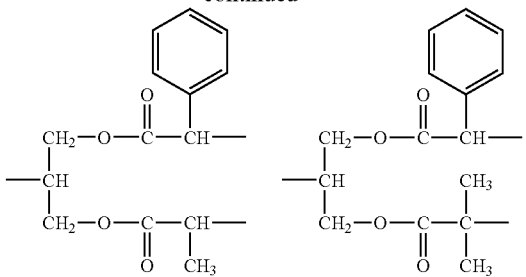
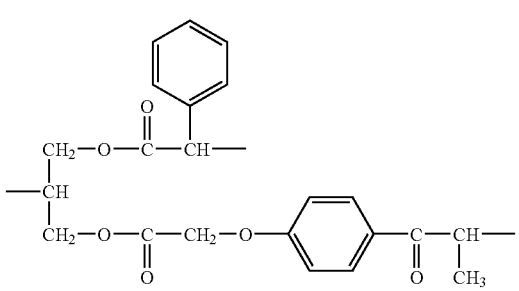
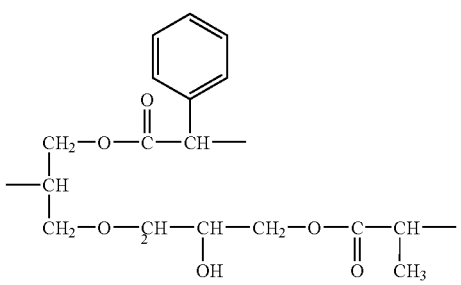
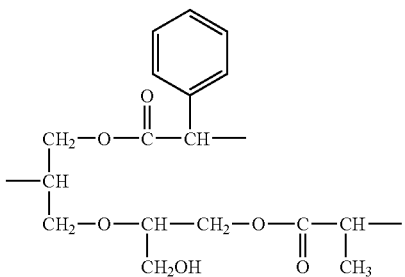
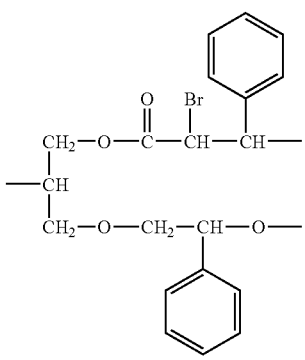

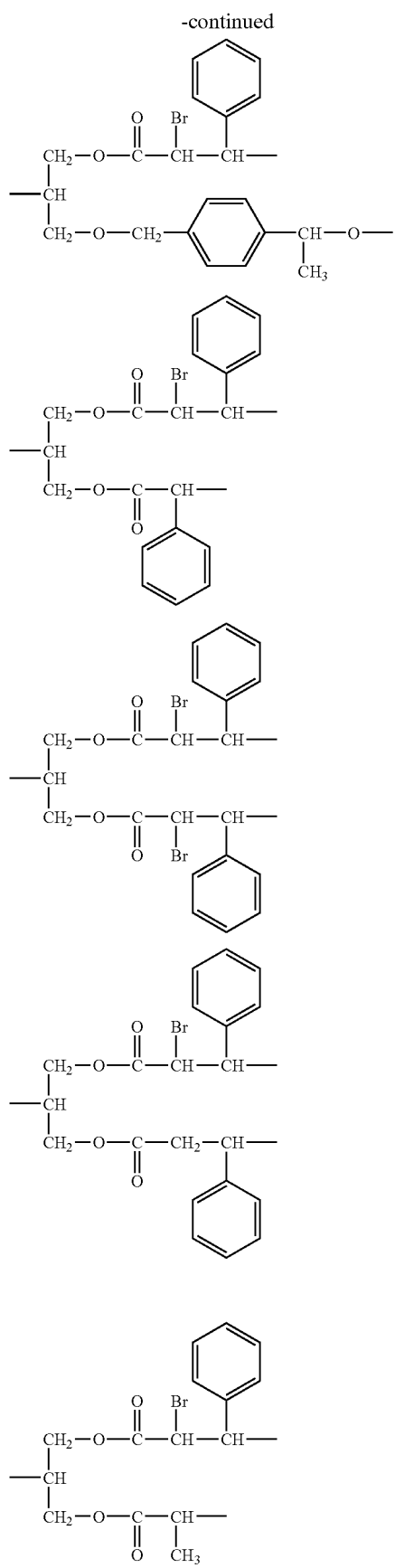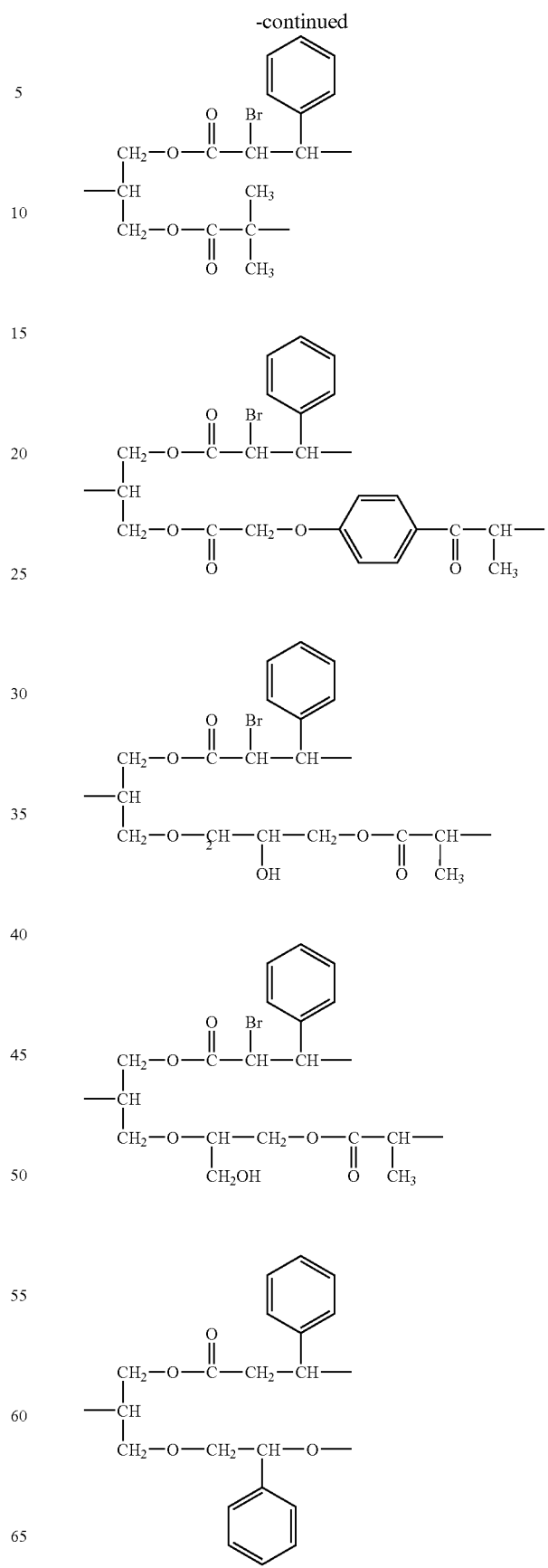

-continued
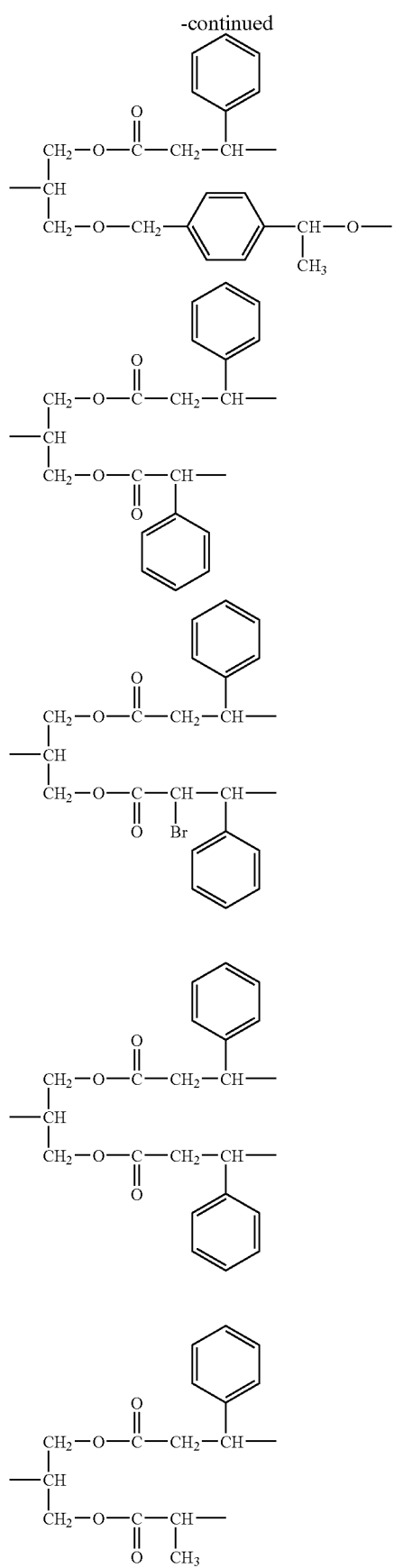
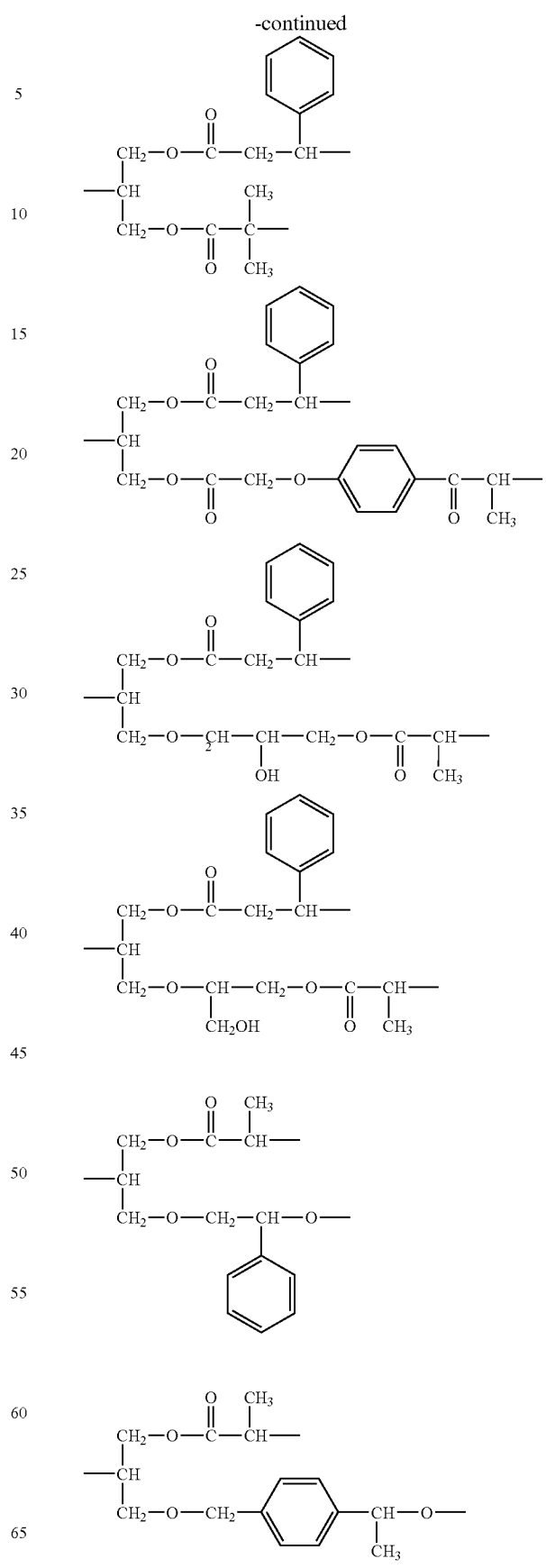

-continued
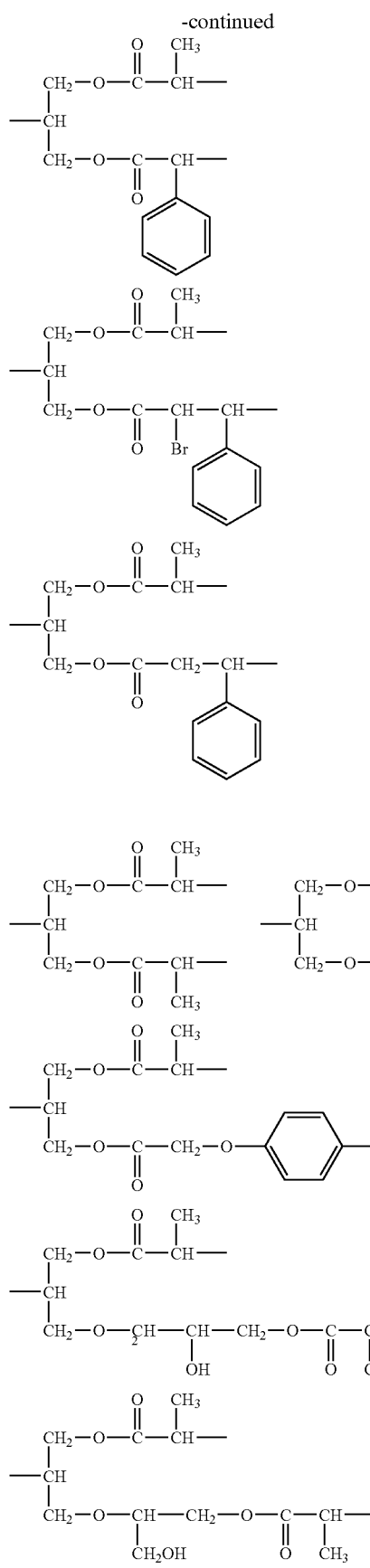
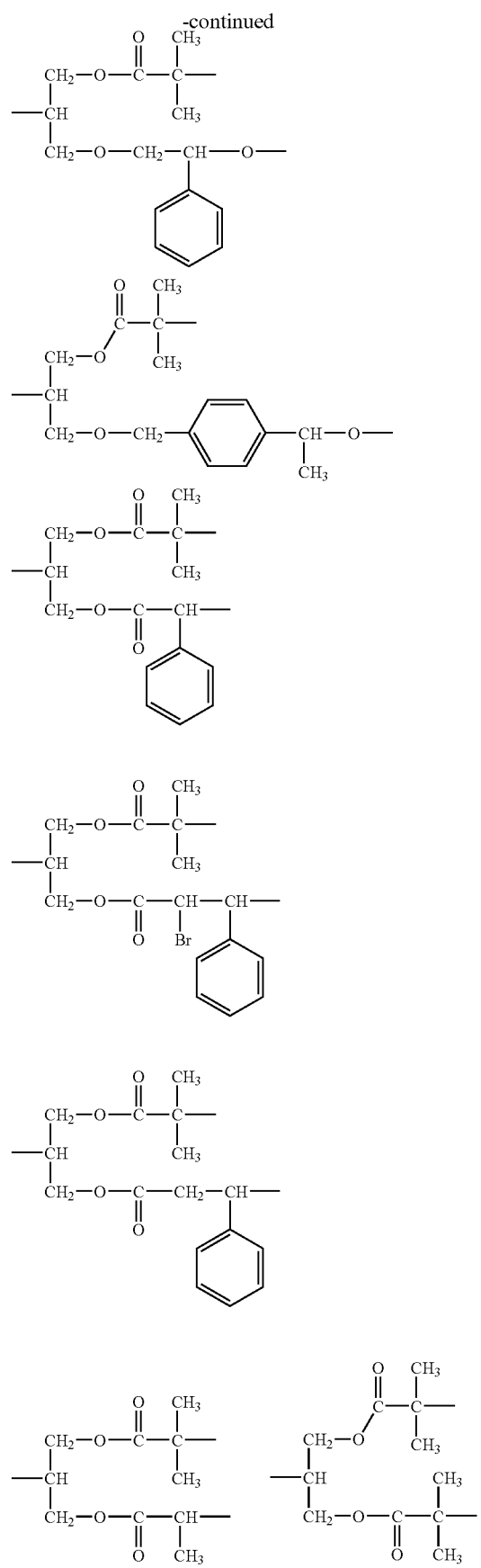

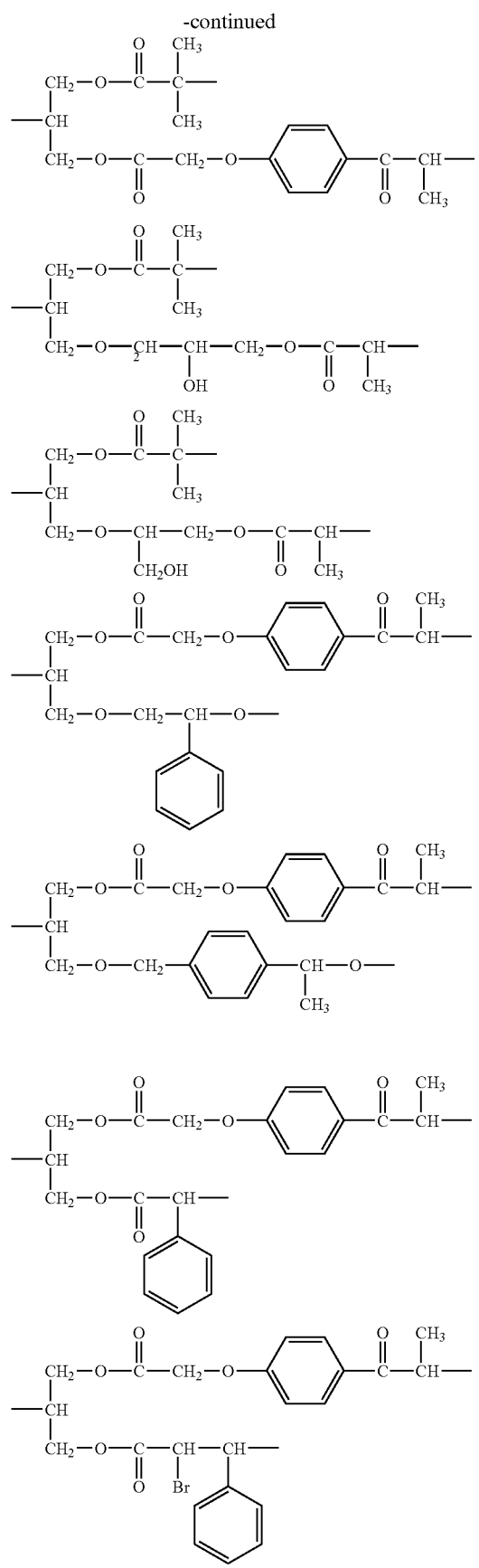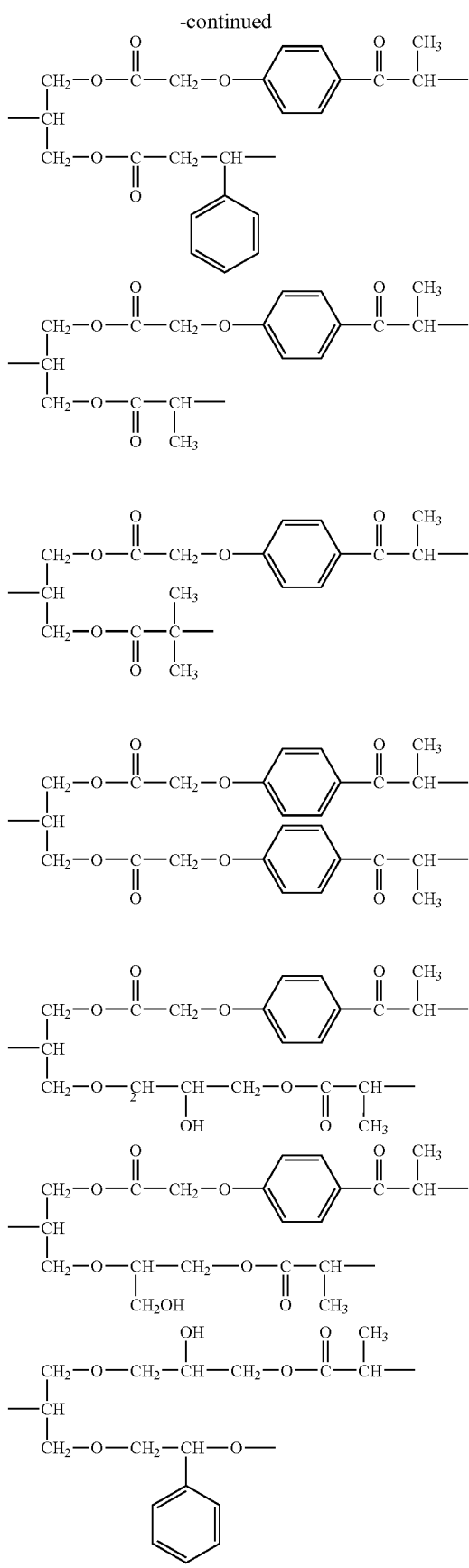

-continued
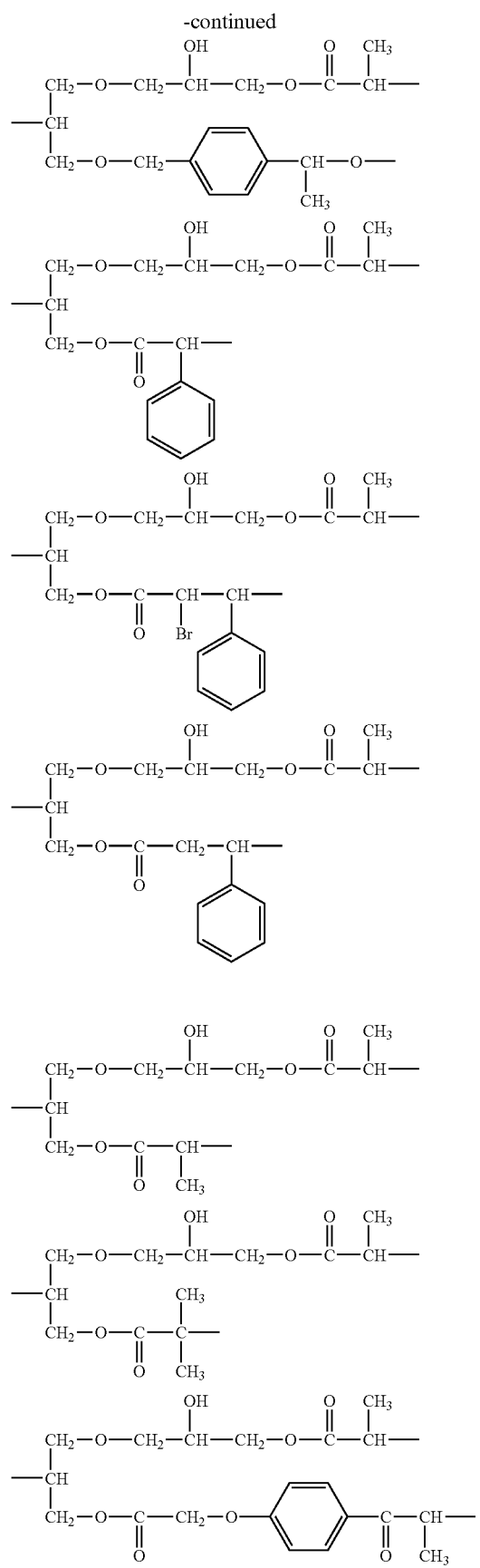
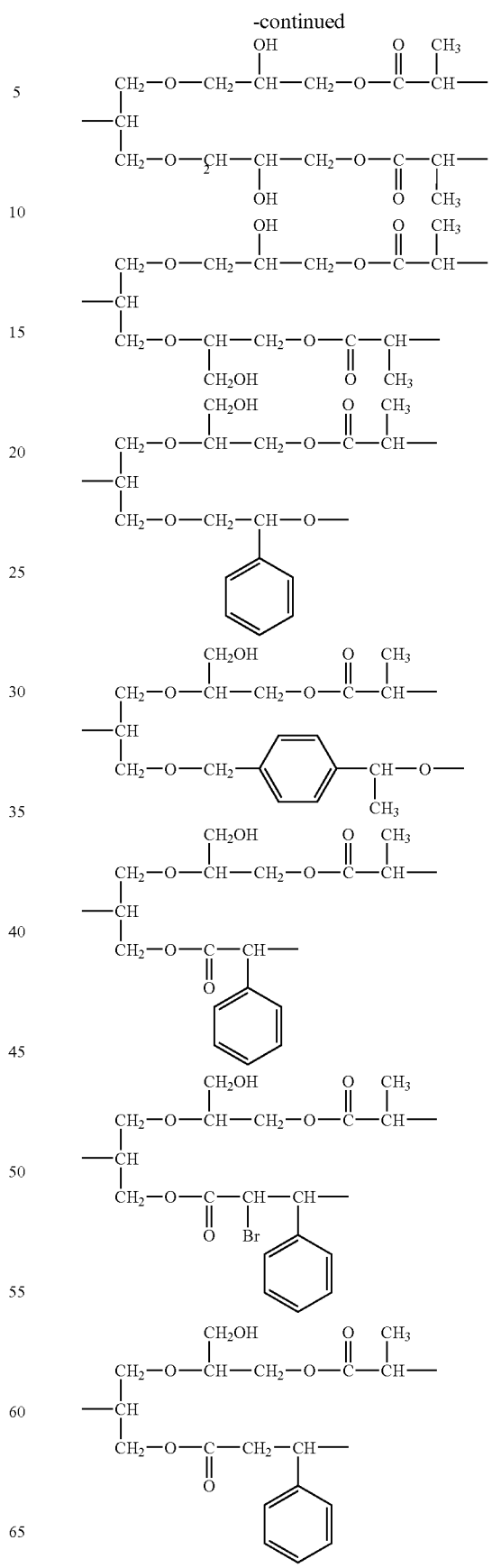

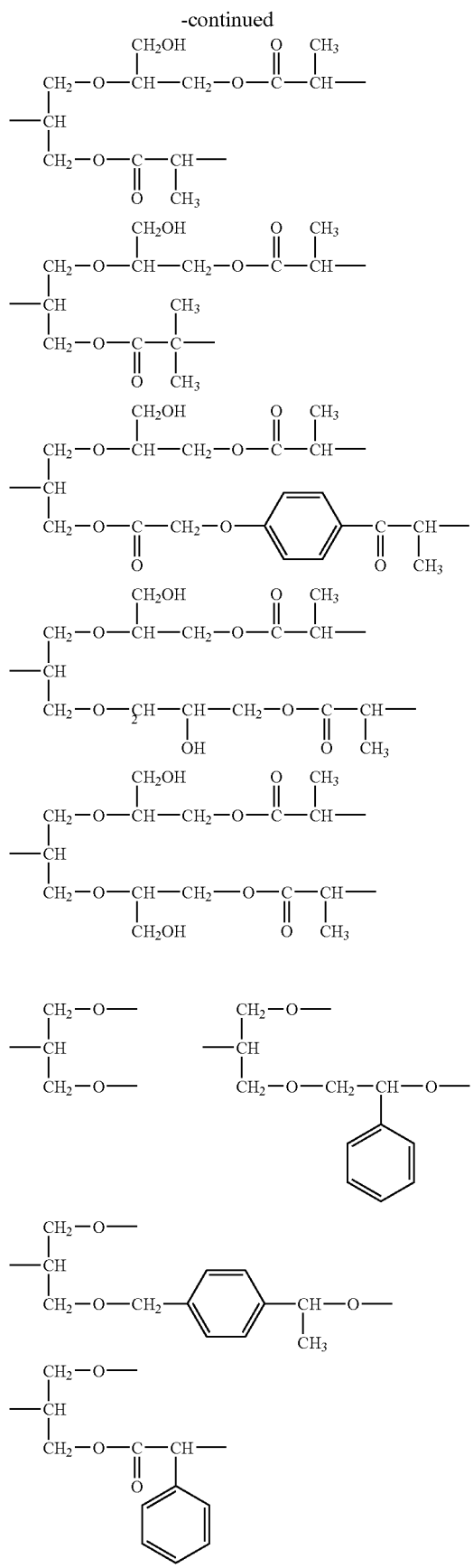
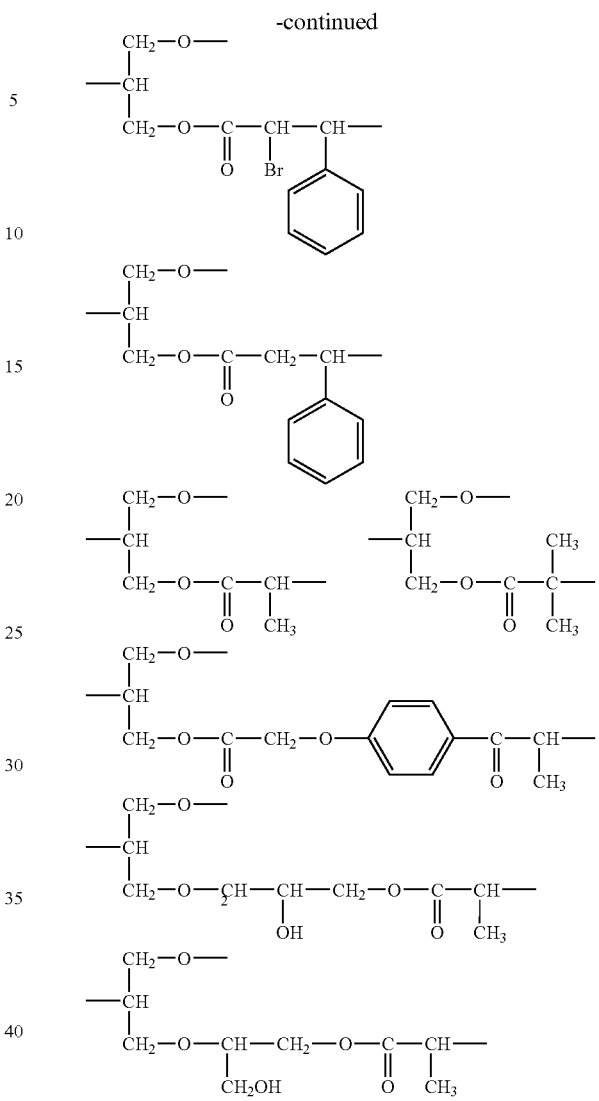

The combination of the polymer chains constituting the multi-branched polymer represented by the general formula (III) is for example as follows:

(1) The multi-branched polymer shown in FIG. 2-1, wherein two $P^5$s are each the polyolefin chain (A1).

(2) The multi-branched polymer shown in FIG. 2-2, wherein two $P^5$s are each the polar polymer chain (A3).

(3) The multi-branched polymer shown in FIG. 2-3, wherein two $P^5$s are each the polar polymer chain having polyolefin side chains (A4).

Figures 1, 2, 3, 4:
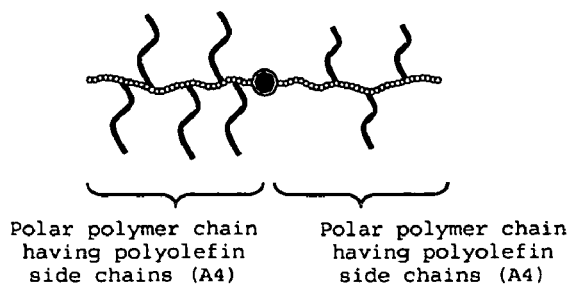

(4) The multi-branched polymer shown in FIG. 2-4, wherein one of two $P^5$s is the polyolefin chain (A1), and the other is the polar polymer chain (A3).

(5) The multi-branched polymer shown in FIG. 2-5, wherein one of two $P^5$s is the polyolefin chain (A1), and the other is the polar polymer chain having polyolefin side chains (A4).

(6) The multi-branched polymer shown in FIG. 2-6, wherein one of two $P^5$s is the polar polymer chain (A3), and the other is the polar polymer chain having polyolefin side chains (A4)

Hereinafter, the process for producing the above multi-branched polymer is described in more detail. The multi-branched polymer represented by the general formula (III) is produced by conducting e.g. the following steps C1, C2 and C3 successively.

<<Step C1>> A step of producing a polyolefin having two hydroxyl groups at the terminal thereof represented by the general formula (XVIII):

$$P^{10}\text{-}(X^6)_2 \qquad (XVIII)$$

wherein $X^6$ is a hydroxyl-containing group, and $P^{10}$ is the same as the above-defined polyolefin chain (A1).

<<Step C2>> A step of converting a hydroxyl-containing group represented by $X^6$ in the general formula (XVIII) into a group having an ability to initiate radical polymerization, anion polymerization or ring-opening polymerization.

<<Step C3>> A step of polymerizing the addition-polymerizable monomer (D), the anion ring-opening polymerizable monomer (E) and one or more monomers selected from the polyolefin macromonomers (M1) to (M3) represented by the general formulae (V) to (VII), by using as a polymerization initiator the polyolefin having two groups having an ability to initiate radical polymerization, anion polymerization or ring-opening polymerization obtained in the step C2.

Hereinafter, the process for producing the multi-branched polymer of the present invention is described in detail by reference to the respective steps.

<<Step C1>>

Step C1 is a step of producing the polyolefin having two hydroxyl-containing groups at the terminal thereof represented by the general formula (XVIII). The polyolefin having two hydroxyl-containing groups at the terminal thereof represented by the general formula (XVIII) is produced, for example, by (a) production of polyolefin (I) having both a hydroxyl-containing group at the terminal thereof and a group containing the group 13 element in the periodic table and then by (b) conversion of the group containing the group 13 element in the periodic table, present at the terminal of the resulting polyolefin, into a hydroxyl-containing group.

(a) Production of Polyolefin (I)

The process for producing the polyolefin having both a hydroxyl-containing group at the terminal thereof and a group containing the group 13 element in the periodic table can be exemplified by a process shown in, for example, J. Am. Chem. Soc., 124, 1176 (2002). That is, it can be produced by copolymerizing an olefin represented by $CH_2=CHR^{10}$ with an olefin having a hydroxyl group in the presence of an olefin polymerization catalyst such as a known metallocene catalyst and a compound containing the group 13 element in the periodic table. $R^{10}$ is a group or an atom selected from a $C_{1-20}$ hydrocarbon group, a hydrogen atom and a halogen atom.

The compound containing the group 13 element in the periodic table includes, for example, organoaluminum compounds and organoboron compounds.

Examples of such organoaluminum compounds include trialkyl aluminum such as trimethyl aluminum, triethyl aluminum, triisopropyl aluminum, triisobutyl aluminum, trioctyl aluminum, tri-2-ethyl hexyl aluminum etc.; trialkenyl aluminum such as triisoprenyl aluminum etc.; dialkyl aluminum halide such as dimethyl aluminum chloride, diethyl aluminum chloride, diisopropyl aluminum chloride, diisobutyl aluminum chloride, dimethyl aluminum bromide etc.; alkyl aluminum sesquihalide such as methyl aluminum sesquichloride, ethyl aluminum sesquichloride, isopropyl aluminum sesquichloride, butyl aluminum sesquichloride, ethyl aluminum sesquibromide etc.; alkyl aluminum dihalide such as methyl aluminum dichloride, ethyl aluminum dichloride, isopropyl aluminum dichloride, ethyl aluminum dibromide etc.; alkyl aluminum hydride such as diethyl aluminum hydride, diisobutyl aluminum hydride, ethyl aluminum dihydride etc.; dimethyl aluminum methoxide, diethyl aluminum ethoxide, diisobutyl aluminum methoxide etc.; $Et_2Al(OSiMe_3)$, (iso-$Bu)_2Al(OSiMe_3)$, (iso-$Bu)_2Al(OSiEt_3)$, $Et_2AlOAlEt_2$, (iso-$Bu)_2AlOAl(iso\text{-}Bu)_2$, $Me_2AlNEt_2$, $Et_2AlNHMe$, $Me_2AlNHEt$, $Et_2AlN(Me_3Si)_2$, (iso-$Bu)_2AlN(Me_3Si)_2$, (iso-$Bu)_2AlSiMe_3$, $Et_2AlN(Me)\text{-}AlEt_2$, (iso-$Bu)_2AlN(Et)Al(iso\text{-}Bu)_2$, $(C_2H_5)_2AlOAl(C_2H_5)_2$, $(C_4H_9)_2AlOAl(C_4H_9)_2$, $(C_2H_5)_2AlN(C_2H_5)Al(C_2H_5)_2$, etc.; and aluminoxanes (organoaluminum oxy compounds) such as methyl aluminoxane.

As the compound containing the group 13 element in the periodic table, use can also be made of organoboron compounds. The organoboron compounds include triphenyl boron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, tris(3,5-dimethylphenyl)boron, texyl borane, dicyclohexyl borane, dicyamyl borane, diisopinocane phenyl borane, 9-borabicyclo[3.3.1]nonane, catechol borane, β-bromo-9-borabicyclo[3.3.1]nonane, a borane-triethylamine complex, a borane-methyl sulfide complex, etc.

As the organoboron compound, an ionic compound may also be used. Examples of such compounds include triethyl ammonium tetra(phenyl)boron, tripropyl ammonium tetra(phenyl)boron, trimethyl ammonium tetra(p-tolyl)boron, trimethyl ammonium tetra(o-tolyl)boron, tri(n-butyl)ammonium tetra(pentafluorophenyl)boron, tripropyl ammonium tetra(o,p-dimethylphenyl)boron, tri(n-butyl)ammonium tetra(p-trifluoromethylphenyl)boron, N,N-dimethylanilinium tetra(phenyl)boron, dicyclohexyl ammonium tetra(phenyl)boron, triphenyl carbenium tetrakis(pentafluorophenyl)borate, N,N-dimethylanilinium tetrakis(pentafluorophenyl)borate, bis[tri(n-butyl)ammonium]nonaborate, bis[tri(n-butyl)ammonium]decaborate, etc.

These compounds containing the group 13 element in the periodic table may be used alone or in combination thereof.

Examples of the olefin represented by $CH_2=CHR^{10}$ include ethylene, propylene, butene, pentene, hexene, octene, decene, etc.

The olefin having a hydroxyl group used in copolymerization includes unsaturated alcohols having a linear hydrocarbon moiety, such as allyl alcohol, 4-penten-1-ol, 5-hexen-1-ol, 6-hepten-1-ol, 8-nonen-1-ol and 10-undecen-1-ol.

(b) Conversion of a Group Containing the Group 13 Element in the Periodic Table into a Hydroxyl-Containing Group The polyolefin (I) having both a hydroxyl-containing group and a group containing the group 13 element in the periodic table at the terminal thereof obtained by the method described above is converted into a polyolefin having two hydroxy-containing groups at the terminal thereof represented by the general formula (II) by for example (Method a) wherein the group containing the group 13 element in the periodic table, present in the polyolefin, is subjected to substitution reaction with a compound having a functional group structure and then subjected to solvolysis, or (Method b) wherein the group containing the group 13 element in the periodic table, present in the polyolefin, is subjected to substitution reaction with a compound having a structure which upon solvolysis, forms a functional group, and then subjected to solvolysis.

The compound having a functional group structure used in (Method a) includes a halogen gas, methyl chloroformate and phthalic chloride. The compound having a structure which upon solvolysis, forms a functional group used in (Method b) includes oxygen, carbon monoxide and carbon dioxide.

The substitution reaction of the group containing the group 13 element in the periodic table, present in the polyolefin (I) obtained in (Method a) above, with the compound having a functional group structure or the compound having a structure which upon solvolysis, forms a functional group is carried out usually at a temperature of 0 to 300° C., preferably 10 to 200° C., for 0 to 100 hours, preferably 0.5 to 50 hours. After the substitution reaction is carried out, the solvolysis temperature is usually a temperature of 0 to 100° C., preferably 10 to 80° C., and the solvolysis time is 0 to 100 hours, preferably 0.5 to 50 hours. The solvent used in solvolysis includes methanol, ethanol, propanol, butanol, water, etc.

The polyolefin having two hydroxyl-containing groups at the terminal thereof represented by the general formula (XVIII) is thus produced.

<<Step C2>>

Step C2 is a step of converting the two hydroxyl-containing groups present at the terminal of the polyolefin obtained in the step C1 into a group having an ability to initiate radical polymerization, anion polymerization or ring-opening polymerization. The group having an ability to initiate radical polymerization is exemplified by, for example, a group having a nitroxide-containing group bound thereto and generating a radical by thermal cleavage, as disclosed in Chem. Rev., 101, 3661 (2001), and a group having a terminal halogen atom bound thereto and generating a radical upon addition of ruthenium, copper chloride or a complex having such transition metal atom, as disclosed in Chem. Rev., 101, 2921 (2001) and Chem. Rev., 101, 3689 (2001).

The method of converting the two hydroxyl-containing groups present at the terminal of the polyolefin represented by the general formula (XVIII) into a group having an ability to initiate radical polymerization includes, for example, a method that involves reacting a compound (J) having both a group having an ability to initiate radical polymerization and a functional group capable of reacting with the two hydroxyl-containing groups present at the terminal of the polyolefin represented by the general formula (XVIII), with the polyolefin having two hydroxyl-containing groups at the terminal thereof represented by the general formula (XVIII).

The compound (J) having both a group having an ability to initiate radical polymerization and a functional group capable of reacting with the two hydroxyl-containing groups present at the terminal of the polyolefin represented by the general formula (XVIII) can be exemplified by the following compounds:

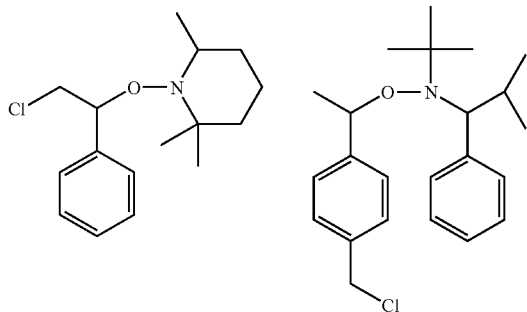

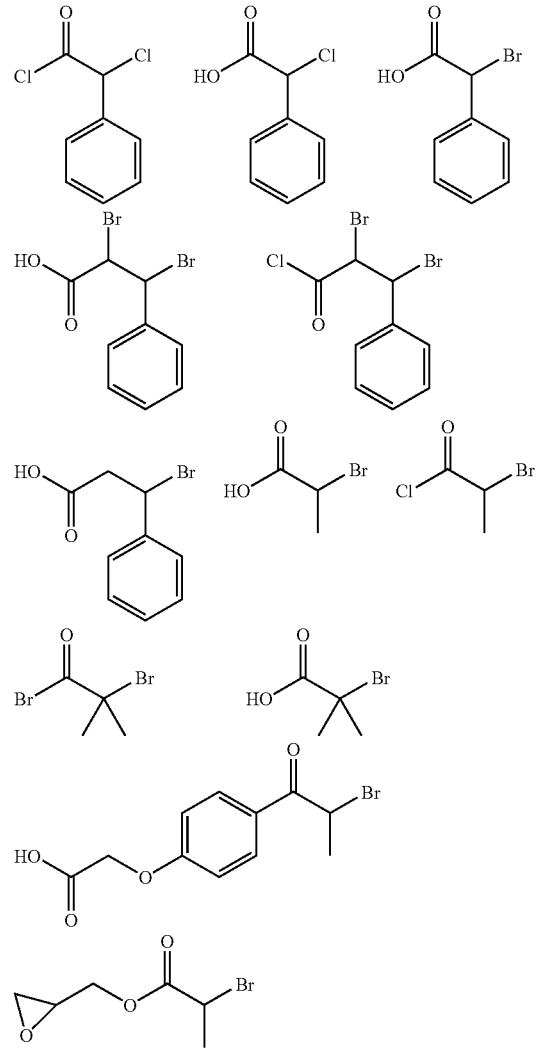

The method of converting the two hydroxyl-containing groups present at the terminal of the polyolefin represented by the general formula (XVIII) into functional groups having an ability to initiate anion polymerization or ring-opening polymerization includes, for example, a method that involves reacting an alkali metal such as metal lithium or metal potassium, an alkali metal hydride such as lithium hydride or potassium hydride, or an alkyl aluminum compound such as trimethyl aluminum, triethyl aluminum or triisobutyl aluminum thereby converting the polyolefin into a metal alkoxide-containing polyolefin.

When the amount of the compound (J) having both a group having an ability to initiate radical polymerization and a functional group capable of reacting with the two hydroxyl-containing groups present at the terminal of the polyolefin represented by the general formula (XVIII), relative to the two hydroxyl-containing groups present at the terminal of the polyolefin represented by the general formula (XVIII), is too low in conversion of the two hydroxyl-containing groups present at the terminal of the polyolefin represented by the general formula (XVIII) into groups having an ability to initiate radical polymerization, the degree of conversion of the hydroxyl groups contained in the polyolefin is decreased, and thus the yield of the multi-branched polymer obtained in the step C3 is lowered, while when the amount of the compound (J) is too high, the unreacted compound (J) remains, and a homopolymer may be produced as a byproduct in the step C3, and thus the molar ratio thereof to the two hydroxyl-containing groups present at the terminal of the polyolefin represented by the general formula (XVIII) is usually 0.1 to 100, preferably 0.3 to 50, and more preferably 0.5 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These can be used alone or as a suitable mixture thereof.

The reaction of the polyolefin having two hydroxyl-containing groups at the terminal thereof represented by the general formula (XVIII) with the compound (J) is carried out preferably in the presence of a condensation agent and a basic catalyst, depending on the type of the functional group participating in the reaction.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

Examples of the basic catalyst include organic amines such as triethylamine, diisopropyl ethyl amine, N,N-dimethyl aniline, piperidine, pyridine, 4-dimethylaminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride and n-butyl lithium.

The reaction temperature is usually −100° C. to 200° C., preferably −50° C. to 150° C. The reaction time is varied depending on the reaction temperature and the type and amount of the compound (J) and the polyolefin having hydroxyl groups, but is usually 1 to 48 hours.

<<Step C3>>

Step C3 is a step of producing the multi-branched polymer represented by the general formula (III) by radical polymerization, anion polymerization or ring-opening polymerization using, as a macroinitiator, the polyolefin having two functional groups having an ability to initiate radical polymerization, anion polymerization or ring-opening polymerization obtained in the steps C1 and C2.

The radical polymerization according to the present invention is carried out if necessary in the presence of a catalyst. Examples of the catalyst include CuBr, CuCl, RuCl, RuCl$_2$, FeCl, FeCl$_2$ etc. When the catalyst is used, the amount of the catalyst used is varied depending on the amount of the terminal group present at the terminal of the polyolefin and having an ability to initiate radial polymerization, but is usually 0.1 to 100 equivalents, preferably 0.5 to 50 equivalents, relative to the amount of the terminal group having an ability to initiate radial polymerization. Coordinating fatty amines or aromatic amines may be added to increase the solubility of the catalyst in the reaction system, or alkoxy aluminum may be added as a reaction accelerator.

The solvent usable in radical polymerization may be any solvent insofar as the reaction is not inhibited. Examples thereof include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbon solvents such as chlorobenzene, dichlorobenzene, trichlorobenzene, methylene chloride, chloroform, carbon tetrachloride and tetrachloroethylene, alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxy anisole. Suspension polymerization or emulsion polymerization can be carried out using water as the solvent. These solvents may be used alone or as a mixture of two or more thereof. By using these solvents, the reaction solution preferably becomes a uniform phase, but may become a plurality of heterogeneous phases.

The reaction temperature may be any temperature at which the polymerization reaction proceeds, and varied depending on the degree of polymerization of the desired polymer, the type and amount of the radical polymerization initiator and solvent used, but the reaction temperature is usually −100° C. to 250° C., preferably −50° C. to 180° C., and still more preferably 0° C. to 160° C. The reaction can be carried out under reduced pressure, at normal pressures or under pressure depending on the case. The polymerization reaction is conducted preferably in an inert gas atmosphere such as nitrogen or argon.

The solvent usable in anion polymerization and ring-opening polymerization includes, for example, aliphatic hydrocarbons such as hexane and heptane, alicyclic hydrocarbons such as cyclopentane and cyclohexane, aromatic hydrocarbons such as benzene and toluene, and ether solvents such as diethyl ether, dioxane, tetrahydrofuran (THF), monogrime and digrime. These solvents can be used alone or in combination of two or more thereof. In particular, aromatic hydrocarbons and ether solvents are preferably used. The polymerization is carried out usually at a temperature of −100° C. to 100° C., preferably −80° C. to 80° C., more preferably −70° C. to 70° C. and for 1 minute to 500 hours, preferably 10 minutes to 300 hours, more preferably 15 minutes to 150 hours.

The multi-branched polymer of the present invention represented by the general formula (III) is produced by conducting the steps C1 to C3 successively.

Alternatively, the multi-branched polymer of the present invention represented by the general formula (III) can also be produced by successively conducting e.g. the following steps C4, C5 and C6.

<<Step C4>>

A step of producing the polyolefin having two hydroxyl-containing groups at the terminal thereof represented by the general formula (XVIII).

<<Step C5>>

A step of producing a polymer having a functional group at the terminal thereof, selected from the polar polymer having a functional group at the terminal thereof represented by the general formula (XVI), the polar polymer having both a functional group at the terminal thereof and polyolefin side chains, represented by the general formula (XVII), and the polar polymer having a functional group at the terminal thereof used in (c) coupling both segments, that is, the polar polymer chain having polyolefin side chains (A4) and the polar polymer chain (A3) which are polymerized separately to produce the multi-branched polymer represented by the general formula (II) wherein $P^2$ is the polar polymer chain having polyolefin side chains (A4) and $P^3$ is the polar polymer chain (A3).

<<Step C6>>

A step of binding the polyolefin having two hydroxyl-containing groups at the terminal thereof represented by the general formula (XVIII) to the polymer having a functional group at the terminal thereof obtained in the step C5.

Hereinafter, the process for producing the multi-branched polymer of the present invention is described in more detail by reference to the respective steps.

<<Step C4>>

In step C4, the same method as in the step C1 can be used.

<<Step C5>>

Step C5 is a step of producing the polymer having a functional group at the terminal thereof. The method of producing this polymer includes, for example, the same method as in producing the polyolefin having a functional group at the terminal thereof represented by the general formula (XVI) in the step A1, the same method as in producing the polar polymer having both a functional group at the terminal thereof represented by the general formula (XVII) and polyolefin side chains in the step A4, and the same method as in producing the polar polymer having a functional group at the terminal thereof used in (c) coupling both segments, that is, the polar polymer chain having polyolefin side chains (A4) and the polar polymer chain (A3) which are separately polymerized to produce the multi-branched polymer represented by the general formula (II) wherein $P^2$ is the polar polymer chain having polyolefin side chains (A4) and $P^3$ is the polar polymer chain (A3).

<<Step C6>>

Step C6 is a step of coupling reaction of the polyolefin having two hydroxyl-containing groups at the terminal thereof obtained in the step C4, with the polymer having a functional group at the terminal thereof obtained in the step C5. The reactions conditions such as the reaction solvent, reaction temperature, reaction time, and condensation agent and basic catalyst used in the reaction of the polyolefin having two hydroxyl-containing groups at the terminal thereof represented by the general formula (XVIII), with the polymer having a functional group at the terminal thereof obtained in the step C5 can be the same conditions as in the step C2 of reacting the polyolefin having two hydroxyl-containing groups at the terminal thereof represented by the general formula (XVIII) with the compound (J) in conversion of the two hydroxyl groups in the polyolefin into groups having an ability to radical polymerization, anion polymerization or ring-opening polymerization.

The multi-branched polymer represented by the general formula (III) is produced by conducting the steps C4 to C6 successively.

The multi-branched polymer formed by the method described above is isolated by distilling away the solvent used in the polymerization or the unreacted monomer or by using a known method such as re-precipitation with a non-solvent.

[4] Third Preferable Multi-Branched Polymer

The third preferable multi-branched polymer according to the present invention is a polymer containing a star-shaped structure represented by the general formula (IV):

$$(P^6)_{n'}—X^3 \qquad (IV)$$

wherein n' is an integer of 3 or more, and $P^6$ is a polymer chain having a number-average molecular weight (Mn) of 500 to 1,000,000 selected from a polyolefin chain (A1), a polar polymer chain (A3) and a polar polymer chain having polyolefin side chains (A4) wherein a plurality of $P^6$s may be the same or different from one another provided that every $P^6$ is not the polar polymer chain (A3).

$X^3$ is a linking group of less than 200 atoms, consisting of a multifunctional low-molecular compound residue derived from a multifunctional low-molecular compound (K) having three or more atoms or groups selected from a halogen atom, a hydroxyl group, a carboxyl group, an acid halide group, an amino group, an epoxy group and an isocyanato group.

The multifunctional low-molecular compound (K) in the present invention is a compound having three or more atoms or groups selected from a halogen atom, a hydroxyl group, a carboxyl group, an acid halide group, an amino group, an epoxy group and an isocyanato group, and the compound (K) is specifically halogenated silane such as, for example, silicon tetrachloride, trichlorosilane, chloromethyl trichlorosilane, methyl trichlorosilane, ethyl trichlorosilane, n-propyl trichlorosilane, bis(trichlorosilyl)ethane, tris(trichlorosilylethyl)methyl silane and tetrakis(trichlorosilylethyl)silane, a metal halide such as titanium tetrachloride, zirconium tetrachloride and aluminum chloride, alkyl aluminum such as trimethyl aluminum, triethyl aluminum and triisobutyl aluminum, a polyvalent alcohol such as glycerin, pentaerythritol, D-glucitol, quercitol, inositol, trihydroxybenzene and hexahydroxybenzene, carboxylic acid anhydride, polyvalent carboxylic acid halide, or a polyvalent amine such as 4,4',4"-triaminotriphenyl methane.

The linking group $X^3$ is not particularly limited insofar as it is a group of less than 200 atoms, consisting of a multifunctional low-molecular compound residue derived from the multifunctional low-molecular compound (K), and specifically it is a group containing the structure shown below.

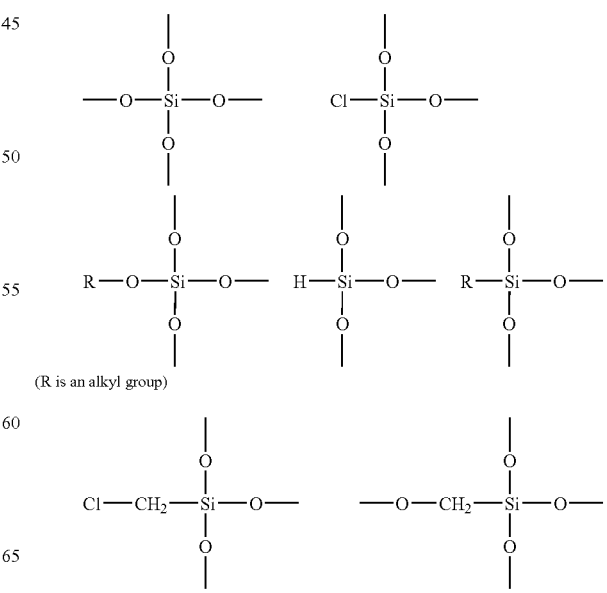

(R is an alkyl group)

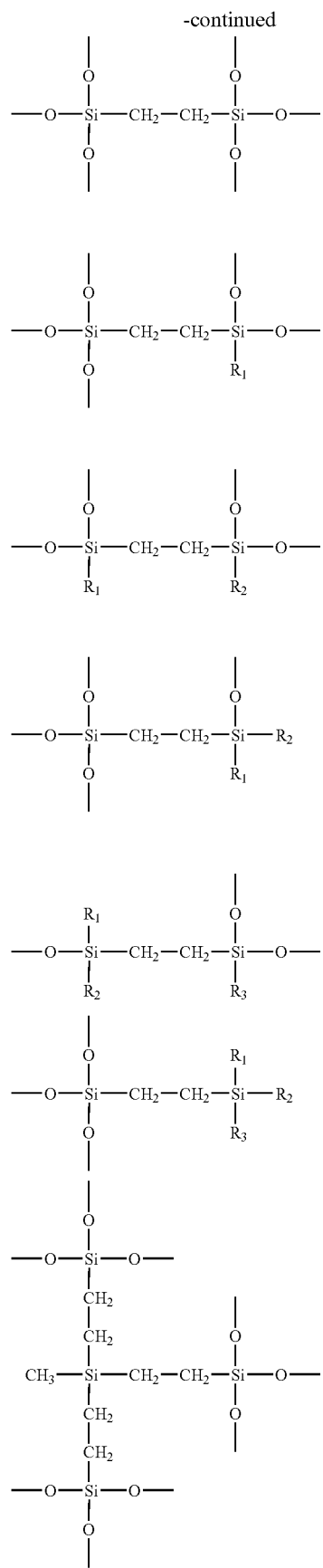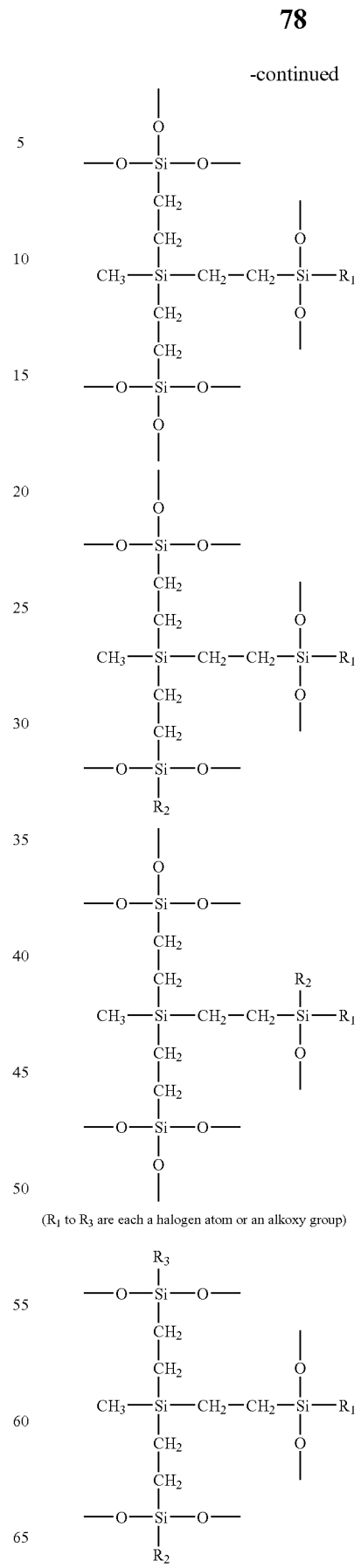
($R_1$ to $R_3$ are each a halogen atom or an alkoxy group)

-continued
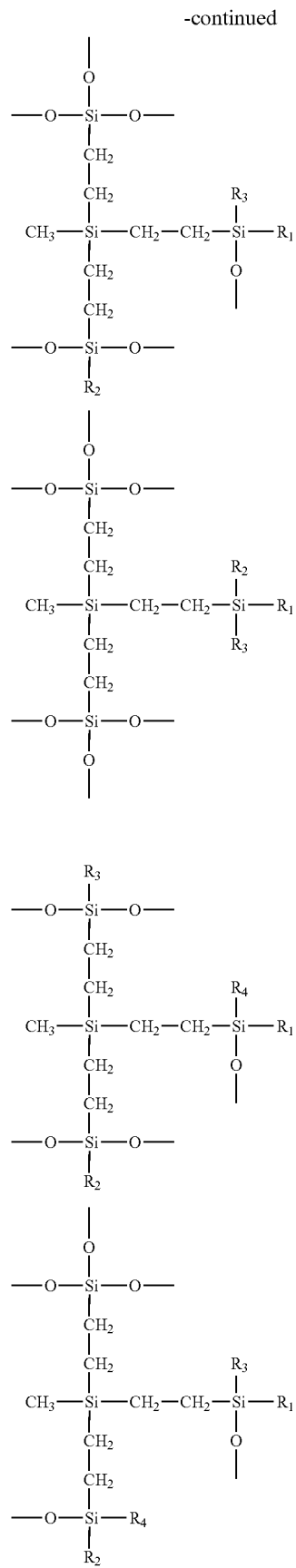
-continued
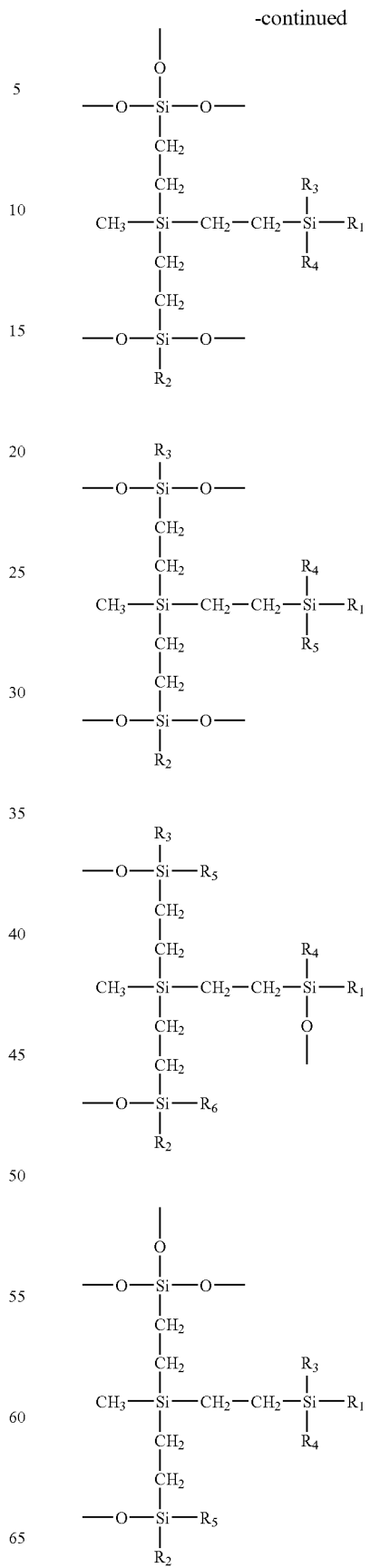

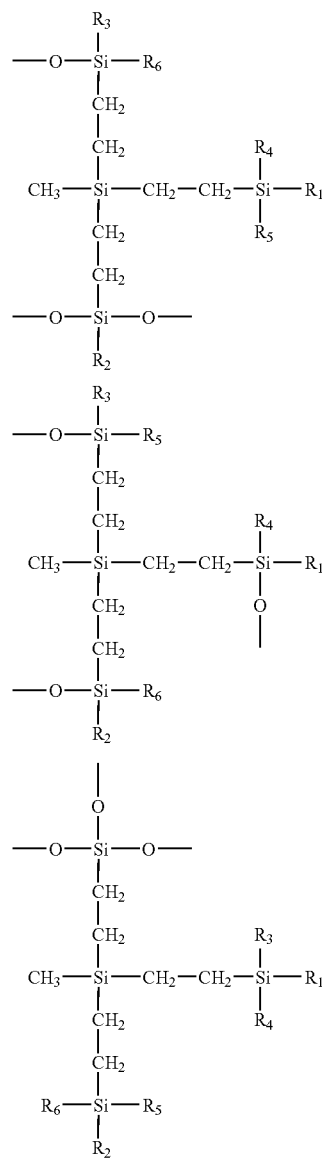
(R₁ to R₆ are each a halogen atom or an alkoxy group)
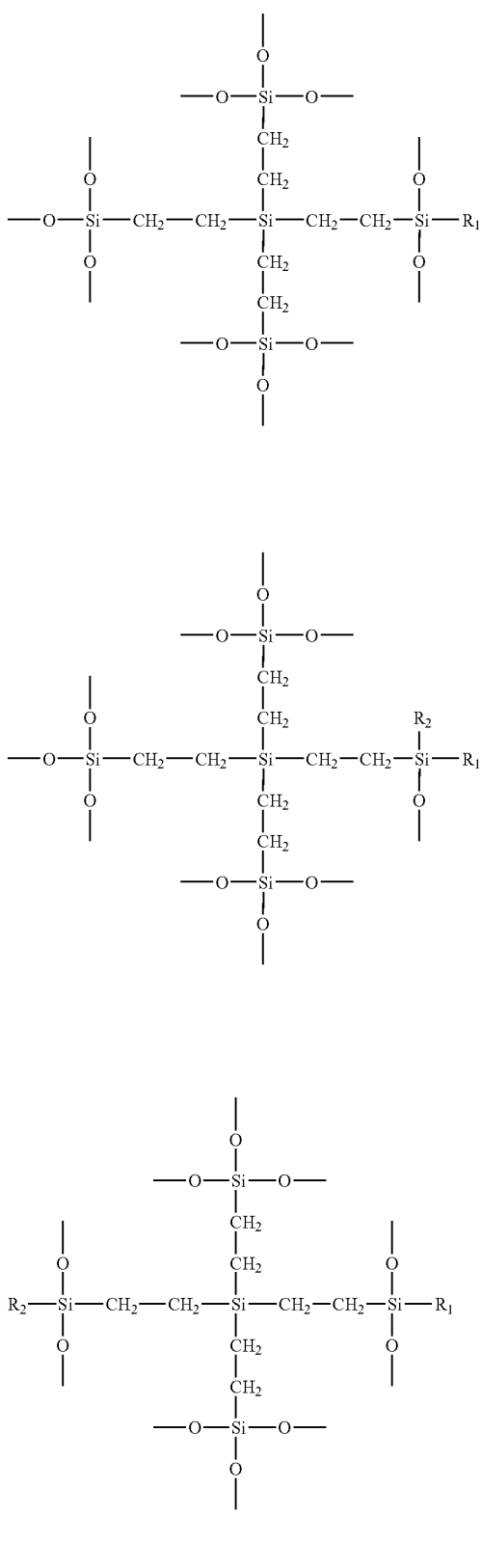

-continued
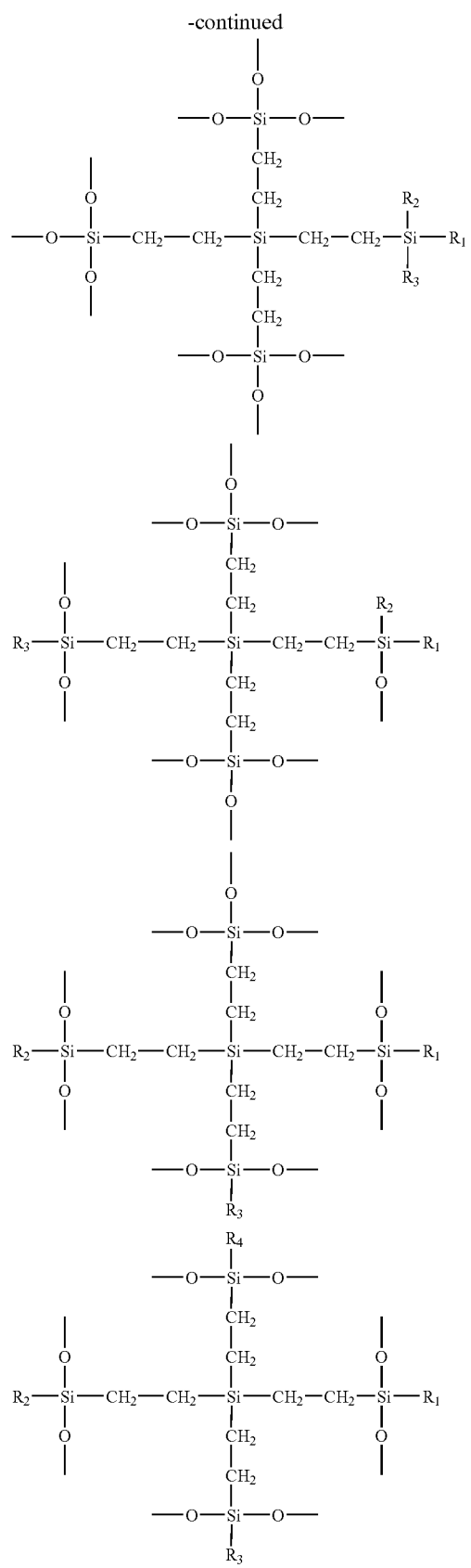
(R₁ to R₄ are each a halogen atom or an alkoxy group)
-continued
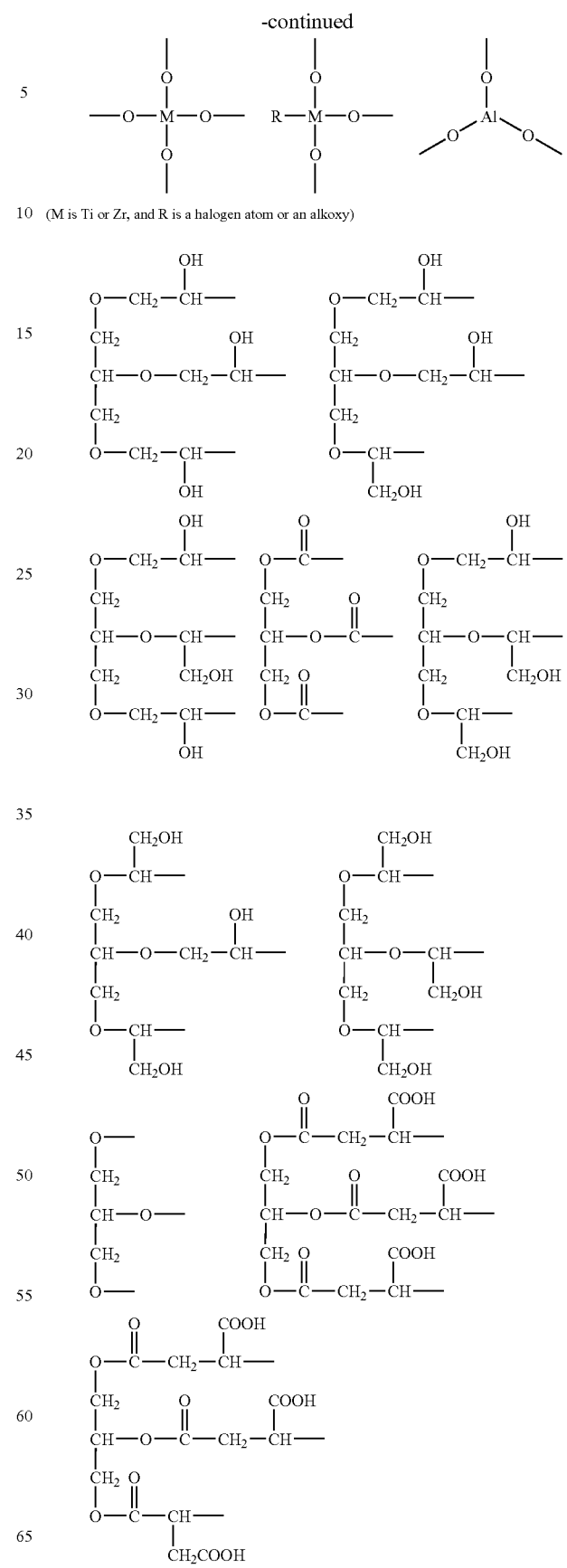
(M is Ti or Zr, and R is a halogen atom or an alkoxy)

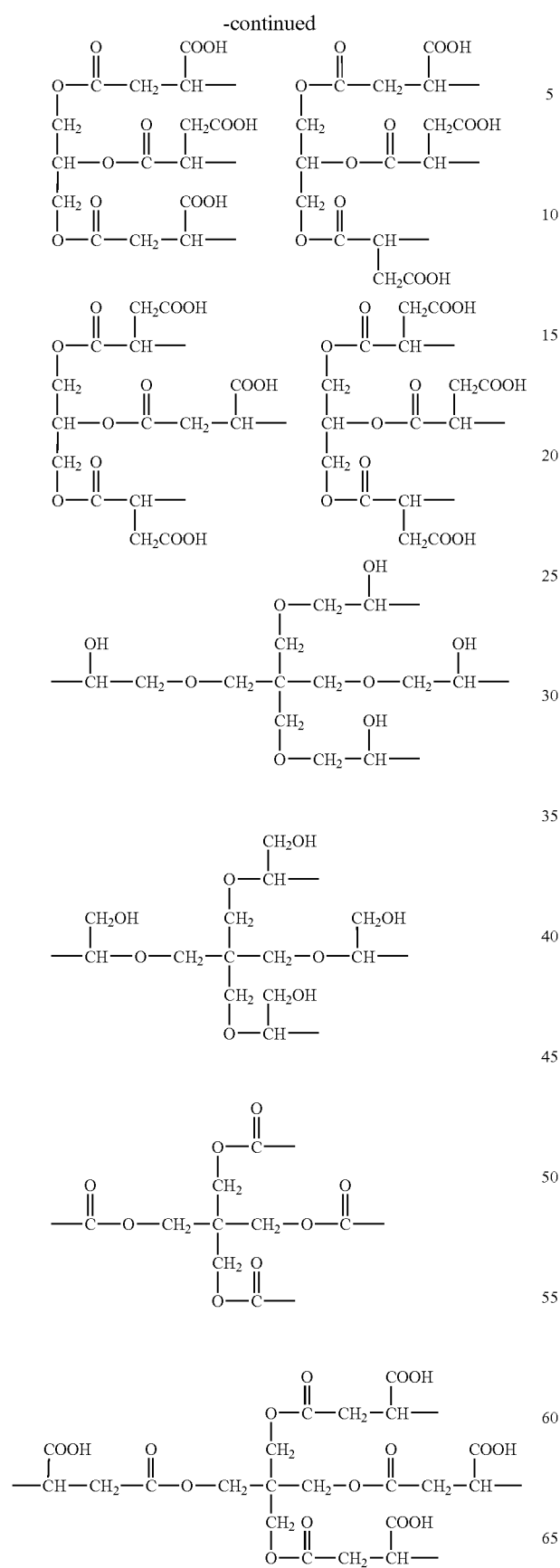
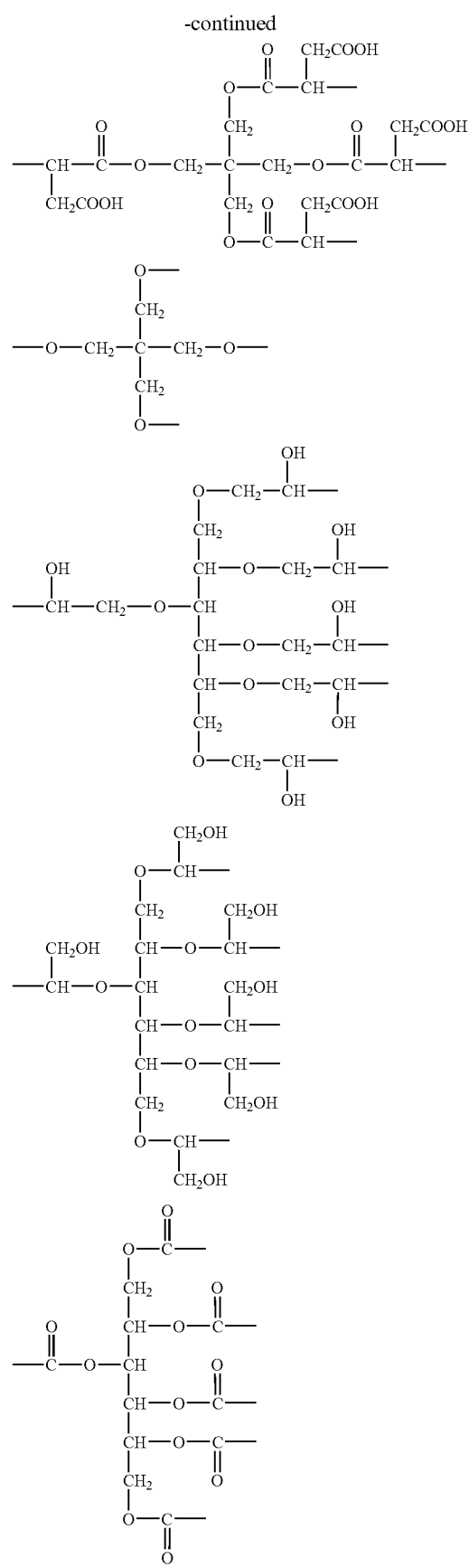

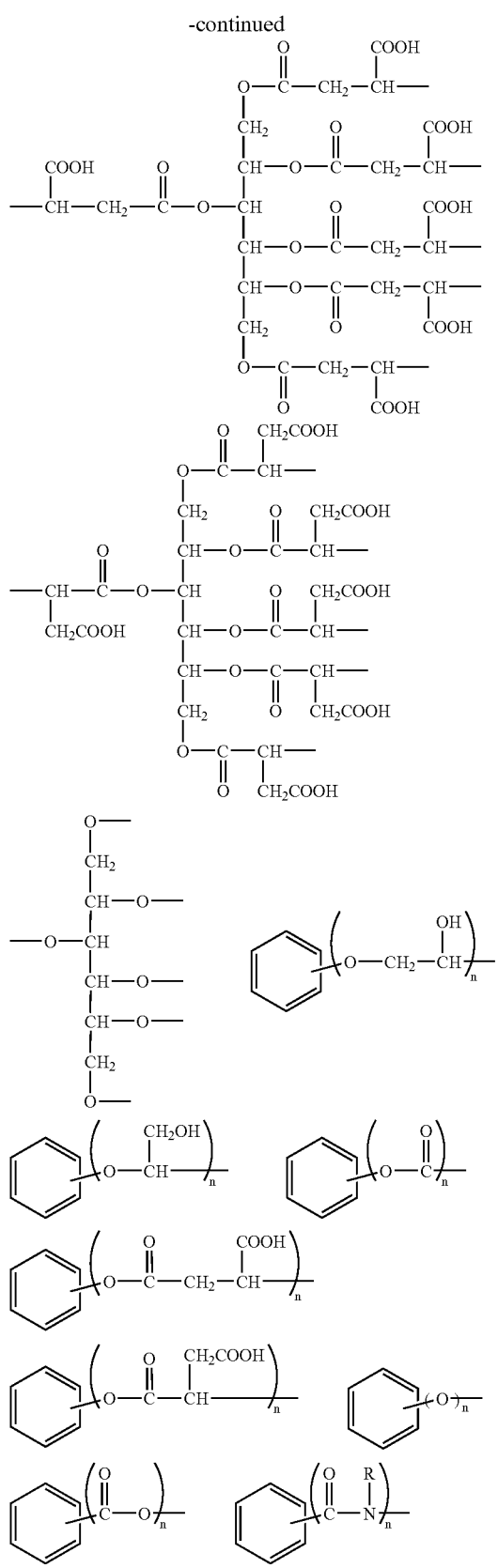

(n = 3 to 6, and R is a hydrogen atom or an alkyl group)

The combination of the polymer chains constituting the multi-branched polymer represented by the general formula (IV) is for example as follows:

(1) The multi-branched polymer shown in FIG. 3-1, wherein n' is 3, and all of three $P^6$s are each the polyolefin chain (A1).

(2) The multi-branched polymer shown in FIG. 3-2, wherein n' is 3, and all of three $P^6$s are each the polar polymer chain having polyolefin side chains (A4).

(3) The multi-branched polymer shown in FIG. 3-3, wherein n' is 3, and two of three $P^6$s are each the polyolefin chain (A1), and the last one is the polar polymer chain (A3).

(4) The multi-branched polymer shown in FIG. 3-4, wherein n' is 3, and two of three $P^6$s are each the polyolefin chain (A1), and the last one is the polar polymer chain having polyolefin side chains (A4).

Figures 1, 2:
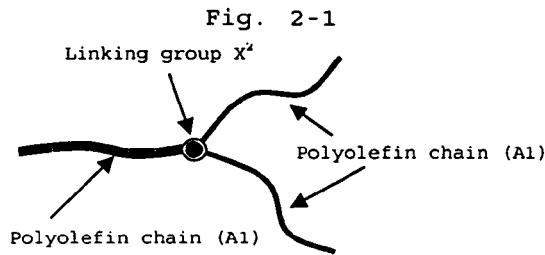
Figure 2:
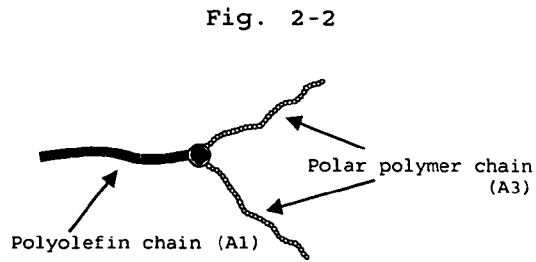
Figures 2, 3:
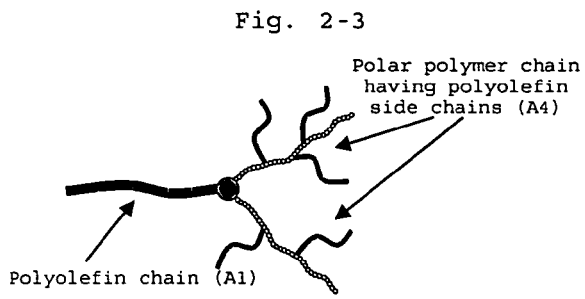
Figures 2, 3, 4:
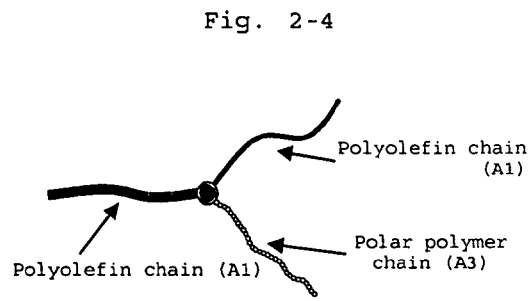
Figures 2, 3, 4, 5:
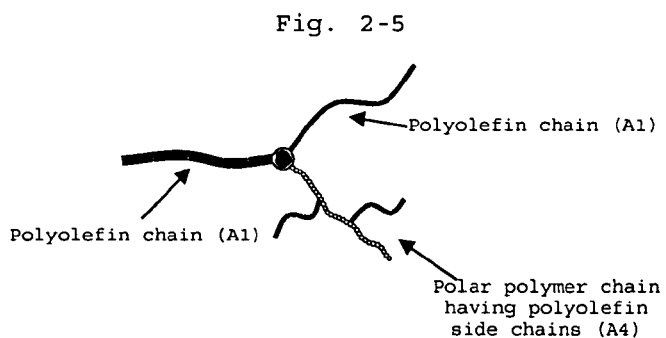

(5) The multi-branched polymer shown in FIG. 3-5, wherein n' is 3, and two of three $P^6$s are each the polar polymer chain (A3), and the last one is the polyolefin chain (A1).

(6) The multi-branched polymer shown in FIG. 3-6, wherein n' is 3, and two of three $P^6$s are each the polar polymer chain (A3), and the last one is the polar polymer chain having polyolefin side chains (A4).

(7) The multi-branched polymer shown in FIG. 3-7, wherein n' is 3, and two of three $P^6$s are each the polar polymer chain having polyolefin side chains (A4), and the last one is the polyolefin chain (A1).

(8) The multi-branched polymer shown in FIG. 3-8, wherein n' is 3, and two of three $P^6$s are each the polar polymer chain having polyolefin side chains (A4), and the last one is the polar polymer chain (A3).

(9) The multi-branched polymer shown in FIG. 3-9, wherein n' is 3, and one of three $P^6$s is the polyolefin chain (A1), another one is the polar polymer chain (A3), and the last one is the polar polymer chain having polyolefin side chains (A4).

(10) The multi-branched polymer shown in FIG. 3-10, wherein n' is 4, and all of four $P^6$s are each the polyolefin chain (A1).

(11) The multi-branched polymer shown in FIG. 3-11, wherein n' is 4, and all of four $P^6$s are each the polar polymer chain having polyolefin side chains (A4).

(12) The multi-branched polymer shown in FIG. 3-12, wherein n' is 4, and three of four $P^6$s are each the polyolefin chain (A1), and the last one is the polar polymer chain (A3).

(13) The multi-branched polymer shown in FIG. 3-13, wherein n' is 4, and three of four $P^6$s are each the polyolefin chain (A1), and the last one is the polar polymer chain having polyolefin side chains (A4).

(14) The multi-branched polymer shown in FIG. 3-14, wherein n' is 4, and three of four $P^6$s are each the polar polymer chain (A3), and the last one is the polyolefin chain (A1).

(15) The multi-branched polymer shown in FIG. 3-15, wherein n' is 4, and three of four $P^6$s are each the polar polymer chain (A3), and the last one is the polar polymer chain having polyolefin side chains (A4).

(16) The multi-branched polymer shown in FIG. 3-16, wherein n' is 4, and three of four $P^6$s are each the polar polymer chain having polyolefin side chains (A4), and the last one is the polyolefin chain (A1).

(17) The multi-branched polymer shown in FIG. 3-17, wherein n' is 4, and three of four $P^6$s are each the polar polymer chain having polyolefin side chains (A4), and the last one is the polar polymer chain (A3).

(18) The multi-branched polymer shown in FIG. 3-18, wherein n' is 4, and two of four $P^6$s are each the polyolefin chain (A1), and the remaining two are each the polar polymer chain (A3).

(19) The multi-branched polymer shown in FIG. 3-19, wherein n' is 4, and two of four $P^6$s are each the polyolefin chain (A1), and the remaining two are each the polar polymer chain having polyolefin side chains (A4).

(20) The multi-branched polymer shown in FIG. 3-20, wherein n' is 4, and two of four $P^6$s are each the polyolefin chain (A1), another one is the polar polymer chain (A3), and the last one is the polar polymer chain having polyolefin side chains (A4).

(21) The multi-branched polymer shown in FIG. 3-21, wherein n' is 4, and two of four $P^6$s are each the polar polymer chain (A3), and the remaining two are each the polar polymer chain having polyolefin side chains (A4).

(22) The multi-branched polymer shown in FIG. 3-22, wherein n' is 4, and two of four $P^6$s are each the polar polymer chain (A3), another one is the polyolefin chain (A1), and the last one is the polar polymer chain having polyolefin side chains (A4).

(23) The multi-branched polymer shown in FIG. 3-23, wherein n' is 4, and two of four $P^6$s are each the polar polymer chain having polyolefin side chains (A4), another one is the polyolefin chain (A1), and the last one is the polar polymer chain (A3).

(24) The multi-branched polymer shown in FIG. 3-24, wherein n' is 5, and all of five $P^6$s are each the polyolefin chain (A1).

(25) The multi-branched polymer shown in FIG. 3-25, wherein n' is 5, and all of five $P^6$s are each the polar polymer chain having polyolefin side chains (A4).

(26) The multi-branched polymer shown in FIG. 3-26, wherein n' is 5, and four of five $P^6$s are each the polyolefin chain (A1), and the last one is the polar polymer chain (A3).

(27) The multi-branched polymer shown in FIG. 3-27, wherein n' is 5, and four of five $P^6$s are each the polyolefin chain (A1), and the last one is the polar polymer chain having polyolefin side chains (A4).

(28) The multi-branched polymer shown in FIG. 3-28, wherein n' is 5, and four of five $P^6$s are each the polar polymer chain (A3), and the last one is the polyolefin chain (A1).

(29) The multi-branched polymer shown in FIG. 3-29, wherein n' is 5, and four of five $P^6$s are each the polar polymer chain (A3), and the last one is the polar polymer chain having polyolefin side chains (A4).

(30) The multi-branched polymer shown in FIG. 3-30, wherein n' is 5, and four of five $P^6$s are each the polar polymer chain having polyolefin side chains (A4), and the last one is the polyolefin chain (A1).

(31) The multi-branched polymer shown in FIG. 3-31, wherein n' is 5, and four of five $P^6$s are each the polar polymer chain having polyolefin side chains (A4), and the last one is the polar polymer chain (A3).

(32) The multi-branched polymer shown in FIG. 3-32, wherein n' is 5, and three of five $P^6$s are each the polyolefin chain (A1), and the remaining two are each the polar polymer chain (A3).

(33) The multi-branched polymer shown in FIG. 3-33, wherein n' is 5, and three of five $P^6$s are each the polyolefin chain (A1), and the remaining two are each the polar polymer chain having polyolefin side chains (A4).

(34) The multi-branched polymer shown in FIG. 3-34, wherein n' is 5, and three of five $P^6$s are each the polyolefin chain (A1), another one is the polar polymer chain (A3), and the last one is the polar polymer chain having polyolefin side chains (A4).

(35) The multi-branched polymer shown in FIG. 3-35, wherein n' is 5, and three of five $P^6$s are each the polar polymer chain (A3), and the remaining two are each the polyolefin chain (A1).

(36) The multi-branched polymer shown in FIG. 3-36, wherein n' is 5, and three of five $P^6$s are each the polar polymer chain (A3), and the remaining two are each the polar polymer chain having polyolefin side chains (A4).

(37) The multi-branched polymer shown in FIG. 3-37, wherein n' is 5, and three of five $P^6$s are each the polar polymer chain (A3), another one is the polyolefin chain (A1), and the last one is the polar polymer chain having polyolefin side chains (A4).

(38) The multi-branched polymer shown in FIG. 3-38, wherein n' is 5, and three of five $P^6$s are each the polar polymer chain having polyolefin side chains (A4), and the remaining two are each the polyolefin chain (A1).

(39) The multi-branched polymer shown in FIG. 3-39, wherein n' is 5, and three of five $P^6$s are each the polar polymer chain having polyolefin side chains (A4), and the remaining two are each the polar polymer chain (A3).

(40) The multi-branched polymer shown in FIG. 3-40, wherein n' is 5, and three of five $P^6$s are each the polar polymer chain having polyolefin side chains (A4), another one is the polyolefin chain (A1), and the last one is the polar polymer chain (A3).

(41) The multi-branched polymer shown in FIG. 3-41, wherein n' is 5, and two of five $P^6$s are each the polyolefin chain (A1), other two are each the polar polymer chain (A3), and the last one is the polar polymer chain having polyolefin side chains (A4).

(42) The multi-branched polymer shown in FIG. 3-42, wherein n' is 5, and two of five $P^6$s are each the polyolefin chain (A1), other two are each the polar polymer chain having polyolefin side chains (A4), and the last one is the polar polymer chain (A3).

(43) The multi-branched polymer shown in FIG. 3-43, wherein n' is 5, and two of five $P^6$s are each the polar polymer chain (A3), other two are each the polar polymer chain having polyolefin side chains (A4), and the last one is the polyolefin chain (A1).

(44) The multi-branched polymer shown in FIG. 3-44, wherein n' is 6, and all of six $P^6$s are each the polyolefin chain (A1).

(45) The multi-branched polymer shown in FIG. 3-45, wherein n' is 6, and all of six $P^6$s are each the polar polymer chain having polyolefin side chains (A4).

(46) The multi-branched polymer shown in FIG. 3-46, wherein n' is 6, and five of six $P^6$s are each the polyolefin chain (A1), and the last one is the polar polymer chain (A3).

(47) The multi-branched polymer shown in FIG. 3-47, wherein n' is 6, and five of six $P^6$s are each the polyolefin chain (A1), and the last one is the polar polymer chain having polyolefin side chains (A4).

(48) The multi-branched polymer shown in FIG. 3-48, wherein n' is 6, and five of six $P^6$s are each the polar polymer chain (A3), and the last one is the polyolefin chain (A1).

(49) The multi-branched polymer shown in FIG. 3-49, wherein n' is 6, and five of six $P^6$s are each the polar polymer chain (A3), and the last one is the polar polymer chain having polyolefin side chains (A4).

(50) The multi-branched polymer shown in FIG. 3-50, wherein n' is 6, and five of six $P^6$s are each the polar polymer chain having polyolefin side chains (A4), and the last one is the polyolefin chain (A1).

(51) The multi-branched polymer shown in FIG. 3-51, wherein n' is 6, and five of six $P^6$s are each the polar polymer chain having polyolefin side chains (A4), and the last one is the polar polymer chain (A3).

(52) The multi-branched polymer shown in FIG. 3-52, wherein n' is 6, and four of six $P^6$s are each the polyolefin chain (A1), and the remaining two are each the polar polymer chain (A3).

(53) The multi-branched polymer shown in FIG. 3-53, wherein n' is 6, and four of six $P^6$s are each the polyolefin chain (A1), and the remaining two are each the polar polymer chain having polyolefin side chains (A4).

Figures 1, 3:
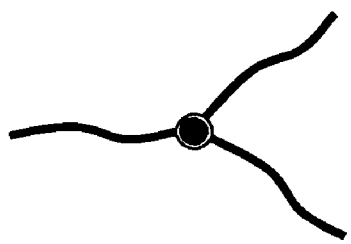
Figures 2, 3:
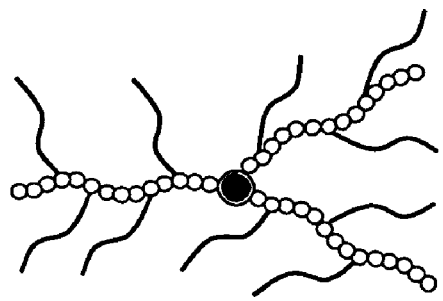
Figure 3:
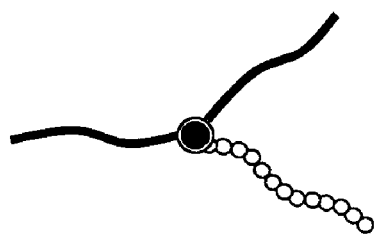
Figures 3, 4:
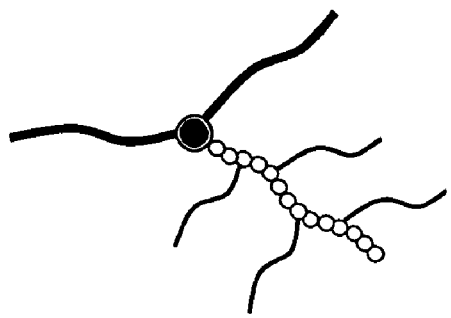
Figures 3, 4, 5:
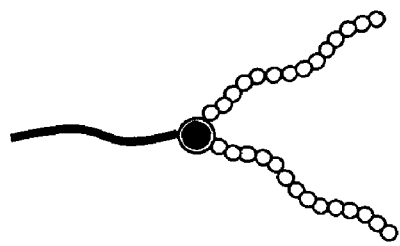
Figures 3, 4, 5, 6:
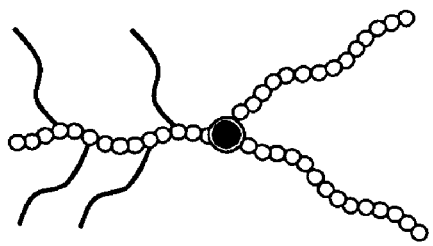
Figures 3, 4, 5, 6, 7:
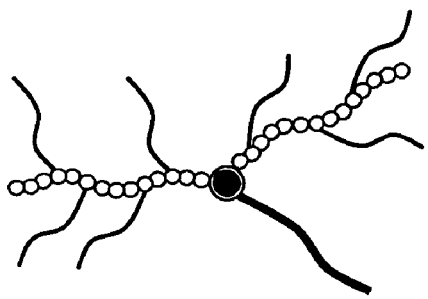
Figures 3, 4, 5, 6, 7, 8:
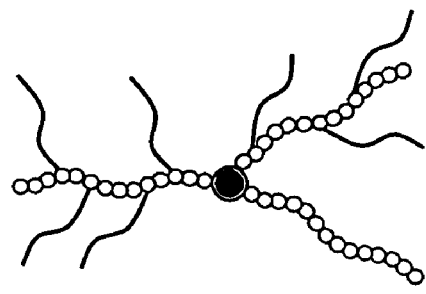
Figures 3, 4, 5, 6, 7, 8, 9:
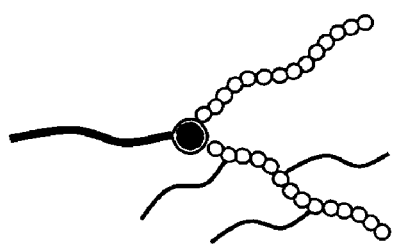
Figures 3, 4, 5, 6, 7, 8, 9, 10:
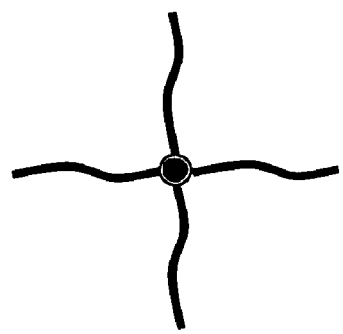
Figures 3, 4, 5, 6, 7, 8, 9, 10, 11:
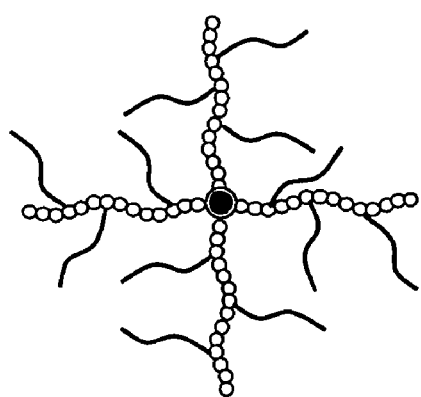
Figures 3, 4, 5, 6, 7, 8, 9, 10, 11, 12:
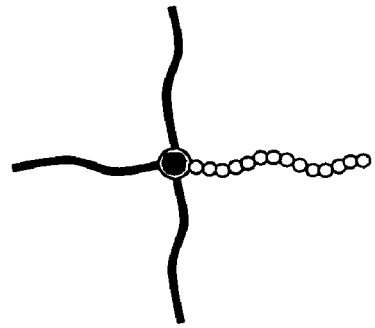
Figures 3, 4, 5, 6, 7, 8, 9, 10, 11, 12, 13:
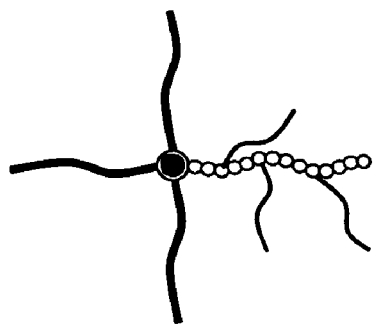
Figures 3, 4, 5, 6, 7, 8, 9, 10, 11, 12, 13, 14:
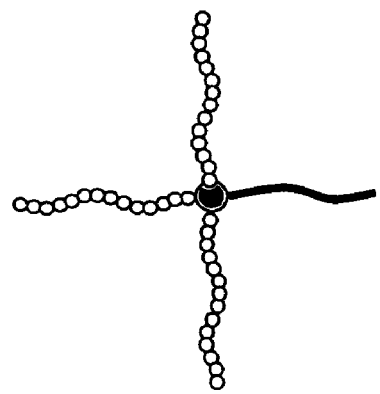
Figures 3, 4, 5, 6, 7, 8, 9, 10, 11, 12, 13, 14, 15:
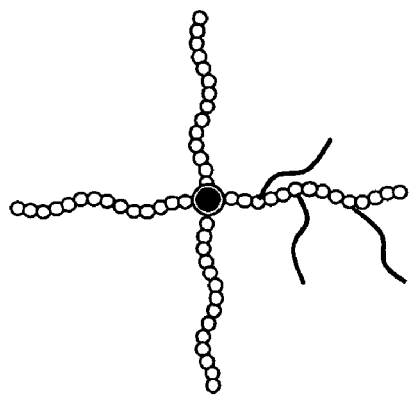
Figures 3, 4, 5, 6, 7, 8, 9, 10, 11, 12, 13, 14, 15, 16:
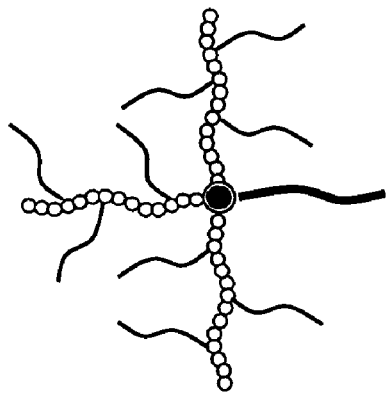
Figures 3, 4, 5, 6, 7, 8, 9, 10, 11, 12, 13, 14, 15, 16, 17:
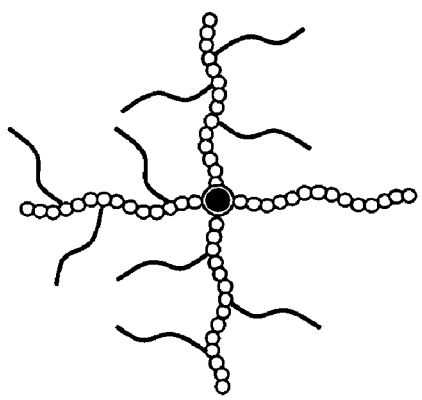
Figures 3, 4, 5, 6, 7, 8, 9, 10, 11, 12, 13, 14, 15, 16, 17, 18:
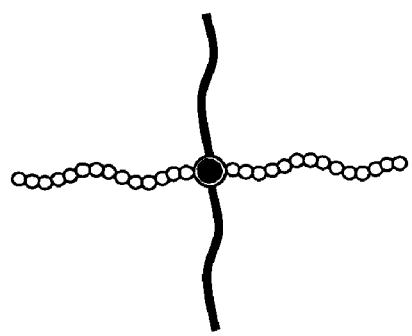
Figures 3, 4, 5, 6, 7, 8, 9, 10, 11, 12, 13, 14, 15, 16, 17, 18, 19:
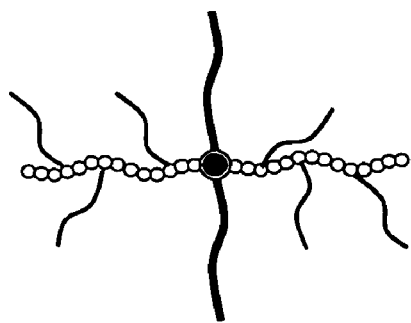
Figures 3, 4, 5, 6, 7, 8, 9, 10, 11, 12, 13, 14, 15, 16, 17, 18, 19, 20:
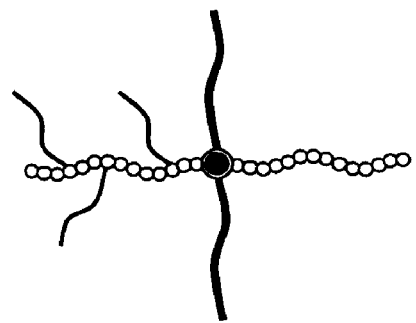
Figures 3, 4, 5, 6, 7, 8, 9, 10, 11, 12, 13, 14, 15, 16, 17, 18, 19, 20, 21:
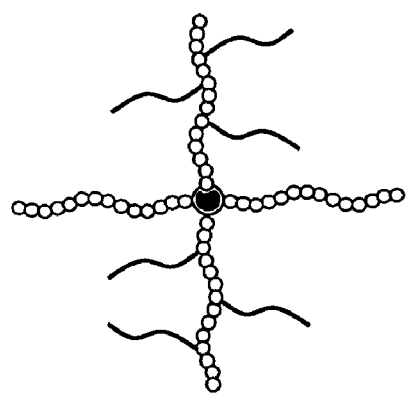
Figures 3, 4, 5, 6, 7, 8, 9, 10, 11, 12, 13, 14, 15, 16, 17, 18, 19, 20, 21, 22:
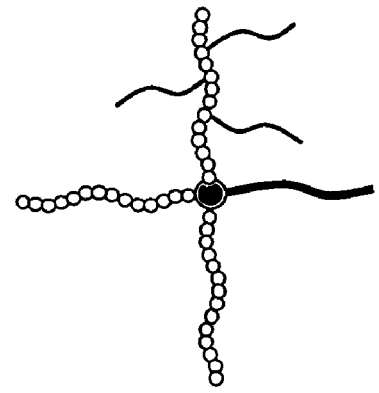
Figures 3, 4, 5, 6, 7, 8, 9, 10, 11, 12, 13, 14, 15, 16, 17, 18, 19, 20, 21, 22, 23:
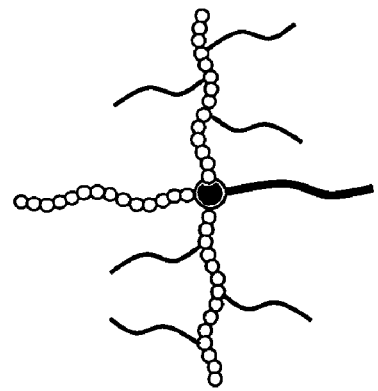
Figures 3, 4, 5, 6, 7, 8, 9, 10, 11, 12, 13, 14, 15, 16, 17, 18, 19, 20, 21, 22, 23, 24:
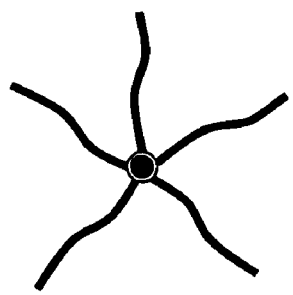
Figures 3, 4, 5, 6, 7, 8, 9, 10, 11, 12, 13, 14, 15, 16, 17, 18, 19, 20, 21, 22, 23, 24, 25:
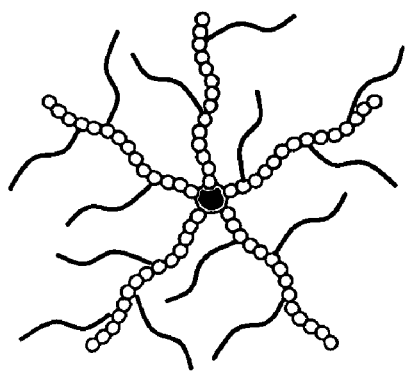
Figures 3, 4, 5, 6, 7, 8, 9, 10, 11, 12, 13, 14, 15, 16, 17, 18, 19, 20, 21, 22, 23, 24, 25, 26:
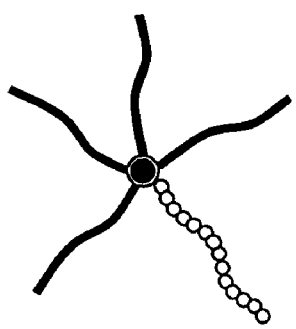
Figures 3, 4, 5, 6, 7, 8, 9, 10, 11, 12, 13, 14, 15, 16, 17, 18, 19, 20, 21, 22, 23, 24, 25, 26, 27:
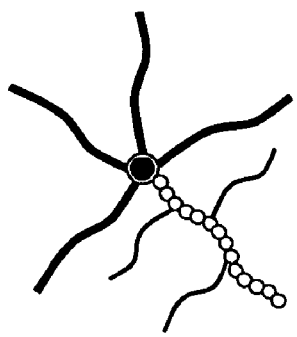
Figures 3, 4, 5, 6, 7, 8, 9, 10, 11, 12, 13, 14, 15, 16, 17, 18, 19, 20, 21, 22, 23, 24, 25, 26, 27, 28:
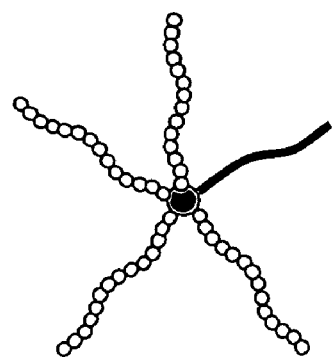
Figures 3, 4, 5, 6, 7, 8, 9, 10, 11, 12, 13, 14, 15, 16, 17, 18, 19, 20, 21, 22, 23, 24, 25, 26, 27, 28, 29:
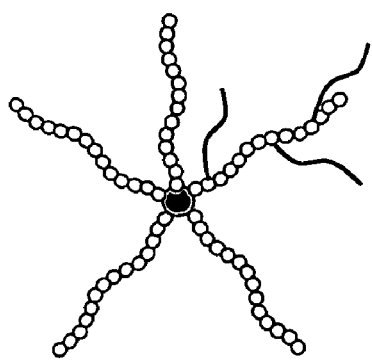
Figures 3, 4, 5, 6, 7, 8, 9, 10, 11, 12, 13, 14, 15, 16, 17, 18, 19, 20, 21, 22, 23, 24, 25, 26, 27, 28, 29, 30:
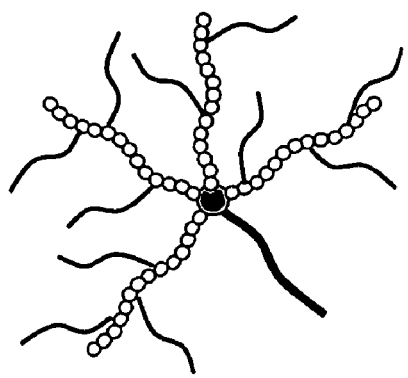
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31:
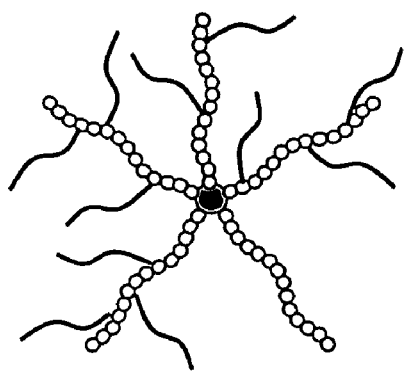
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32:
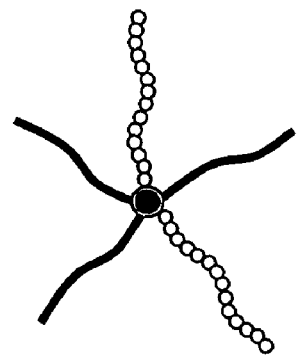
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33:
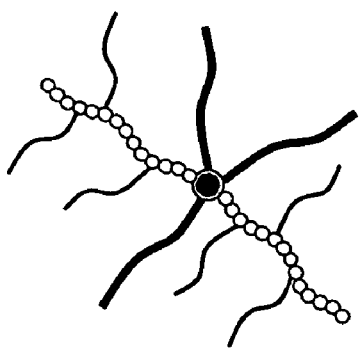
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34:
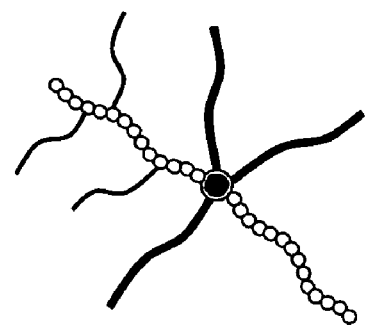
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35:
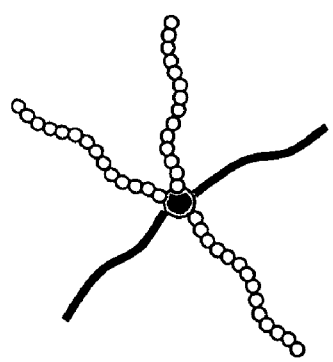
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
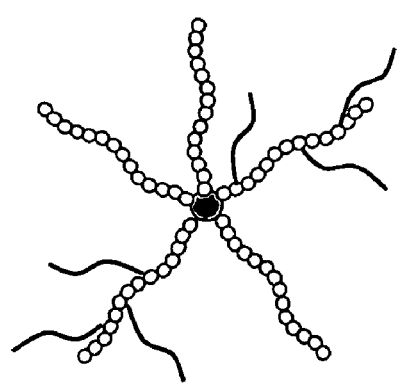
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
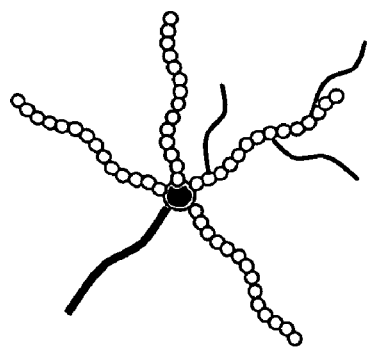
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
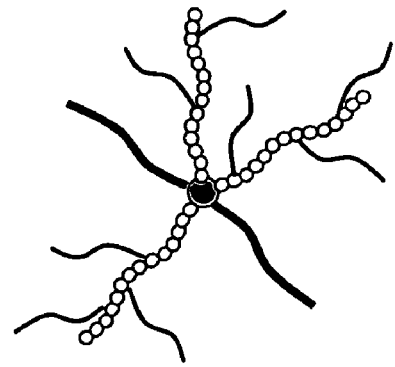
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
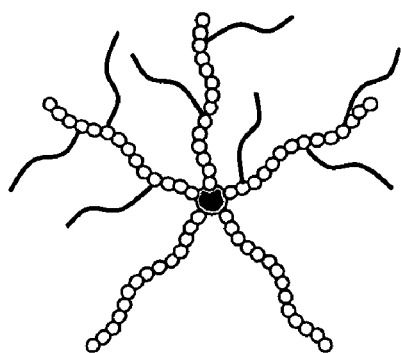
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
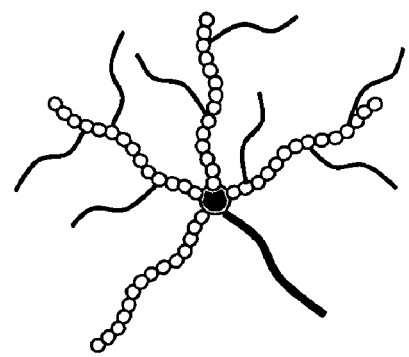
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
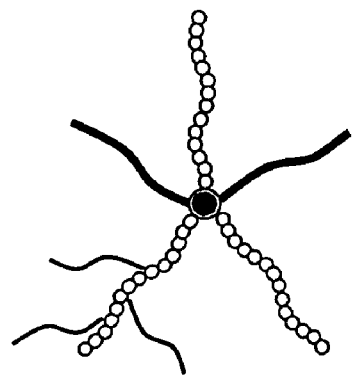
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42:
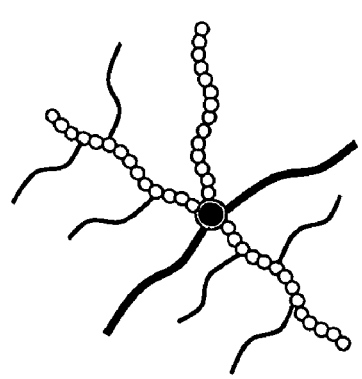
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43:
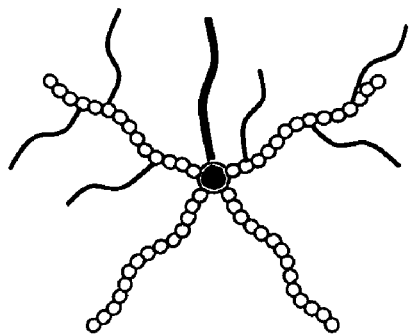
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44:
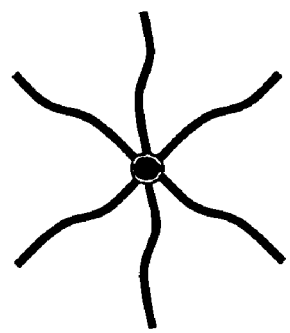
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45:
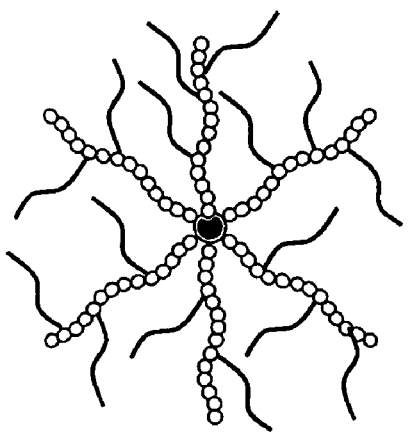
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46:
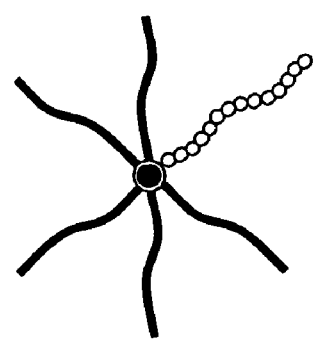
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47:
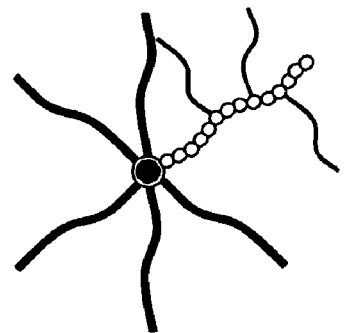
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48:
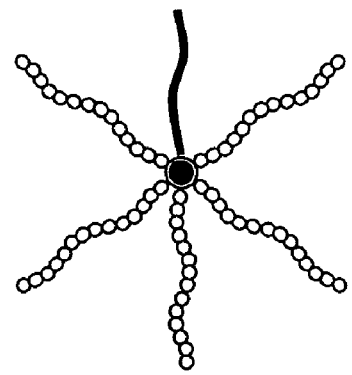
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
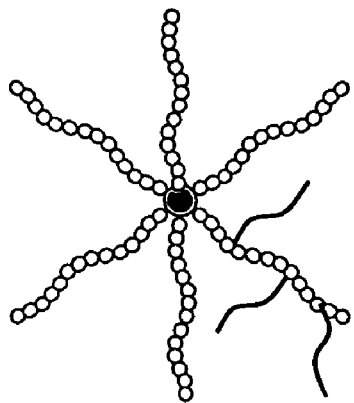
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
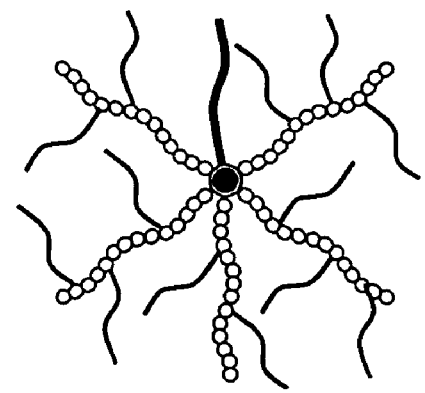
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51:
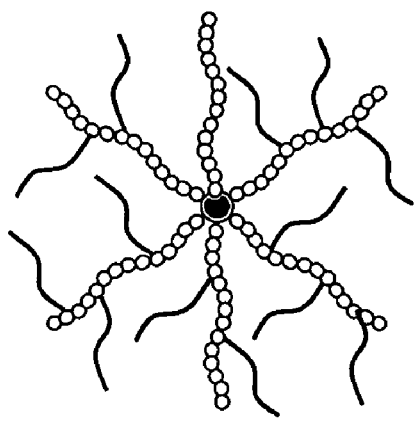
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52:
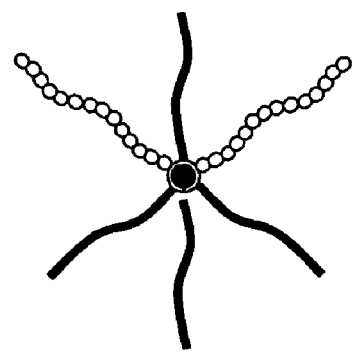
Figures 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53:
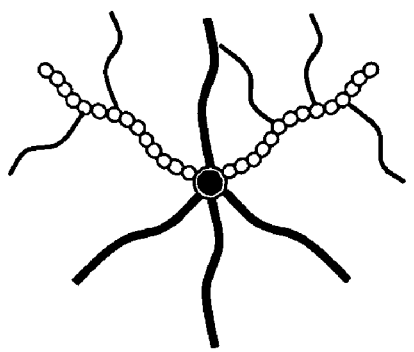
Figures 3, 54:
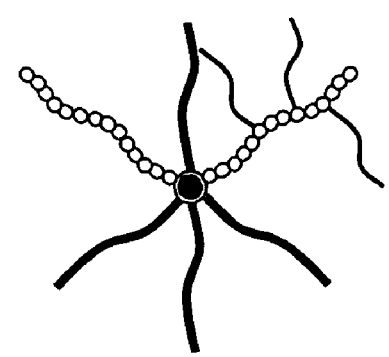

(54) The multi-branched polymer shown in FIG. 3-54, wherein n' is 6, and four of six $P^6$s are each the polyolefin chain (A1), another one is the polar polymer chain (A3), and the last one is the polar polymer chain having polyolefin side chains (A4).

Figures 3, 55:
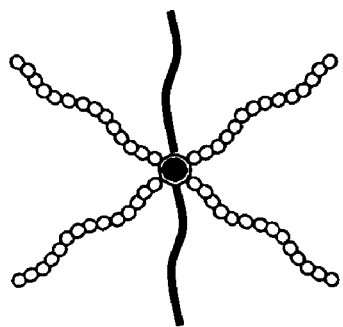

(55) The multi-branched polymer shown in FIG. 3-55, wherein n' is 6, and four of six $P^6$s are each the polar polymer chain (A3), and the remaining two are each the polyolefin chain (A1).

Figures 3, 56:
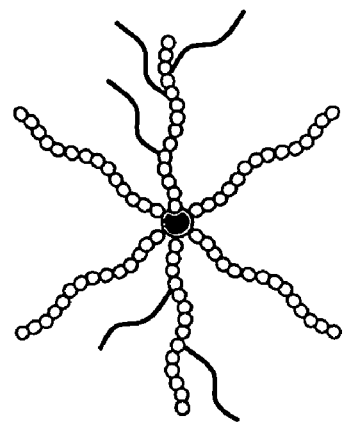

(56) The multi-branched polymer shown in FIG. 3-56, wherein n' is 6, and four of six $P^6$s are each the polar polymer chain (A3), and the remaining two are each the polar polymer chain having polyolefin side chains (A4).

Figures 3, 57:
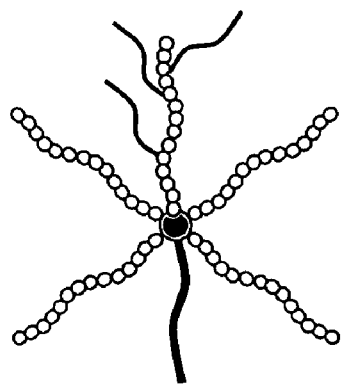

(57) The multi-branched polymer shown in FIG. 3-57, wherein n' is 6, and four of six $P^6$s are each the polar polymer chain (A3), another one is the polyolefin chain (A1), and the last one is the polar polymer chain having polyolefin side chains (A4).

Figures 3, 58:
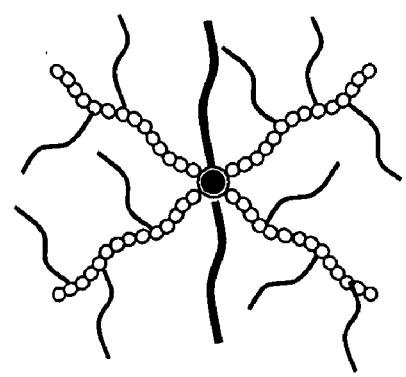

(58) The multi-branched polymer shown in FIG. 3-58, wherein n' is 6, and four of six $P^6$s are each the polar polymer chain having polyolefin side chains (A4), and the remaining two are each the polyolefin chain (A1).

Figures 3, 59:
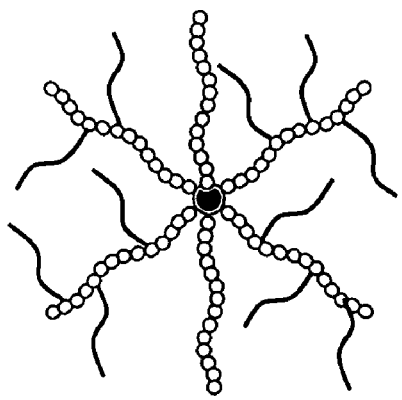

(59) The multi-branched polymer shown in FIG. 3-59, wherein n' is 6, and four of six $P^6$s are each the polar polymer chain having polyolefin side chains (A4), and the remaining two are each the polar polymer chain (A3).

Figures 3, 60:
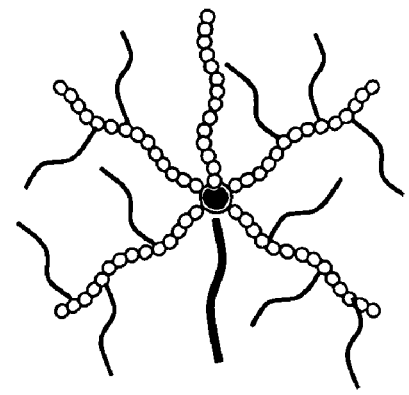

(60) The multi-branched polymer shown in FIG. 3-60, wherein n' is 6, and four of six $P^6$s are each the polar polymer chain having polyolefin side chains (A4), another one is the polyolefin chain (A1), and the last one is the polar polymer chain (A3).

Figures 3, 61:
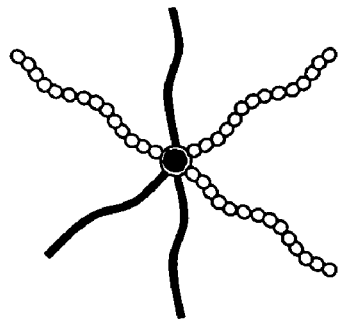

(61) The multi-branched polymer shown in FIG. 3-61, wherein n' is 6, and three of six $P^6$s are each the polyolefin chain (A1), and the remaining three are each the polar polymer chain (A3).

Figures 3, 62:
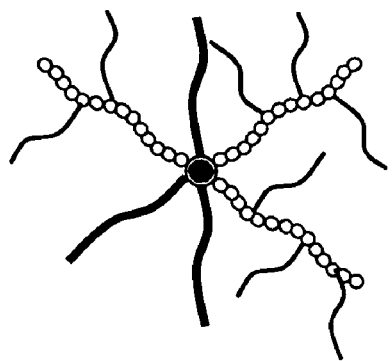

(62) The multi-branched polymer shown in FIG. 3-62, wherein n' is 6, and three of six $P^6$s are each the polyolefin chain (A1), and the remaining three are each the polar polymer chain having polyolefin side chains (A4).

Figures 3, 63:
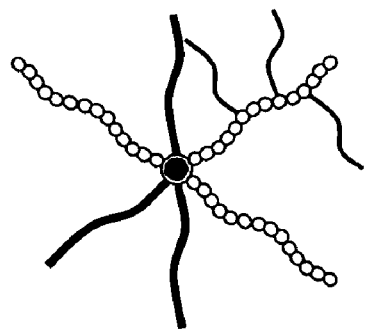

(63) The multi-branched polymer shown in FIG. 3-63, wherein n' is 6, and three of six $P^6$s are each the polyolefin chain (A1), other two are each the polar polymer chain (A3), and the last one is the polar polymer chain having polyolefin side chains (A4).

Figures 3, 64:
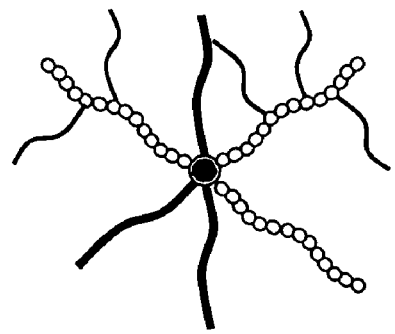

(64) The multi-branched polymer shown in FIG. 3-64, wherein n' is 6, and three of six $P^6$s are each the polyolefin chain (A1), other two are each the polar polymer chain having polyolefin side chains (A4), and the last one is the polar polymer chain (A3).

Figures 3, 65:
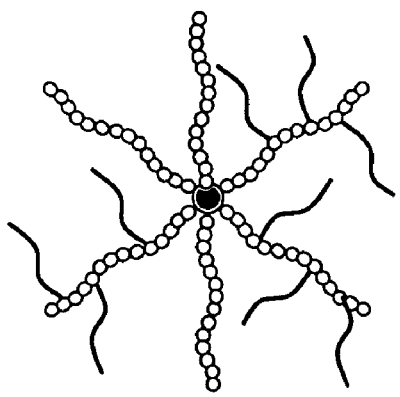

(65) The multi-branched polymer shown in FIG. 3-65, wherein n' is 6, and three of six $P^6$s are each the polar polymer chain (A3), and the remaining three are each the polar polymer chain having polyolefin side chains (A4).

Figures 3, 66:
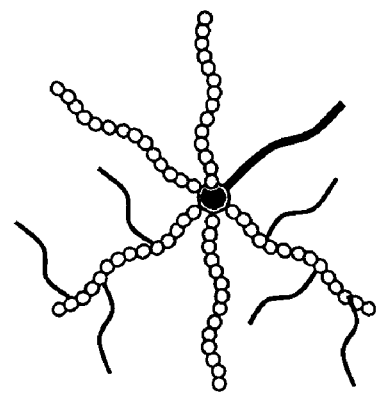

(66) The multi-branched polymer shown in FIG. 3-66, wherein n' is 6, and three of six $P^6$s are each the polar polymer chain (A3), other two are each the polyolefin chain (A1), and the last one is the polar polymer chain having polyolefin side chains (A4).

Figures 3, 67:
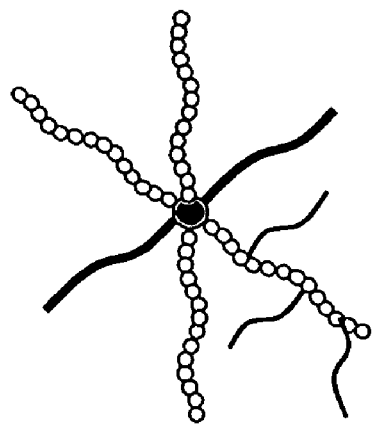

(67) The multi-branched polymer shown in FIG. 3-67, wherein n' is 6, and three of six $P^6$s are each the polar polymer chain (A3), other two are each the polar polymer chain having polyolefin side chains (A4), and the last one is the polyolefin chain (A1).

Figures 3, 68:
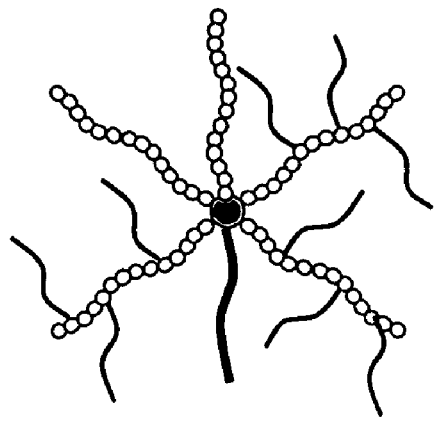

(68) The multi-branched polymer shown in FIG. 3-68, wherein n' is 6, and three of six $P^6$s are each the polar polymer chain having polyolefin side chains (A4), other two are each the polyolefin chain (A1), and the last one is the polar polymer chain (A3).

Figures 3, 69:
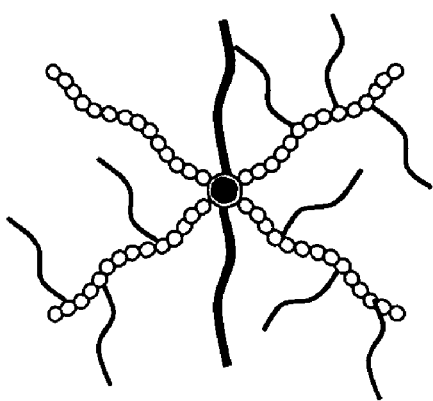

(69) The multi-branched polymer shown in FIG. 3-69, wherein n' is 6, and three of six $P^6$s are each the polar polymer chain having polyolefin side chains (A4), other two are each the polar polymer chain (A3), and the last one is the polyolefin chain (A1).

Figures 3, 70:
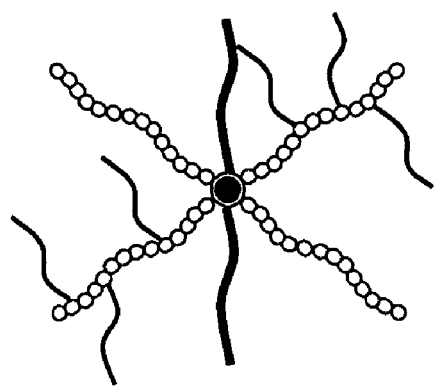
Figure 4:
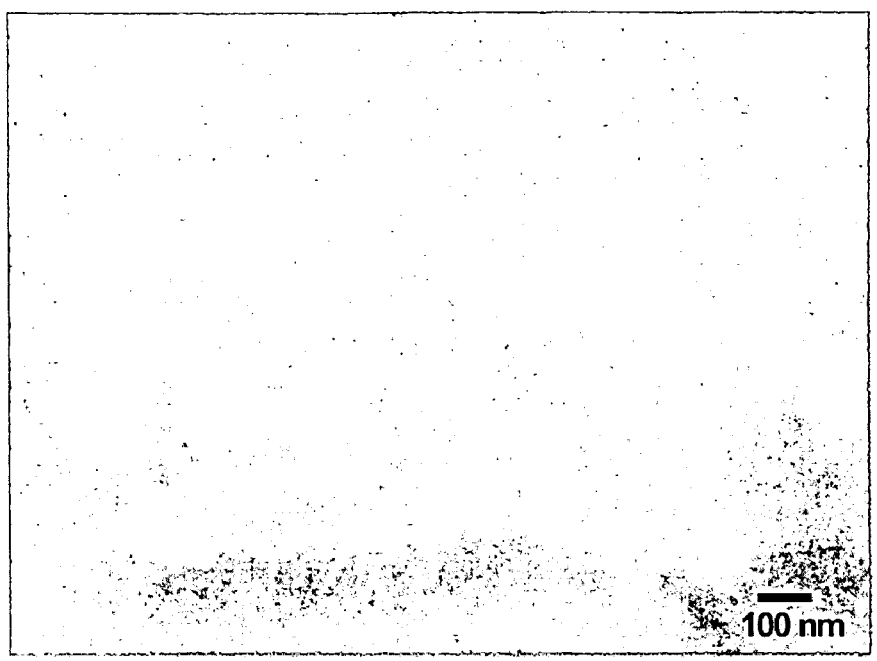
Figure 5:
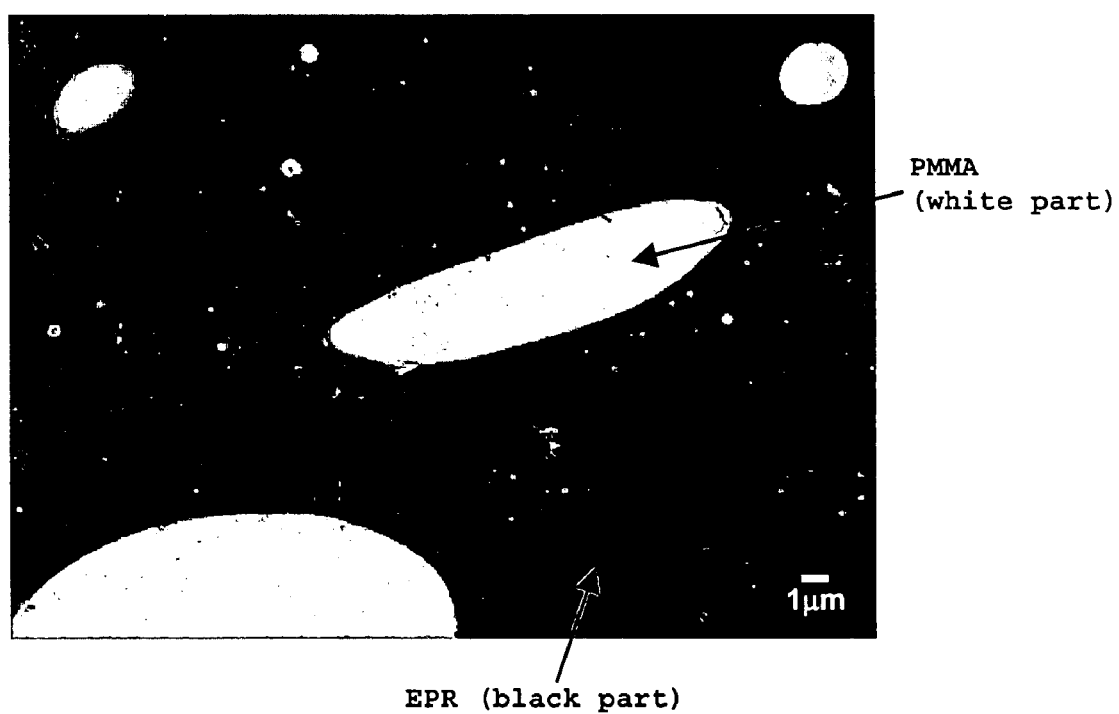
Figure 6:
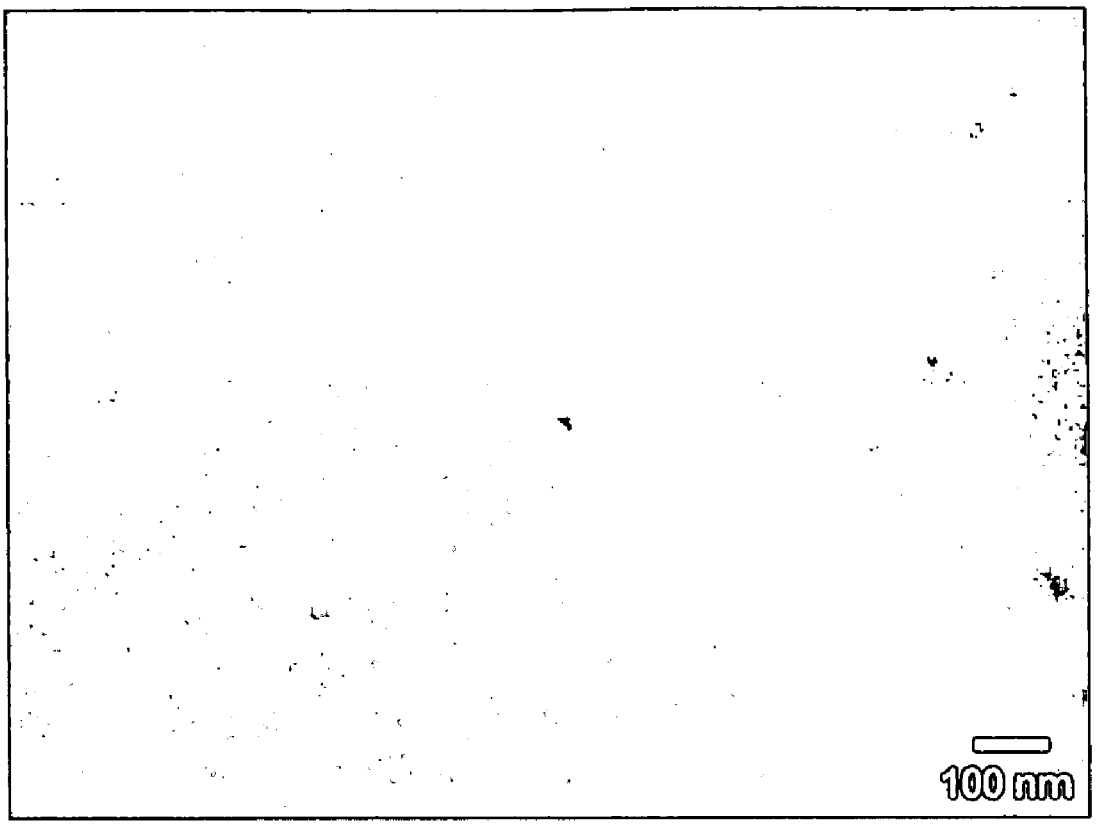

(70) The multi-branched polymer shown in FIG. 3-70, wherein n' is 6, and two of six $P^6$s are each the polyolefin chain (A1), other two are each the polar polymer chain (A3), and the remaining two are each the polar polymer chain having polyolefin side chains (A4).

Hereinafter, the process for producing the multi-branched polymer of the present invention represented by the general formula (IV) is specifically described.

The multi-branched polymer according to the present invention is produced preferably by one of the following processes:

<<Process S-1>> a process of reacting the polymer having a functional group at the terminal thereof with the multifunctional low-molecular compound (K); and <<Process S-2>> a process of (co)polymerizing the addition-polymerizable monomer (D), the ring-opening polymerizable monomer (E) and one or more monomers selected from the polyolefin macromonomers (M1) to (M3) represented by the general formulae (V) to (VII) by using, as a polymerization initiator, a multifunctional low-molecular compound having a group having an ability to initiate radical polymerization or anion polymerization, which is obtained by converting the functional group contained in the multifunctional low-molecular compound (K) into a group having an ability to initiate radical polymerization or anion polymerization.

Hereinafter, the processes S-1 and S-2 are described in more detail.

<<Process S-1>>

Process S-1 is a process of producing the multi-branched polymer represented by the general formula (IV) by reacting the polymer having a functional group at the terminal thereof with the multifunctional low-molecular compound (K).

[Process for Producing the Polymer Having a Functional Group at the Terminal Thereof]

The polymer having a functional group at the terminal thereof includes, for example, the polyolefin having a functional group at the terminal thereof represented by the general formula (XVI), the polar polymer having both a functional group at the terminal thereof and polyolefin side chains, represented by the general formula (XVII), and the polar polymer having a functional group at the terminal thereof used in (c) coupling two segments, that is, the polar polymer chain having polyolefin side chains (A4) and the polar polymer chain (A3) which are polymerized separately to produce the polymer shown in FIG. 1-3, wherein $P^2$ is the polar polymer chain having polyolefin side chains (A4) and $P^3$ is the polar polymer chain (A3).

The method of producing this polymer includes, for example, the same method as in producing the polyolefin having a functional group at the terminal thereof represented by the general formula (XVI) in the step A1, the same method as in producing the polar polymer having both a functional group at the terminal thereof represented by the general formula (XVII) and polyolefin side chains in the step A4, and the same method as in producing the polar polymer having a functional group at the terminal thereof used in (c) coupling two segments, that is, the polar polymer chain having polyolefin side chains (A4) and the polar polymer chain (A3) which are separately polymerized to produce the polymer shown in FIG. 1-3, wherein $P^2$ is the polar polymer chain having polyolefin side chains (A4) and $P^3$ is the polar polymer chain (A3).

[Process for Producing the Multi-Branched Polymer]

The multi-branched polymer can be produced by reacting the thus obtained polymer having a functional group at the terminal thereof with the multifunctional low-molecular compound (K).

In production of the multi-branched polymer of the present invention, the molar ratio of the polymer having a functional group at the terminal thereof to one functional group in the multifunctional low-molecular compound (K) is varied depending on the type and amount of the functional group contained in the multifunctional low-molecular compound (K), but is usually 0.01 to 100, preferably 0.1 to 50.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These can be used alone or as a suitable mixture thereof.

For the reaction of the polymer having a terminal group at the terminal thereof with the multifunctional low-molecular compound (K), a condensation agent can be added if necessary to allow the reaction to proceed efficiently.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

The reaction of the polymer having a functional group at the terminal thereof with the multifunctional low-molecular compound (K) can be conducted in the presence of a basic catalyst. Examples of the basic catalyst include organic amines such as triethylamine, diisopropyl ethyl amine, N,N-dimethyl aniline, piperidine, pyridine, 4-dimethylaminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride, potassium hydride, lithium hydride and n-butyl lithium.

When the polymer having a functional group at the terminal thereof and the multifunctional low-molecular compound (K) wherein the functional group is a carboxyl group are used, the polymer can be produced by reacting such compounds with e.g. phosphorus pentachloride or thionyl chloride to form their corresponding acid chloride compound and then reacting the resulting polymer having a functional group at the terminal thereof with the resulting multifunctional low-molecular compound (K) in a suitable solvent.

Further, when the multifunctional low-molecular compound (K) having a halogen atom-containing group is used, the polymer can be produced by converting the polymer having a functional group having a hydroxyl-containing group as the terminal functional group into an alkoxide by a metal alkoxidizing agent and then reacting the alkoxide with the multifunctional low-molecular compound (K) in a suitable solvent. The metal alkoxidizing agent includes, for example, metal sodium, metal potassium, sodium hydride, potassium hydride, and soda amide.

In the coupling reaction of the multifunctional low-molecular compound (K) with the polymer having a functional group at the terminal thereof, the combination of the functional group contained in the multifunctional low-molecular compound (K) and the terminal functional group contained in the polymer includes, but is not limited to, the following combinations:

1) The multifunctional low-molecular compound (K) having a carboxyl group as the functional group, and the polymer having a hydroxyl-containing group as the terminal functional group.

2) The multifunctional low-molecular compound (K) having a carboxyl group as the functional group, and the polymer having an amino-containing group as the terminal functional group.

3) The multifunctional low-molecular compound (K) having a carboxyl group as the functional group, and the polymer having an epoxy-containing group as the terminal functional group.

4) The multifunctional low-molecular compound (K) having a hydroxyl group as the functional group, and the polymer having a carboxyl-containing group as the terminal functional group.

5) The multifunctional low-molecular compound (K) having a hydroxyl group as the functional group, and the polymer having an acid halide-containing group as the terminal functional group.

6) The multifunctional low-molecular compound (K) having a hydroxyl group as the functional group, and the polymer having an epoxy-containing group as the terminal functional group.

7) The multifunctional low-molecular compound (K) having a hydroxyl group as the functional group, and the polymer having an acid anhydride-containing group as the terminal functional group.

8) The multifunctional low-molecular compound (K) having a hydroxyl group as the functional group, and the polymer having a halogen atom-containing group as the terminal functional group.

9) The multifunctional low-molecular compound (K) having an acid halide group as the functional group, and the polymer having a hydroxyl-containing group as the terminal functional group.

10) The multifunctional low-molecular compound (K) having an acid halide group as the functional group, and the polymer having an amino-containing group as the terminal functional group.

11) The multifunctional low-molecular compound (K) having an acid halide group as the functional group, and the polymer having an epoxy-containing group as the terminal functional group.

12) The multifunctional low-molecular compound (K) having an epoxy group as the functional group, and the polymer having a hydroxyl-containing group as the terminal functional group.

13) The multifunctional low-molecular compound (K) having an epoxy group as the functional group, and the polymer having a carboxyl-containing group as the terminal functional group.

14) The multifunctional low-molecular compound (K) having an epoxy group as the functional group, and the polymer having an acid halide-containing group as the terminal functional group.

15) The multifunctional low-molecular compound (K) having an epoxy group as the functional group, and the polymer having an acid anhydride-containing group as the terminal functional group.

16) The multifunctional low-molecular compound (K) having an amino group as the functional group, and the polymer having a carboxyl-containing group as the terminal functional group.

17) The multifunctional low-molecular compound (K) having an amino group as the functional group, and the polymer having an acid halide-containing group as the terminal functional group.

18) The multifunctional low-molecular compound (K) having an amino group as the functional group, and the polymer having an acid anhydride-containing group as the terminal functional group.

19) The multifunctional low-molecular compound (K) having an isocyanato group as the functional group, and the polymer having a hydroxyl-containing group as the terminal functional group.

20) The multifunctional low-molecular compound (K) having a halogen atom, and the polymer having a group containing the group 13 element in the periodic table as the terminal functional group.

21) The multifunctional low-molecular compound (K) having a halogen atom, and the polymer having a hydroxyl-containing group as the terminal functional group.

According to the above reaction, the product is a multi-branched polymer having a structure with the multifunctional low-molecular compound (K) residue as a central nucleus and three or more polymer chains selected from the polyolefin chain (A1), the polar polymer chain (A3) and the polar polymer chain having polyolefin side chains (A4).

The multi-branched polymer formed by the method described above is isolated by distilling away the solvent used in the polymerization or the unreacted monomer or by using a known method such as re-precipitation with a non-solvent.

<<Process S-2>>

Process S-2 is a process of producing the multi-branched polymer represented by the general formula (IV) by (co)polymerizing the addition-polymerizable monomer (D), the ring-opening polymerizable monomer (E) and one or more monomers selected from the polyolefin macromonomers (M1) to (M3) represented by the general formulae (V) to (VII), by using, as a polymerization initiator, the multifunctional low-molecular compound having a group having an ability to initiate radical polymerization or anion polymerization, which is obtained by converting the functional group contained in the multifunctional low-molecular compound (K) into a group having an ability to initiate radical polymerization or anion polymerization.

[Method of Producing the Multifunctional Low-Molecular Compound Having a Group Having an Ability to Initiate Radical Polymerization or Anion Polymerization]

The method of converting the functional group contained in the multifunctional low-molecular compound (K) into a group having an ability to initiate radical polymerization includes a method of reacting compound (L) having both a group having an ability to initiate radical polymerization and a functional group capable of reacting with the functional group contained in the multifunctional low-molecular compound (K), with the multifunctional low-molecular compound (K).

The group having an ability to initiate radical polymerization can be exemplified by, for example, a group having a nitroxide-containing group bound thereto and generating a radical by thermal cleavage, as disclosed in Chem. Rev., 101, 3661 (2001), and a group having a terminal halogen atom bound thereto and generating a radical upon addition of ruthenium, copper chloride or a complex having such transition metal atom and a group having an azo-containing group or oxygen-oxygen bond-containing group bound thereto and generating a radical by thermal cleavage, as disclosed in Chem. Rev., 101, 2921 (2001) and Chem. Rev., 101, 3689 (2001).

The compound (L) having both a group having an ability to initiate radical polymerization and a functional group capable of reacting with the functional group contained in the multifunctional low-molecular compound (K) is exemplified by the same compound as the compound (F) described above.

The method of converting the functional group contained in the multifunctional low-molecular compound (K) into a group having an ability to initiate anion polymerization includes, for example, a method that involves reacting the compound (K) having a hydroxyl group with an alkali metal such as metal lithium or metal potassium, an alkali metal hydride such as lithium hydride or potassium hydride, or an alkyl aluminum compound such as trimethyl aluminum, triethyl aluminum, triisobutyl aluminum or trihexyl aluminum thereby converting the compound (K) into a metal alkoxide-containing compound.

When the amount of the compound (L) having both a group having an ability to initiate radical polymerization and a functional group capable of reacting with the functional group contained in the multifunctional low-molecular compound (K), relevant to the functional group contained in the multifunctional low-molecular compound (K), is too low in conversion of the functional group contained in the multifunctional low-molecular compound (K) into a group having an ability to initiate radical polymerization or anion polymerization, the degree of conversion of the functional group contained in the multifunctional low-molecular compound (K) is decreased, and thus the yield of the resulting multi-branched polymer is lowered, while when the amount of the compound (L) is too high, the unreacted compound (L) remains, and a homopolymer may be produced as a byproduct together with the multi-branched polymer, and thus the molar ratio thereof to the functional group contained in the multifunctional low-molecular compound (K) is usually 0.1 to 100, preferably 0.3 to 50, and more preferably 0.5 to 10.

The reaction solvent includes, for example, aliphatic hydrocarbons such as pentane, hexane, heptane, octane, decane, dodecane and tetradecane, alicyclic hydrocarbons such as cyclopentane, methylcyclopentane, cyclohexane, methylcyclohexane, cyclooctane and cyclohexene, aromatic hydrocarbons such as benzene, toluene and xylene, halogenated hydrocarbons such as dichloromethane, chloroform, dichloroethane, dichloropropane, trichloroethylene, chlorobenzene, dichlorobenzene and 2,4-dichlorotoluene, esters such as methyl acetate, ethyl acetate and butyl acetate, ketones such as acetone and methyl ethyl ketone, and dioxane, tetrahydrofuran, acetonitrile, dimethylformamide and dimethyl sulfoxide. These can be used alone or as a suitable mixture thereof.

The reaction of the multifunctional low-molecular compound (K) with the compound (L) is carried out preferably in the presence of a condensation agent and a basic catalyst, depending on the type and amount of the functional group participating in the reaction.

The condensation agent includes, for example, inorganic dehydrating condensation agents such as conc. sulfuric acid, diphosphorus pentaoxide and anhydrous zinc chloride, carbodiimides such as dicyclohexyl carbodiimide, diisopropyl carbodiimide and 1-ethyl-3-(3-dimethyl aminopropyl carbodiimide) hydrochloride, polyphosphoric acid, acetic anhydride, carbonyl diimidazole and p-toluene sulfonyl chloride.

Examples of the basic catalyst include organic amines such as triethyl amine, diisopropyl ethyl amine, N,N-dimethyl aniline, piperidine, pyridine, 4-dimethyl aminopyridine, 1,5-diazabicyclo[4,3,0]non-5-ene, 1,8-diazabicyclo[5,4,0]undec-7-ene, tri-n-butyl amine and N-methylmorpholine, and alkali metal compounds such as sodium hydride and n-butyl lithium.

The reaction temperature is usually $-100°$ C. to $200°$ C., preferably $-50°$ C. to $150°$ C. The reaction time is varied depending on the reaction temperature and the type and amount of the compound (L) and the multifunctional low-molecular compound (K), but is usually 1 to 48 hours.

When the multifunctional low-molecular compound (K) and the compound (L) wherein the functional group is a carboxyl group are used, the polymer can be produced by reacting such compounds with e.g. phosphorus pentachloride or thionyl chloride to form their corresponding acid chloride compound and then reacting the product with the compound (L) or the multifunctional low-molecular compound (K) in the presence of a base in a suitable solvent.

[Process for Producing the Multi-Branched Polymer]

The multi-branched polymer according to the present invention is produced by (co)polymerizing the addition-polymerizable monomer (D), the ring-opening polymerizable monomer (E) and monomers selected from the polyolefin macromonomers (M1) to (M3) represented by the general formulae (V) to (VII), in the presence of the multifunctional low-molecular compound having a group having an ability to initiate radical polymerization or anion polymerization, which is obtained by the method described above.

The radical polymerization in the present invention is carried out if necessary in the presence of a catalyst. Examples of the catalyst include CuBr, CuCl, RuCl, $RuCl_2$, FeCl, $FeCl_2$ etc. When the catalyst is used, the amount of the catalyst used is varied depending on the amount of the functional group in the multifunctional low-molecular compound obtained by the reaction described above, the functional group having an ability to initiate radical polymerization, but is usually 0.1 to 100 equivalents, preferably 0.5 to 50 equivalents, relative to the amount of the functional group having an ability to initiate radial polymerization. Coordinating fatty amines or aromatic amines may be added to increase the solubility of the catalyst in the reaction system, or alkoxy aluminum may be added as a reaction accelerator.

The solvent usable in radical polymerization may be any solvent insofar as the reaction is not inhibited. Examples thereof include aromatic hydrocarbon solvents such as benzene, toluene and xylene, aliphatic hydrocarbon solvents such as pentane, hexane, heptane, octane, nonane and decane, alicyclic hydrocarbon solvents such as cyclohexane, methylcyclohexane and decahydronaphthalene, chlorinated hydrocarbon solvents such as chlorobenzene, dichlorobenzene, trichlorobenzene, methylene chloride, chloroform, carbon tetrachloride and tetrachloroethylene, alcohol solvents such as methanol, ethanol, n-propanol, iso-propanol, n-butanol, sec-butanol and tert-butanol, ketone solvents such as acetone, methyl ethyl ketone and methyl isobutyl ketone, ester solvents such as ethyl acetate and dimethyl phthalate, and ether solvents such as dimethyl ether, diethyl ether, di-n-amyl ether, tetrahydrofuran and dioxy anisole. Suspension polymerization or emulsion polymerization can be carried out using water as the solvent. These solvents may be used alone or as a mixture of two or more thereof. By using these solvents, the reaction solution preferably becomes a uniform phase, but may become a plurality of heterogeneous phases.

The reaction temperature may be any temperature at which the polymerization reaction proceeds, and varied depending on the degree of polymerization of the desired polymer, and the type and amount of the radical polymerization initiator and solvent used, but the reaction temperature is usually $-100°$ C. to $250°$ C., preferably $-50°$ C. to $180°$ C., and still more preferably $0°$ C. to $160°$ C. The reaction can be carried out under reduced pressure, at normal pressures or under pressure depending on the case. The polymerization reaction is conducted preferably in an inert gas atmosphere such as nitrogen or argon.

The solvent usable in anion polymerization includes, for example, aliphatic hydrocarbons such as hexane and heptane, alicyclic hydrocarbons such as cyclopentane and cyclohexane, aromatic hydrocarbons such as benzene and toluene, and ether solvents such as diethyl ether, dioxane, tetrahydrofuran (THF), monogrime and digrime. These solvents can be used alone or in combination of two or more thereof. In particular, aromatic hydrocarbons and ether solvents are preferably used. The polymerization is carried out usually at a temperature of $-100°$ C. to $100°$ C., preferably $-80°$ C. to $80°$ C., more preferably $-70°$ C. to $70°$ C. and for 1 minute to 500 hours, preferably 10 minutes to 300 hours, more preferably 15 minutes to 150 hours.

By using the method described above, the multi-branched polymer represented by the general formula (IV) is produced.

The multi-branched polymer formed by the method described above is isolated by distilling away the solvent used in the polymerization or the unreacted monomer or by using a known method such as re-precipitation with a non-solvent.

[5] Multi-Branched Polymer, a Thermoplastic Resin Composition Containing the Same, and Applications Thereof The multi-branched polymer according to the present invention can be employed in various applications, for example in the following applications.

(1) Film and sheet: A film and sheet comprising the multi-branched polymer according to the present invention are superior in flexibility, transparency, tackiness, fog resistance, heat resistance and releasability.

(2) A laminate containing at least one layer consisting of the multi-branched polymer according to the present invention, for example an agricultural film, a wrapping film, a shrinking film, a protecting film, a membrane for separation of blood plasma components, a separation membrane such as a water-selective permeation vaporization membrane, and selective separation membranes such as an ion-exchange membrane, a battery separator and an optical resolution membrane.

(3) Microcapsules, PTP package, chemical pulp, drug delivery system.

(4) The multi-branched polymer used as a modifier for modified resin exerts modification effects such as impact resistance, flowability, coating properties, crystallizability, adhesiveness and transparency.

The multi-branched polymer used as a rubber modifier exhibits modification effects such as weatherability, heat resistance, adhesiveness and oil resistance. The rubber includes crosslinked rubber such as natural rubber (NR), isoprene rubber (IR), butadiene rubber (BR), styrene-butadiene rubber (SBR), chloroprene rubber (CR), acrylonitrile-butadiene rubber (NBR), butyl rubber (IIR), ethylene-propylene rubber (EPM, EPDM), chlorosulfonated polyethylene (CSM), acryl rubber (ACM, ANM etc.), epichlorohydrin rubber (CO, ECO etc.), silicone rubber (Q), fluororubber etc.; and thermoplastic rubber such as those based on styrene, olefin, urethane, ester, amide and vinyl chloride.

The multi-branched polymer of the present invention can be used as a modifier for lubricant oil, for example, gasoline engine oil, diesel engine oil, engine oil for ship, gear oil, machine oil, metal processing oil, motor oil, machine oil, spindle oil, and lubricant oil such as insulating oil, or viscosity regulator, and a freezing-point depressant. The multi-branched polymer used as a modifier for wax exhibits modification effects such as adhesiveness, flowability and strength. The wax includes mineral wax such as montan wax, peat wax, ozokerite/ceresin wax and petroleum wax, synthetic wax such as polyethylene, Fischer-Tropsch wax, chemically modified hydrocarbon wax and substituted amide wax, vegetable wax and animal wax.

The multi-branched polymer used as a cement modifier has modification effects such as moldability and strength. The cement includes air-setting cement such as lime, gypsum and magnesia cement, hydraulic cement such as roman cement, natural cement, Portland cement, alumina cement and high sulfate slag cement, and special cement such as acid-resistant cement, refractory cement, water glass cement, and dental cement.

(5) The multi-branched polymer is used as a viscosity regulator, a moldability improver, ink such as a letterpress ink, a lithographic ink, a flexographic ink and a gravure ink, an oil paint, a cellulose derivative paint, a synthetic resin paint, an aqueous baking paint, a powdery aqueous paint, a viscosity regulator for ink/coating such as Japanese lacquer, and a moldability modifier.

(6) Building materials/materials for civil engineering, for example, resin for building materials/civil engineering and molded articles for building materials/civil engineering such as floor materials, floor tiles, floor sheet, sound insulating sheet, thermally insulating panels, insulations, decorative sheet, baseboard, asphalt modifier, gasket/sealing material, roofing sheet, water-stop sheet, etc.

(7) Automobile interior and exterior materials and gasoline tank; Automobile interior and exterior materials and gasoline tank comprising the multi-branched polymer according to the present invention are excellent in rigidness, impact resistance, oil resistance and heat resistance.

(8) Electrically insulating materials for electrical and electronic parts; tools for treatment of electronic parts; electrical and electronic parts such as a magnetic recording medium, a binder in a magnetic recording medium, a sealing material in an electrical circuit, a material for appliances, an equipment part for a container such as a container for a microwave oven, a film for a microwave oven, a high-molecular electrolyte base material, an electroconductive alloy base material, a connector, a socket, a resistor, a relay case switch coil bobbin, a condenser, a hair clipper case, an optical pickup, an optical connector, an oscillator, various terminal boards, a transformer, a plug, a printed circuit board, a tuner, a speaker, a microphone, a head phone, a small motor, a magnetic head base, a power module, a housing, a semiconductor, liquid crystal display parts, an FDD carriage, an FDD chassis, HDD parts, a motor brush holder, a parabola antenna, and computer-related parts; VTR parts, TV parts, an iron, a hair dryer, rice cooker parts, microwave oven parts, audio parts, voice instrument parts such as audio/laser disk (registered trademark)/compact disk, lighting parts, refrigerator parts, air-conditioner parts, typewriter parts, home and office electrical product parts such as word processor parts, office computer-related parts, telephone-related parts, facsimile-related parts, copying machine-related parts, electromagnetic shielding materials, speaker cone material, vibrating elements for speakers, etc.

(9) An aqueous emulsion: An aqueous emulsion containing the multi-branched polymer according to the present invention can be used as an adhesive for polyolefin excellent in heat sealing property.

(10) A coating base: A solvent dispersion containing the multi-branched polymer according to the present invention is excellent in dispersion stability in solvent, and shows good adhesiveness upon adhesion of metal or polar resin to polyolefin.

(11) Medical and hygienic nonwoven fabrics, a laminate of nonwoven fabrics, electrets, a medical tube, a medical container, a blood transfusion bag, a pre-filled syringe, medical articles such as hypodermic syringe, medical materials, artificial organs, artificial muscles, filtration membrane, food hygiene/health articles; a retort bag, freshness-keeping film, etc.

(12) Stationery products such as a sundry desk mat, a cutting mat, a ruler, a pen body/grip/cap, a grip such as scissors and cutter, a magnetic sheet, a pen case, a paper holder, a binder, a label seal, a tape, and white board; daily sundries such as clothing, a curtain, a sheet, a carpet, an entrance mat, a bath mat, a bucket, a hose, a bag, a planter, a filter in an air conditioner or a ventilation fan, tableware, a tray, a cup, a lunch box, a funnel for coffee siphon, a glass flame, a container, a storage case, a hanger, a rope and a washing net; sporting articles such as shoes, goggles, a ski boot, a racket, a ball, a tent, swimming goggles, fins, a fishing rod, a cooler box, a leisure sheet and a sporting net; toys such as block and card; containers such as petroleum can, drum can, and bottles for detergent and shampoo; and displays such as signboard, pylon and plastic chain.

(13) A filler modifier: The multi-branched polymer according to the present invention can be used preferably as an improver for filler dispersibility and an additive for preparation of fillers with improved dispersibility.

(14) Compatibilizing agents: The multi-branched polymer according to the present invention can be used as a compatibilizing agent. When the multi-branched polymer according to the present invention is used, polyolefin and thermoplastic resin having polar groups can be mixed in an arbitrary ratio. The multi-branched polymer according to the present invention has polyolefin segments and functional segments and can thus make originally non-compatible components compatible with one another and can improve elongation at breakage significantly as compared with the case where the multi-branched polymer is not used.

The multi-branched polymer of the present invention is advantageous over block graft polymers obtained by processes known in the art, for example in the following respects:

[Adv-1] The multi-branched polymer is extremely advantageous in productivity because a Ziegler catalyst or a metallocene catalyst can be used to produce the polyolefin chain.

[Adv-2] The molecular weight and the molecular weight distribution can be arbitrarily controlled, and a wide variety of α-olefins having an arbitrary composition can be polymerized.

[Adv-3] A plurality of polymer chains, particularly three or more different kinds of polymer chains, can be combined, and thus the resulting multi-branched polymer can confer broader functions than by block polymers/graft polymers known in the art.

[Adv-4] The branched structure of the polymer can be accurately regulated and thus the polymer having a specific shape such as star shape can be easily produced.

[Adv-5] A polyolefin having a multi-branched structure or a star-shaped structure, which is hardly produced by techniques known in the art, can be produced to give a novel polyolefin having physical properties different from those of the existing linear polyolefin.

EXAMPLES

Hereinafter, the present invention is described in more detail by reference to the examples, but the present invention is not limited to the examples.

Example 1

(1) Synthesis of Macromonomer

[Synthesis of an Ethylene-Propylene Copolymer (EPR) Whose Terminal was Converted into Al]

800 ml of purified toluene was introduced into a glass autoclave with an internal volume of 1 liter purged sufficiently with nitrogen, and the liquid phase and gaseous phase were saturated by blowing 20 liters/h ethylene and 80 liters/h propylene. Thereafter, MAO in an amount of 20 mmol in terms of Al and 0.02 mmol of dicyclopentadienyl zirconium dichloride were added at 50° C. to initiate polymerization. After polymerization at normal pressure at 50° C. for 120 minutes, a small amount of isobutyl alcohol was added to terminate the polymerization. The reaction solution was washed 5 times with 100 ml of 1 N aqueous hydrochloric acid solution and 2 times with 100 ml of water, and the organic layer was dried with magnesium sulfate anhydride and filtered through a glass filter (G3) to remove the magnesium sulfate. The filtrate was concentrated, and the resulting oily matter was dried under vacuum for 10 hours to give 118.7 g colorless transparent oily EPR. When the molecular weight (in terms of EPR) of the polymer was determined by GPC, the Mw was 1690, the Mn was 430, and the Mw/Mn ratio was 4.0. IR analysis indicated that the content of propylene in the polymer was 49 mol-%, and 27.5 terminal vinylidene groups were contained per 1000 carbon atoms. 100 g of the resulting EPR containing terminal vinylidene groups were introduced into a 1 L glass reactor purged sufficiently with nitrogen, and 500 ml of toluene and 50 ml of diisobutyl aluminum hydride were added thereto, and the mixture was heated at 110° C. for 6 hours under stirring. A toluene solution containing the EPR whose terminal was converted into Al was obtained in this manner.

[Synthesis of EPR Whose Terminal was Converted into a Hydroxyl Group]

While the toluene solution obtained above was kept at 105° C., a nitrogen gas was replaced by dry air, and while this temperature was kept, dry air was supplied thereto at a flow rate of 100 liters/h for 7 hours, and then the solution was transferred to a separatory funnel, washed 3 times with 300 ml of 1 N aqueous hydrochloric acid solution and then 2 times with 200 ml of water. The organic layer was dried with magnesium sulfate anhydride and filtered through a glass filter (G3), then the filtrate was concentrated, and the resulting yellow oily matter was dried for 10 hours under vacuum, to give 107.9 g oily polymer.

A sample obtained by dissolving 100 mg of polymer in 0.6 ml of heavy chloroform at 25° C. was analyzed with $^{1}$H-NMR (JEOL GSX-270 manufactured by JEOL. Ltd.), indicating a signal at 3.3 to 3.6 ppm attributable to a methylene group adjacent to a hydroxyl group. That is, the presence of EPR having a terminal structure represented by formula (XIX) below was confirmed. From the integrated value, the content of OH groups was calculated to be 2.8 mol-%.

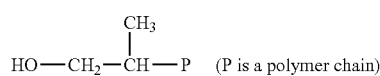

(XIX)

[Synthesis of EPR Macromonomer]

50 g of the ERP whose terminal had been converted into a hydroxyl group obtained above was introduced into a 200-ml two-necked flask purged sufficiently with nitrogen, and 60 ml of dry toluene, 13.0 ml of triethylamine and 18.3 ml of methacrylic acid chloride were added thereto, and the mixture was stirred at room temperature for 18 hours. The resulting reaction solution was washed 3 times with 200 ml of 1 N aqueous hydrochloric acid solution and then 3 times with 200 ml of water, and the organic layer was dried with magnesium sulfate anhydride. The magnesium sulfate was filtered off with a glass filter (G3), and then the resulting filtrate was concentrated to give 57.2 g yellowish brown polymer. 32.4 g of the polymer was dissolved in hexane and purified by column chromatography to give 22.4 g pale yellow oily polymer. When the molecular weight (in terms of EPR) of the polymer was determined by GPC, the Mw was 1400, the Mn was 580, and the Mw/Mn ratio was 2.3.

A sample obtained by dissolving 100 mg of polymer in 0.6 ml of heavy chloroform at 25° C. was analyzed with $^{1}$H-NMR (JEOL GSX-270 manufactured by JEOL. Ltd.), indicating the following signals in addition to signals based on EPR: δ1.95 ppm (s, 3H; =C—C$\underline{H}_3$), δ3.8-4.1 ppm (m, 2H; —COO—C$\underline{H}_2$—), δ5.55 ppm (s, 1H; C$\underline{H}_2$=) and δ6.1 ppm (s, 1H; C$\underline{H}_2$=). That is, the presence of EPR macromonomer having a terminal structure represented by formula (XX) below was confirmed. From the integrated value, the content of methacryloyl groups was calculated to be 3.8 mol-%.

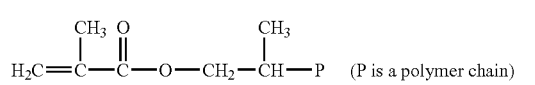

(XX)

(2) Synthesis of Polyethylene (PE) Having a Hydroxyl Group at the Terminal Thereof

[Synthesis of PE Modified with Allyl Alcohol at the Terminal Thereof]

900 ml of toluene was introduced into a 1-L glass polymerizer purged with nitrogen, and then 6.6 ml (48 mmol) of triethyl aluminum and 2.72 ml (40 mmol) of allyl alcohol were added thereto, and the mixture was stirred at 50° C. for 5 minutes. 17.6 mg of metallocene compound represented by the general formula (XXI) was introduced into another 20-ml Schlenk flask purged with nitrogen, and 1.12 ml of toluene solution of methyl aluminoxane (MAO) (Al=1.28 M) was added thereto and stirred for about 10 seconds, and the resulting solution was added to the polymerization solution. While an ethylene gas was circulated at 3 L/h, the mixture was stirred at 50° C. for 105 minutes. The reaction was terminated with isobutyl alcohol (30 ml) and conc. hydrochloric acid (6 ml), and the reaction solution was poured into 2 L of methanol to precipitate a polymer. The reaction solution was stirred overnight, and the polymer was filtered with a glass filter and then dried at 50° C. under reduced conditions at 10 Torr for 10 hours to give 8.63 g PE modified with allyl alcohol at the terminal thereof. As a result of analysis by gel permeation chromatography (GPC), the molecular weight of the polymer was 26500 in terms of weight-average molecular weight (Mw), and the molecular weight distribution (Mw/Mn) was 2.26. From $^1$H-NMR measurement results, a peak of terminal hydroxy methylene (—CH$_2$—OH) attributable to the introduced allyl alcohol was observed at δ=3.3-3.4 ppm.

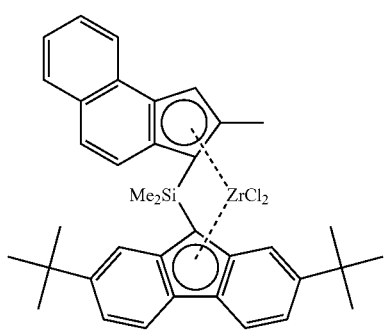

(XXI)

(3) Conversion of the Terminal Hydroxyl Group of PE Into a Polymerization Initiation Group

[Synthesis of 2-Bromoisobutyryl Group-Modified PE]

The terminal allyl alcohol-modified PE (Mw=26500, Mw/Mn=2.26), 5.6 g, was introduced into a 500-ml two-necked eggplant type flask purged under vacuum with nitrogen, and 200 ml of dry toluene, 0.55 ml of triethylamine and 0.99 ml of 2-bromoisobutyl bromide were added thereto and then stirred under heating at 80° C. for 3 hours. The reaction solution was poured into 2 L of methanol to precipitate a polymer which was then filtered with a glass filter. The polymer on the glass filter was washed 3 times with 100 ml of methanol, once with 100 ml of 1 N hydrochloric acid and twice with 100 ml of methanol. The polymer was dried at 50° C. under reduced conditions at 10 Torr for 10 hours. From $^1$H-NMR results, terminal methylene [—CH$_2$—OCOCBr(CH$_3$)$_2$] was observed at δ=3.8-4.1 ppm, and a terminal methyl [—CH$_2$—OCOCBr(CH$_3$)$_2$] group at δ=1.8 ppm, and a peak of hydroxy methylene in the starting material was not observed, and thus the resulting product was identified as 2-bromoisobutyryl group-modified PE wherein all hydroxyl groups had been modified.

(4) Synthesis of PE-b-(Polymethyl Methacrylate-g-EPR) Block Polymer 0.28 g (terminal Br: 0.02 mmol) of 2-bromoisobutyryl group-modified PE and 0.40 g (0.40 mmol) of EPR macromonomer were introduced into a 100-ml Shrenk flask substituted under vacuum with nitrogen, and then subjected 5 times to degassing and substitution with nitrogen by means of a vacuum pump. 19 mg (0.02 mmol) of RuCl$_2$(P(Ph)$_3$)$_3$, 0.98 ml of o-xylene, 0.40 ml (0.08 mmol) of 0.2M solution of di(n-butyl)amine in o-xylene, and 0.42 ml (3.96 mmol) of methyl methacrylate (MMA) were successively added thereto in a nitrogen stream, and the flask was fit with a septum cap. The temperature of the mixture was increased to 120° C., and the mixture was reacted for 5 hours under stirring. After the Shrenk flask was cooled with iced water, the reaction was terminated by adding about 5 ml of methanol, and the reaction mixture was poured into 500 ml of methanol and stirred overnight. The precipitated polymer was separated by filtration with a glass filter, and the polymer was dried at 80° C. for 10 hours under reduced conditions at 15 Torr to give 0.45 g polymer. $^1$H-NMR measurement indicated that a PE-b-(MMA-g-EPR) block polymer of ethylene:MMA:EPR=60:28:12 (wt %) was obtained.

Example 2

(1) Synthesis of EPR Macromonomer 250 ml of purified toluene was introduced into a glass autoclave with an internal volume of 500 ml purged sufficiently with nitrogen, and the liquid phase and gaseous phase were saturated by blowing 40 liters/h ethylene and 60 liters/h propylene. Thereafter, MAO in an amount of 12.5 mmol in terms of Al and 0.05 mmol of bis(1,3-dimethylcyclopentadienyl) zirconium dichloride were added at 60° C. to initiate polymerization. After polymerization at normal pressure at 60° C. for 180 minutes, a small amount of isobutyl alcohol was added to terminate the polymerization. The reaction solution was washed 5 times with 200 ml of 1 N aqueous hydrochloric acid solution and 2 times with 200 ml of water, and the organic layer was dried with magnesium sulfate anhydride and filtered through a glass filter (G3) to remove the magnesium sulfate. The filtrate was concentrated, and the resulting oily matter was dried under vacuum for 10 hours to give 201.8 g colorless transparent oily EPR. A sample obtained by dissolving 100 mg of polymer in 0.6 ml of heavy chloroform at 25° C. was analyzed with $^1$H-NMR (JEOL GSX-270 manufactured by JEOL. Ltd.), indicating a signal at 4.6 to 4.8 ppm attributable to a vinylidene group. That is, the presence of EPR having a terminal structure represented by formula (XXII) below was confirmed. From the integrated value, the content of vinylidene groups was calculated to be 2.1 mol-%.

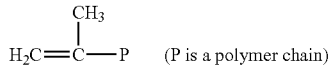

(XXII) (P is a polymer chain)

(2) Synthesis of PE-b-(Polymethyl Methacrylate-g-EPR) Block Polymer 0.88 g (terminal Br: 0.05 mmol) of 2-bromoisobutyryl group-modified PE and 8.25 g (5.0 mmol) of EPR macromonomer obtained in (1) above were introduced into a 30-ml Shrenk flask substituted under vacuum with nitrogen, and then subjected 5 times to degassing and substitution with nitrogen by means of a vacuum pump. 7.3 mg (0.05 mmol) of CuBr(I), 5.0 ml of o-xylene, 0.20 ml (0.10 mmol) of 0.5M solution of N,N,N',N'',N''-pentamethyldiethylenetriamine (PMDETA) in o-xylene, and 0.53 ml (5.0 mmol) of methyl methacrylate (MMA) were successively added thereto in a nitrogen stream, and the flask was fit with a septum cap. The temperature of the mixture was increased to 120° C., and the mixture was reacted for 5 hours under stirring. After the Shrenk flask was cooled with iced water, the reaction was terminated by adding about 5 ml of methanol, and the reaction mixture was poured into 400 ml of methanol and stirred overnight. The precipitated polymer was separated by filtration with a glass filter, and the polymer was dried at 80° C. for 10 hours under reduced conditions at 15 Torr to give 0.86 g polymer. $^1$H-NMR measurement indicated that a PE-b-(MMA-g-EPR) block polymer of ethylene:propylene:MMA=60:28:12 (mol %) was obtained.

Example 3

(1) Synthesis of Hydroxy-Containing Polyethylene (PE)

[Synthesis of an Ethylene/10-Undecen-1-Ol Copolymer]

900 ml of toluene was introduced into a 1-L glass polymerizer purged with nitrogen, and while an ethylene gas (100 L/h) was circulated, 5.0 ml (5.0 mmol) of stock solution (1.0 M toluene solution) of triethyl aluminum and 0.80 ml (4.0 mmol) of 10-undecen-1-ol were added thereto, and the mixture was stirred at 50° C. for 5 minutes. 17.6 mg of metallocene compound represented by the above formula (XXI) was introduced into another 20-ml Schlenk flask purged with nitrogen, and 1.14 ml of toluene solution of methyl aluminoxane (MAO) (Al=1.37 M) was added thereto and stirred for about 10 seconds, and the resulting solution was added to the polymerization solution. While an ethylene gas was circulated at 100 L/h, the mixture was stirred at 50° C. for 3 minutes (600 rpm). The reaction was terminated with isobutyl alcohol (15 ml) and conc. hydrochloric acid (2 ml), and the reaction solution was poured into 2 L of methanol to precipitate a polymer. The reaction solution was stirred overnight, and the polymer was filtered with a glass filter and then dried at 80° C. under reduced conditions at 10 Torr for 10 hours to give 10.09 g ethylene/10-undecen-1-ol copolymer. As a result of analysis by gel permeation chromatography (GPC), the molecular weight of the polymer was 109300 in terms of polyethylene-equivalent weight-average molecular weight (Mw), and the molecular weight distribution (Mw/Mn) was 3.04. From $^1$H-NMR measurement results, the content of the comonomer (10-undecen-1-ol) introduced was 0.78 mol-%.

[Synthesis of 2-Bromoisobutyryl Group-Modified PE]

8.0 g of the ethylene/10-undecene-1-ol copolymer (Mw, 109300; Mw/Mn, 3.04; comonomer content, 0.78 mol %) obtained above was introduced into a 500-ml two-necked eggplant type flask equipped with a mechanical stirrer, and then sufficiently flushed with nitrogen. 300 ml of dry toluene was added thereto and stirred under heating at 90° C. for 2 hours until the polymer became uniformly dispersed, and after the temperature was decreased to 80° C., 1.78 ml of triethylamine and 1.32 ml of 2-bromoisobutyryl bromide were added thereto and stirred under heating at 80° C. for 3 hours. The reaction solution was poured into 2 L of methanol to precipitate a polymer which was then filtered with a glass filter. The polymer on the glass filter was washed 3 times with 100 ml of methanol, once with 100 ml of 1 N hydrochloric acid and twice with 100 ml of methanol. The polymer was dried at 50° C. under reduced conditions at 10 Torr for 10 hours. From $^1$H-NMR results, terminal methylene (—CH$_2$—OCOCBr(CH$_3$)$_2$) was observed at δ=4.05-4.09 ppm and a terminal methyl (—CH$_2$—OCOCBr(CH$_3$)$_2$) group at δ=1.83 ppm, and a peak of hydroxy methylene in the starting material was not observed, and thus the resulting product was identified as 2-bromoisobutyryl group-modified PE wherein all hydroxyl groups had been modified.

(3) Synthesis of PE-g-Poly(EPR Macromonomer) Graft Polymer 0.238 g (terminal Br: 0.07 mmol) of 2-bromoisobutyryl group-modified PE and 2.12 g (2.09 mmol) of the macromonomer synthesized in Example 1(1) were introduced into a 100-ml Shrenk flask degassed and purged with nitrogen, and the mixture was subjected 5 times to degassing and substitution with nitrogen by means of a vacuum pump. 10 mg (0.07 mmol) of copper(I) bromide, 6.7 ml of o-xylene and 0.28 ml (0.14 mmol) of PMDETA (0.5 M o-xylene solution) were successively added thereto in a nitrogen stream, and the flask was fit with a septum cap. The temperature of the mixture was increased to 120° C., and the mixture was reacted for 7 hours under stirring. After the Shrenk was cooled with iced water, the reaction was terminated by adding about 5 ml of methanol, and the reaction mixture was poured into 500 ml of methanol and stirred overnight. The precipitated polymer was separated by filtration with a glass filter, and the polymer was dried at 80° C. for 10 hours under reduced conditions at 15 Torr to give 0.40 g polymer. $^1$H-NMR measurement indicated that a polyethylene-g-poly(EPR macromonomer) graft polymer having a composition of ethylene:EPR macromonomer=60:40 (wt %) was obtained.

Example 4

0.238 g (terminal Br: 0.07 mmol) of the 2-bromoisobutyryl group-modified PE synthesized in Example 3 (2) and 0.71 g (0.70 mmol) of the macromonomer synthesized in Example 1(1) were introduced into a 100-ml Shrenk flask degassed and purged with nitrogen, and the mixture was subjected 5 times to degassing and substitution with nitrogen by means of a vacuum pump. 10 mg (0.07 mmol) of copper(I) bromide, 6.3 ml of o-xylene, 0.28 ml (0.14 mmol) of PMDETA (0.5 M o-xylene solution) and 0.367 ml (3.49 mmol) of methyl methacrylate (MMA) were successively added thereto in a nitrogen stream, and the flask was fit with a septum cap. The temperature of the mixture was increased to 120° C., and the mixture was reacted for 7 hours under stirring. After the Shrenk was cooled with iced water, the reaction was terminated by adding about 5 ml of methanol, and the reaction mixture was poured into 500 ml of methanol and stirred overnight. The precipitated polymer was separated by filtration with a glass filter, and the polymer was dried at 80° C. for 10 hours under reduced conditions at 15 Torr to give 0.48 g polymer. $^1$H-NMR measurement indicated that a PE-g-

(MMA-g-EPR) graft polymer with a composition of ethylene:MMA:EPR=52:18:30 (wt %) was obtained.

Example 5

0.17 g (terminal Br: 0.05 mmol) of the 2-bromoisobutyryl group-modified PE synthesized in Example 3(2) and 4.12 g (2.5 mmol) of the macromonomer synthesized in Example 2(1) were introduced into a 30-ml Shrenk flask degassed and purged with nitrogen, and the mixture was subjected 5 times to degassing and substitution with nitrogen by means of a vacuum pump. 7.2 mg (0.05 mmol) of copper(I) bromide, 4.3 ml of o-xylene, 0.2 ml (0.1 mmol) of PMDETA (0.5 M o-xylene solution) and 0.73 ml (5.0 mmol) of t-butyl acrylate (tBuA) were successively added thereto in a nitrogen stream, and the flask was fit with a septum cap. The temperature of the mixture was increased to 120° C., and the mixture was reacted for 6 hours under stirring. After the Shrenk was cooled with iced water, there action was terminated by adding about 5 ml of methanol, and the reaction mixture was poured into 300 ml of methanol and stirred overnight. The precipitated polymer was separated by filtration with a glass filter, and the polymer was dried at 80° C. for 10 hours under reduced conditions at 15 Torr to give 0.13 g polymer. $^1$H-NMR measurement indicated that a PE-g-(PtBuA-g-EPR) graft polymer with a composition of ethylene:propylene:tBuA=70:19:11 (mol %) was obtained.

Example 6

(1) Synthesis of a Polymethyl Methacrylate-g-EPR Graft Polymer 1.01 g of the EPR macromonomer synthesized in Example 1(1), 1.07 ml of methyl methacrylate (MMA), 1.2 ml of solution out of a solution in which 357.4 mg of copper bromide and 2.49 mmol of PMDETA had been dissolved in 3 ml of o-xylene, and 0.2 ml of solution of ethyl 2-bromoisobutyrate (0.5 M) in o-xylene were introduced into a 100-ml Shrenk tube sufficiently purged with nitrogen, and the mixture was stirred for 6 hours under heating at 90° C. The resulting reaction solution was poured into 400 ml of methanol and stirred to precipitate a highly viscous white polymer. The supernatant was removed, and the white polymer remaining on the bottom of the container was washed 3 times with 3 ml of hexane, then 3 times with 3 ml of methanol, and vacuum-dried for 10 hours to give 0.13 g yellow solid polymer. When the (PS-equivalent) molecular weight of the polymer was measured by GPC, the Mw was 69000, the Mn was 15000, and the Mw/Mn ratio was 4.7. The content of each unit in the formed polymer, as determined by NMR, was 87 mol % MMA and 13 mol % EPR.

(2) Synthesis of (PMMA-g-EPR)-b-(PMMA-g-EPR) Block Polymer 0.41 g of the EPR macromonomer synthesized in Example 1(1), 4.28 ml of MMA, 0.93 ml of solution out of a solution in which 46.6 mg of copper bromide and 0.33 mmol of PMDETA had been dissolved in 3 ml of o-xylene, and 0.1 g of the PMMA-g-EPR graft polymer obtained in (1) above were introduced into a 100-ml Shrenk tube sufficiently purged with nitrogen, and the mixture was stirred for 6 hours under heating at 90° C. The resulting reaction solution was poured into 400 ml of methanol and stirred to precipitate white solids. These solids were filtered with a glass filter and then washed 3 times with 10 ml of hexane, then 3 times with 10 ml of methanol, and vacuum-dried for 10 hours to give 1.9 g yellow solid polymer. When the (PS-equivalent) molecular weight of the polymer was measured by GPC, the Mw was 135000, the Mn was 34000, and the Mw/Mn ratio was 4.0. The content of each unit in the formed polymer, as determined by NMR, was 92 mol % MMA and 8 mol % EPR. Accordingly, the formation of a block polymer comprising the PMMA-g-EPR graft polymer obtained in (1) above, to which a PMMA-g-EPR graft polymer having a different composition had been bound, was revealed.

Example 7

(1) Synthesis of Macromonomer

[Synthesis of an Ethylene-Propylene Copolymer (EPR) Whose Terminal was Converted into Al]

800 ml of purified toluene was introduced into a glass autoclave with an internal volume of 1 liter purged sufficiently with nitrogen, and the liquid phase and gaseous phase were saturated by blowing 40 liters/h ethylene and 60 liters/h propylene. Thereafter, MAO in an amount of 20 mmol in terms of Al and 0.02 mmol of bis(1,3-dimethylcyclopentadienyl) zirconium dichloride were added to initiate polymerization. After polymerization at normal pressure at 60° C. for 120 minutes, a small amount of isobutyl alcohol was added to terminate the polymerization. The reaction solution was washed 5 times with 100 ml of 1 N aqueous hydrochloric acid solution and 2 times with 100 ml of water, and the organic layer was dried with magnesium sulfate anhydride and filtered through a glass filter (G3) to remove the magnesium sulfate. The filtrate was concentrated, and the resulting oily matter was dried under vacuum for 10 hours to give 195 g colorless transparent oily EPR. When the molecular weight (in terms of EPR) of the polymer was determined by GPC, the Mw was 6540, the Mn was 1830, and the Mw/Mn ratio was 3.6. IR analysis indicated that the content of propylene in the polymer was 57 mol-%, and 11.5 terminal vinylidene groups were contained per 1000 carbon atoms. 100 g of the resulting EPR containing terminal vinylidene groups were introduced into a 500-ml glass reactor purged sufficiently with nitrogen, and 250 ml of toluene and 44 ml of diisobutyl aluminum hydride were added thereto, and the mixture was heated at 100° C. for 4 hours under stirring. A toluene solution containing the EPR whose terminal was converted into Al was obtained in this manner.

[Synthesis of EPR Whose Terminal was Converted into a Hydroxyl Group]

While the toluene solution obtained above was kept at 100° C., a nitrogen gas was replaced by dry air, and while this temperature was kept, dry air was supplied thereto at a flow rate of 100 liters/h for 7 hours, and then 200 ml of methanol was added thereto precipitate solids. The precipitated white solids were transferred onto a glass filter and washed 5 times with 200 ml of hexane to extract a polymer. The filtrate was concentrated, and the resulting yellow oily matter was dried for 10 hours under vacuum, to give 90.5 g oily polymer.

A sample obtained by dissolving 100 mg of the polymer in 0.6 ml of heavy chloroform at 25° C. was analyzed with $^1$H-NMR (JEOL GSX-270 manufactured by JEOL. Ltd.), indicating a signal at 3.3 to 3.6 ppm attributable to a methylene group adjacent to a hydroxyl group. That is, the presence of EPR having a terminal structure represented by formula (XXIII) below was confirmed. From the integrated value, the content of OH groups was calculated to be 0.94 mol-%.

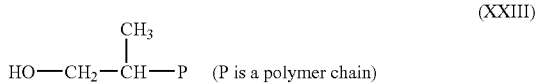

(XXIII)

[Synthesis of EPR Macromonomer]

50 g of the ERP whose terminal had been converted into a hydroxyl group obtained above was introduced into a 200-ml two-necked flask purged sufficiently with nitrogen, and 50 ml of dry toluene, 9.3 ml of triethylamine and 13.0 ml of methacrylic acid chloride were added thereto, and the mixture was stirred at room temperature for 21 hours. The resulting reaction solution was transferred to a separatory funnel, then diluted with 1 L of hexane, washed 5 times with 200 ml of 1 N aqueous hydrochloric acid solution and then 3 times with 200 ml of water, and the organic layer was dried with magnesium sulfate anhydride. The magnesium sulfate was filtered off with a glass filter (G3), and then the resulting filtrate was concentrated to give 61.2 g pale yellow oily polymer. 56.6 g of the polymer was dissolved in 150 ml of hexane and purified by column chromatography to give 11.7 g slightly yellow oily polymer. When the molecular weight (in terms of EPR) of the polymer was determined by GPC, the Mw was 4910, the Mn was 3020, and the Mw/Mn ratio was 1.6.

A sample obtained by dissolving 100 mg of the polymer in 0.6 ml of heavy chloroform at 25° C. was analyzed with $^1$H-NMR (JEOL GSX-270 manufactured by JEOL. Ltd.), indicating the following signals in addition to signals based on EPR: δ1.95 ppm (s, 3H; =C—C$\underline{H}_3$), δ3.8-4.1 ppm (m, 2H; —COO—C$\underline{H}_2$—), δ5.55 ppm (s, 1H; CH$_2$=), δ6.1 ppm (s, 1H; C$\underline{H}_2$=). That is, the presence of EPR macromonomer having a terminal structure represented by formula (XXIV) below was confirmed. From the integrated value, the content of methacryloyl groups was calculated to be 0.97 mol-%.

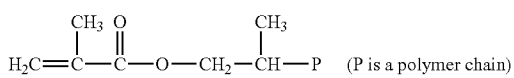

(XXIV)

(2) Synthesis of PMMA-b-(PMMA-g-EPR)

A 50-ml Schlenk tube sufficiently purged with nitrogen was charged with 5.12 ml of o-xylene, 4.28 ml of MMA, 14.3 mg of copper bromide(I), 0.4 ml of solution of PMDETA (0.5 mmol/ml in terms of PMDETA molecule) in o-xylene, and 0.2 ml of (1-bromoethyl)benzene in o-xylene (0.5 mmol/ml in terms of (1-bromoethyl)benzene molecule), and the mixture was stirred under heating at 90° C. for 4 hours. The resulting reaction solution was poured into 200 ml of methanol to precipitate a polymer. The polymer was filtered with a glass filter (G3), and the polymer on the filter was washed 3 times with 10 ml of methanol and then vacuum-dried for 10 hours to give 2.84 g solid polymer. The (PS-equivalent) molecular weight of the polymer was measured by GPC, indicating that the Mw was 36400, the Mn was 28000, and the Mw/Mn ratio was 1.3. Then, 2.8 g of the PMMA obtained above was introduced into a 30-ml Shrenk tube sufficiently purged with nitrogen, and then 6.43 ml of o-xylene, 2.14 ml of MMA, 1.49 g of the EPR macromonomer synthesized in (1) above, and 1.23 ml of solution of copper bromide and PMDETA in o-xylene (0.081 mmol/ml in terms of Cu atom, 0.16 mmol/ml in terms of PMDETA molecule) were added thereto, and the mixture was stirred under heating at 90° C. for 6 hours. The resulting reaction solution was poured into 400 ml of methanol to precipitate a polymer. The precipitated polymer was filtered with a glass filter (G3), and the polymer on the filter was washed 5 times with 10 ml of hexane and 3 times with 10 ml of methanol, and then vacuum-dried for 10 hours to give 4.3 g solid polymer. The (PS-equivalent) molecular weight of the polymer was measured by GPC, indicating that the Mw was 74200, the Mn was 53000, and the Mw/Mn ratio was 1.4. $^1$H-NMR measurement indicated that PMMA:EPR=86:14 (wt %). A PMMA-b-(PMMA-g-EPR) block polymer having a PMMA chain and a PMMA-g-EPR bound thereto was obtained in this manner.

Example 8

(1) Synthesis of Polyethylene (PE) Having a Hydroxyl Group at the Terminal Thereof and an Alkyl Aluminum Terminal A glass polymerizer having an internal volume of 1 L sufficiently purged with nitrogen was charged with 900 ml of toluene and kept at 50° C. for 10 minutes while nitrogen was circulated at a rate of 20 L/h. Triethyl aluminum (48 mmol) and allyl alcohol (40 mmol) were added thereto and stirred for 5 minutes, and after circulation of nitrogen was terminated, ethylene was circulated at a rate of 2 L/h. Then, a toluene slurry solution wherein 0.0008 mmol of dimethyl silylene(2-methyl-4,5-benz-1-indenyl) (2,7-di-t-butylfluorenyl)zirconium dichloride represented by the above formula (XXI) had been contacted with 0.43 mmol of methyl aluminoxane at room temperature for 10 minutes was added thereto to initiate polymerization, and the mixture was polymerized at normal pressure at 50° C. for 100 minutes. A toluene slurry of PE having a hydroxyl group and a diethyl aluminum group at the terminal thereof was obtained in this manner.

(2) Synthesis of PE Having Two Hydroxyl Groups at the Terminal Thereof

While the toluene slurry obtained in (1) above was heated at 100° C., dry air was fed at a rate of 100 L/h for 6 hours to the slurry kept at that temperature, and a small amount of isobutyl alcohol was added thereto. 50 ml of isobutyl alcohol solution containing 5 ml of aqueous conc. hydrochloric acid solution was added thereto and heated at 75° C. in nitrogen. The polymer solution was added to an excess of methanol to precipitate the polymer which was then vacuum-dried at 80° C. for 12 hours to give the desired polymer. By $^{13}$C-NMR analysis, a signal of a methine group having two hydroxy methylene groups bound thereto was detected at δ43 ppm, and a signal of two hydroxy methylene groups at δ65.6 ppm. From this result, formation of PE having the structure shown in formula (XXV) below was confirmed.

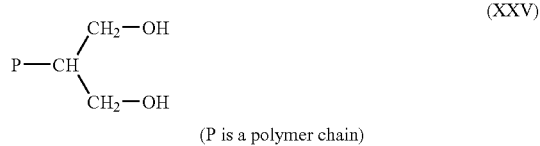

(XXV)

(P is a polymer chain)

(3) Synthesis of PE Having Two 2-Bromoisobutyryl Groups at the Terminal Thereof 5.0 g of the PE having two hydroxyl groups at the terminal thereof (Mw, 11000; Mw/Mn, 2.4; hydroxyl group content, 0.88 mol %) obtained above was introduced into a 500-ml two-necked eggplant type flask equipped with a mechanical stirrer, and then sufficiently flushed with nitrogen. 300 ml of dry toluene was added thereto and stirred under heating at 90° C. for 2 hours until the polymer became uniformly dispersed, and after the temperature was decreased to 80° C., 1.26 ml of triethylamine and 0.93 ml of 2-bromoisobutyryl bromide were added thereto and stirred under heating at 80° C. for 5 hours. The reaction solution was poured into 2 L of methanol to precipitate the polymer which was then filtered with a glass filter. The polymer on the glass filter was washed 3 times with 100 ml of methanol, once with 100 ml of 1 N aqueous hydrochloric acid solution and twice with 100 ml of methanol. The polymer was dried at 50° C. for 10 hours. From $^1$H-NMR results, terminal methylene (—CH$_2$—OCOCBr(CH$_3$)$_2$) was observed at δ4.0-4.1 ppm and a terminal methyl (—CH$_2$—OCOCBr(CH$_3$)$_2$) group at δ1.8 ppm, and a peak of hydroxy methylene in the starting material was not observed, and thus the resulting product was identified as 2-bromoisobutyryl group-modified PE wherein both hydroxyl groups had been modified.

(4) Synthesis of a Star-Shaped Polymer Having One PE Arm and Two Polymethyl Methacrylate Arms 0.22 g of the PE having two 2-bromoisobutyryl groups at the terminal thereof (terminal Br: 0.07 mmol) was introduced into a 100-ml Shrenk flask degassed and substituted with nitrogen, and the mixture was subjected 5 times to degassing and substitution with nitrogen by means of a vacuum pump. 10 mg (0.07 mmol) of copper(I) bromide, 6.3 ml of o-xylene, 0.28 ml (0.14 mmol) of PMDETA (0.5 M o-xylene solution) and 0.37 ml (3.49 mmol) of methyl methacrylate (MMA) were successively added thereto in a nitrogen stream, and the flask was fit with a septum cap. The temperature of the mixture was increased to 120° C., and the mixture was reacted for 7 hours under stirring. After the Shrenk flask was cooled with iced water, the reaction was terminated by adding about 5 ml of methanol, and the reaction mixture was poured into 500 ml of methanol and stirred overnight. The precipitated polymer was separated by filtration with a glass filter, and the polymer was dried at 80° C. for 10 hours under reduced conditions at 15 Torr to give 0.50 g polymer. $^1$H-NMR measurement indicated that a PE-(PMMA)$_2$ star-shaped polymer having a composition of ethylene:MMA (wt %)=52:48 was obtained.

Example 9

(1) Synthesis of Macromonomer

[Synthesis of an Ethylene Propylene Copolymer (EPR) Whose Terminal was Converted into Al]

800 ml of purified toluene was introduced into a glass autoclave with an internal volume of 1 liter purged sufficiently with nitrogen, and the liquid phase and gaseous phase were saturated by blowing 20 liters/h ethylene and 80 liters/h propylene. Thereafter, MAO in an amount of 20 mmol in terms of Al and 0.02 mmol of dicyclopentadienyl zirconium dichloride were added at 50° C. to initiate polymerization. After polymerization at normal pressure at 50° C. for 2 hours, 50 ml of diisobutyl aluminum hydride was added thereto, and the mixture was heated at 110° C. for 5.5 hours under stirring. A toluene solution containing EPR whose terminal had been converted into Al was thus obtained.

[Synthesis of EPR Whose Terminal was Converted into OH]

While the toluene solution obtained above was kept at 100° C., a nitrogen gas was replaced by dry air, and while this temperature was kept, dry air was supplied thereto at a flow rate of 100 liters/h for 6 hours, and the reaction was terminated by adding 5 ml of methanol. The reaction solution was poured into 1 L of methanol, then 20 ml of 1 N aq. hydrochloric acid solution was added thereto, and the mixture was stirred overnight. The precipitated pale yellow powder was filtered, and the solid on a filter was suspended in 1 L hexane and filtered again, and the filtrates were combined. The filtrate was concentrated and vacuum-dried for 10 hours to give 125.4 g yellow oily polymer. A sample obtained by dissolving 100 mg of the polymer in 0.6 ml of heavy chloroform at 25° C. was analyzed with $^1$H-NMR (JEOL GSX-270 manufactured by JEOL. Ltd.), indicating a signal at 3.3 to 3.6 ppm attributable to a methylene group adjacent to a hydroxyl group. That is, the presence of EPR having a terminal structure represented by formula (XXVI) below was confirmed. From the integrated value, the content of OH groups was calculated to be 2.9 mol-%.

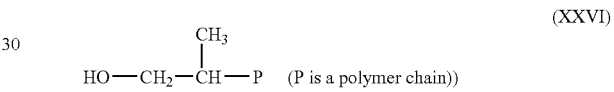

[Synthesis of EPR Macromonomer]

120 g of the ERP whose terminal had been converted into OH obtained above was introduced into a 500-ml reactor purged sufficiently with nitrogen, and 250 ml of dry toluene, 13.4 ml of triethylamine and 18.8 ml of methacrylic acid chloride were added thereto, and the mixture was stirred at room temperature for 6 hours. The resulting reaction solution was filtered, and the filtrate was concentrated to give 130.2 g yellow oily polymer. The whole of this polymer was dissolved in 50 ml of hexane and purified by column chromatography to give 50.6 g pale yellow oily polymer. When the molecular weight (in terms of EPR) of the polymer was determined by GPC, the Mw was 940 and the Mw/Mn ratio was 2.3.

A sample obtained by dissolving 100 mg of the polymer in 0.6 ml of heavy chloroform at 25° C. was analyzed with $^1$H-NMR (JEOL GSX-270 manufactured by JEOL. Ltd.), indicating the following signals in addition to signals based on EPR: δ1.95 ppm (s, 3H; =C—C$\underline{H}_3$), δ3.8-4.1 ppm (m, 2H; —COO—C$\underline{H}_2$—), δ5.55 ppm (s, 1H; CH$_2$=) and δ6.1 ppm (s, 1H; C$\underline{H}_2$=). That is, the presence of EPR macromonomer having a terminal structure represented by formula (XXVII) below was confirmed. From the integrated value, the content of methacryloyl groups was calculated to be 3.1 mol-%.

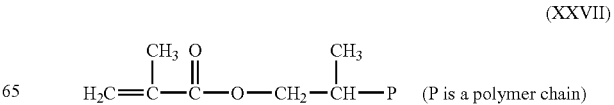

(2) Synthesis of a Star-Shaped Polymer Having One PE Arm and Two PMMA-g-EPR Arms 0.63 g of the PE having two 2-bromoisobutyryl groups at the terminal thereof synthesized in Example 8(3) was introduced into a 30-ml Shrenk flask degassed and purged with nitrogen, and then 4.88 g of the EPR macromonomer synthesized in (1) above, 14.1 ml of o-xylene, 4.28 ml of MMA, and 1.18 ml of solution prepared by dissolving copper bromide and PMDETA in o-xylene (0.17 mmol/ml in terms of Cu atom, 0.34 mmol/ml in terms of PMDETA molecule) were added thereto and stirred for 6 hours under heating at 90° C. The resulting reaction solution was poured into 500 ml of methanol and stirred overnight. The precipitated polymer was separated by filtration with a glass filter, then washed 5 times with 10 ml of hexane and vacuum-dried for 10 hours to give 3.1 g polymer. In $^1$H-NMR measurement, the MMA content was 54 wt %, and signals attributable to PE and EPR were detected in addition to a signal of MMA. In this manner, a star-shaped polymer of PE-(PMMA-g-EPR)$_2$ having a PE chain and two PMMA-g-EPR chains bound thereto was synthesized.

Example 10

(1) Synthesis of Polyolefin Whose Terminal was Converted into OH

[Synthesis of an Ethylene-Propylene Copolymer (EPR) Whose Terminal was Converted into Al]

800 ml of purified toluene was introduced into a glass autoclave with an internal volume of 1 liter purged sufficiently with nitrogen, and the liquid phase and gaseous phase were saturated by blowing 10 liters/h ethylene and 90 liters/h propylene. Thereafter, MAO in an amount of 10 mmol in terms of Al and 0.01 mmol of dicyclopentadienyl zirconium dichloride were added at 50° C. to initiate polymerization. After polymerization at normal pressure at 50° C. for 5 hours, 50 ml of diisobutyl aluminum hydride was added thereto, and the mixture was heated at 110° C. for 6 hours under stirring. A toluene solution containing EPR whose terminal had been converted into Al was thus obtained.

[Synthesis of EPR Whose Terminal was Converted into OH]

While the toluene solution obtained above was kept at 100° C., a nitrogen gas was replaced by dry air, and while this temperature was kept, dry air was supplied thereto at a flow rate of 100 liters/h for 6 hours, and the reaction was terminated by adding 5 ml of methanol. The reaction solution was poured into 1 L methanol, then 20 ml of 1 N aq. hydrochloric acid solution was added thereto, and the mixture was stirred overnight. 1 L of hexane and 1 L of water were added thereto, and the mixture was stirred and transferred to a separatory funnel, and the organic layer was washed 3 times with 200 ml of water and dried with magnesium sulfate anhydride. The magnesium sulfate was separated by filtration on a glass filter (G3), and then the filtrate was concentrated and vacuum-dried for 10 hours to give 47.0 g yellow oily polymer. When the molecular weight (in terms of EPR) of the polymer was determined by GPC, the Mw was 2200, the Mn was 520, and the Mw/Mn ratio was 4.3.

A sample obtained by dissolving 100 mg of the polymer in 0.6 ml of heavy chloroform at 25° C. was analyzed with $^1$H-NMR (JEOL GSX-270 manufactured by JEOL Ltd.), indicating a signal at 3.3 to 3.6 ppm attributable to a methylene group adjacent to a hydroxyl group. That is, the presence of EPR having a terminal structure represented by formula (XXVIII) below was confirmed. From the integrated value, the content of OH groups was calculated to be 2.4 mol-%.

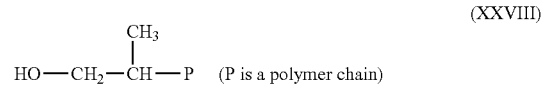

(XXVIII)

(2) Synthesis of Star-Shaped Polymer 3.0 g of the EPR whose terminal was converted into OH obtained in (1) above was introduced into a 50-ml Shrenk tube sufficiently purged with nitrogen, and 20 ml of dry toluene and 0.05 ml of silicon tetrachloride were added thereto, and the mixture was stirred at 50° C. for 2 hours. The toluene and unreacted silicon tetrachloride were distilled away from the resulting reaction solution which was then vacuum-dried for 10 hours to give 2.9 g brown oily polymer. When the molecular weight (in terms of EPR) of this polymer was determined by GPC, the Mw was 3700, the Mn was 560, and the Mw/Mn ratio was 6.5.

A sample obtained by dissolving 100 mg of the polymer in 0.6 ml of heavy chloroform at 25° C. was analyzed with $^1$H-NMR (JEOL GSX-270 manufactured by JEOL Ltd.), indicating a signal at 3.6 to 3.9 ppm attributable to a methylene group adjacent to an Si—O group, and also that there disappeared a signal attributable to a methylene group adjacent to a hydroxyl group of the starting material EPR whose terminal was converted into OH. By IR analysis, a peak attributable to an OH group near 3350 cm$^{-1}$ disappeared, a vibrated peak attributable to an Si—O bond was detected in the vicinity of 1100 cm$^{-1}$. Further, the [η] value of the polymer was 0.08 which was higher than 0.05 i.e. the value of the starting EPR whose terminal was converted into OH. That is, the presence of a star-shaped polymer having the structure of formula (XXIX) below was confirmed.

(XXIX)

(P is a polymer chain)

Example 11

(1) Synthesis of Polyolefin Whose Terminal was Converted into OH

[Synthesis of an Ethylene-propylene Copolymer (EPR) Whose Terminal was Converted into Al]

400 ml of purified toluene was introduced into a glass autoclave with an internal volume of 500 ml purged sufficiently with nitrogen, and the liquid phase and gaseous phase were saturated by blowing 20 liters/h ethylene and 80 liters/h propylene. Thereafter, MAO in an amount of 10 mmol in terms of Al and 0.01 mmol of bis(n-butylcyclopentadienyl) zirconium dichloride were added at 50° C. to initiate polymerization. After polymerization at normal pressure at 50° C. for 120 minutes, 50 ml of diisobutyl aluminum hydride was added thereto, and the mixture was heated at 100° C. for 4.5 hours under stirring. A toluene solution containing EPR whose terminal had been converted into Al was thus obtained.

[Synthesis of EPR Whose Terminal was Converted into OH]

While the toluene solution obtained above was kept at 100° C., a nitrogen gas was replaced by dry air, and while this temperature was kept, dry air was supplied thereto at a flow rate of 100 liters/h for 14 hours, and the reaction was terminated by adding 200 ml of methanol. The precipitated yellow solid were filtered with a glass filter (G3) and then washed 3 times with 500 ml of hexane to extract the EPR. The resulting hexane solution was concentrated and vacuum-dried for 10 hours to give 53.1 g pale yellow oily polymer. When the molecular weight (in terms of EPR) of this polymer was determined by GPC, the Mw was 3700, the Mn was 1100, and the Mw/Mn ratio was 3.4.

A sample obtained by dissolving 100 mg of the polymer in 0.6 ml of heavy chloroform at 25° C. was analyzed with $^1$H-NMR (JEOL GSX-270 manufactured by JEOL. Ltd.), indicating a signal at 3.3 to 3.6 ppm attributable to a methylene group adjacent to a hydroxyl group. That is, the presence of EPR having a terminal structure represented by formula (XXX) below was confirmed. From the integrated value, the content of OH groups was calculated to be 1.3 mol-%.

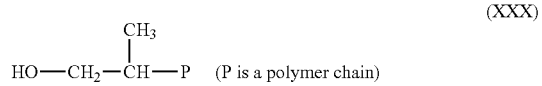
(XXX)

(2) Synthesis of Star-Shaped Polymer 5.0 g of the EPR whose terminal was converted into OH obtained in (1) above was introduced into a 100-ml Shrenk tube sufficiently purged with nitrogen, and 10 ml of dry toluene and 1.2 ml of solution of 1,2-bis(trichlorosilyl)ethane (0.20 M) in toluene were added thereto, and the mixture was stirred at 100° C. for 5 hours. The toluene was distilled away from the resulting reaction solution which was then vacuum-dried for 10 hours to give a highly viscous pale yellow oily polymer. When the molecular weight (in terms of EPR) of this polymer was determined by GPC, the Mw was 5100, the Mn was 1300, and the Mw/Mn ratio was 4.0.

A sample obtained by dissolving 100 mg of the polymer in 0.6 ml of heavy chloroform at 25° C. was analyzed with $^1$H-NMR (JEOL GSX-270 manufactured by JEOL. Ltd.), indicating a signal at 3.6 to 3.9 ppm attributable to a methylene group adjacent to an Si—O group. IR analysis of the polymer indicated that from a change in the absorption intensity of a peak attributable to an OH group near 3350 cm$^{-1}$ in the polymer and the starting EPR whose terminal was converted into OH, the amount of the reacted OH group was 0.23 mmol/g polymer, and a vibrated peak attributable to an Si—O bond was detected in the vicinity of 1100 cm$^{-1}$. By elemental analysis, it was found that the content of Si atom in the polymer was 0.082 mmol/g polymer. From these results, it was revealed that the formed polymer had about 5.6 EPR arms. Further, the [η] value of the polymer was 0.15 which was higher than 0.11 i.e. the value of the starting EPR whose terminal was converted into OH. That is, the presence of a star-shaped polymer having the structure of formula (XXXI) below was confirmed.

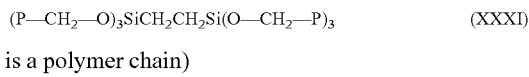 (XXXI)

(P is a polymer chain)

Example 12

(1) Synthesis of Polyolefin Whose Terminal was Converted into OH

[Synthesis of an Ethylene-propylene Copolymer (EPR) Whose Terminal was Converted into Al]

750 ml of purified toluene was introduced into a glass autoclave with an internal volume of 1 L purged sufficiently with nitrogen, and the liquid phase and gaseous phase were saturated by blowing 50 liters/h ethylene and 50 liters/h propylene. Thereafter, MAO in an amount of 5 mmol in terms of Al and 0.02 mmol of dicyclopentadienyl zirconium dichloride were added at 50° C. to initiate polymerization. After polymerization at normal pressure at 50° C. for 1 hour, 50 ml of diisobutyl aluminum hydride was added thereto, and the mixture was heated at 110° C. for 4 hours under stirring. A toluene solution containing EPR whose terminal had been converted into Al was thus obtained.

[Synthesis of EPR Whose Terminal was Converted into OH]

While the toluene solution obtained above was kept at 100° C., a nitrogen gas was replaced by dry air, and while this temperature was kept, dry air was supplied thereto at a flow rate of 100 liters/h for 7 hours, and the reaction was terminated by adding 5 ml of methanol. The reaction solution was poured into a mixed solvent of methanol (1 L)/hexane (1 L), and 1 L of distilled water was further added, and the mixture was stirred overnight. The mixture was transferred to a separatory funnel, and the organic layer was washed 3 times with 200 ml of water, and the organic layer was concentrated and vacuum-dried for 10 hours to give 88.6 g yellow oily polymer. When the (PS-equivalent) molecular weight of this polymer was determined by GPC, the Mw was 5950, the Mn was 2785, and the Mw/Mn ratio was 2.1. A sample obtained by dissolving 100 mg of the polymer in 0.6 ml of heavy chloroform at 25° C. was analyzed with $^1$H-NMR (JEOL GSX-270 manufactured by JEOL. Ltd.), indicating a signal at 3.3 to 3.6 ppm attributable to a methylene group adjacent to a hydroxyl group. That is, the presence of EPR having a terminal structure represented by formula (XXXII) below was confirmed. From the integrated value, the content of OH groups was calculated to be 1.5 mol-%.

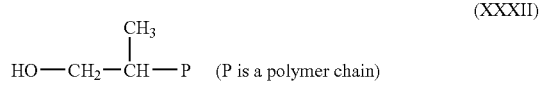
(XXXII)

(2) Synthesis of Star-Shaped Polymer 42 g of the EPR whose terminal was converted into OH obtained in (1) above was introduced into a 200-ml two-necked Shrenk flask sufficiently purged with nitrogen, and 50 ml of dry toluene, 2.6 ml of triethylamine and 0.54 ml of silicon tetrachloride were added thereto, and the mixture was stirred at 50° C. for 3 hours. The resulting solution was diluted with 100 ml of hexane and then filtered, and the filtrate was concentrated and vacuum-dried for 10 hours to give 37.3 g brown oily polymer. When the (PS-equivalent) molecular weight of this polymer was determined by GPC, the Mw was 8930, the Mn was 3770, and the Mw/Mn ratio was 1.8.

A sample obtained by dissolving 100 mg of the polymer in 0.6 ml of heavy chloroform at 25° C. was analyzed with ¹H-NMR (JEOL GSX-270 manufactured by JEOL. Ltd.), indicating a signal at 3.6 to 3.9 ppm attributable to a methylene group adjacent to an Si—O group in addition to a signal attributable to a methylene group adjacent to the hydroxyl group of the starting EPR whose terminal had been converted into OH. From the intensity ratio of the two signals, the degree of conversion of OH group was calculated to be 84%. As a result of IR analysis of this polymer, a reduction in the intensity of the peak attributable to the OH group in the vicinity of 3350 cm⁻¹ was confirmed. From the intensity ratio of the starting material to the polymer, the degree of conversion of OH group was calculated to be 86%. In addition, a vibrated peak attributable to an Si—O bond was detected in the vicinity of 1100 cm⁻¹. From these results, it was estimated that the number of arms was 3.4 in average. Further, the [η] value of the polymer was 0.13 which was higher than 0.10 i.e. the value of the starting EPR whose terminal was converted into OH. That is, the presence of a star-shaped polymer having the structure of formula (XXXIII) below was confirmed.

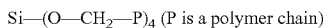
Si—(O—CH₂—P)₄ (P is a polymer chain)　　　(XXXIII)

Example 13

(1) Synthesis of Polyolefin Whose Terminal was Converted into OH

[Synthesis of an Ethylene-propylene Copolymer (EPR) Whose Terminal was Converted into Al]

750 ml of purified toluene was introduced into a glass autoclave with an internal volume of 1 L purged sufficiently with nitrogen, and the liquid phase and gaseous phase were saturated by blowing 70 liters/h ethylene and 30 liters/h propylene. Thereafter, MAO in an amount of 5 mmol in terms of Al and 0.02 mmol of dicyclopentadienyl zirconium dichloride were added at 50° C. to initiate polymerization. After polymerization at normal pressure at 50° C. for 1 hour, 50 ml of diisobutyl aluminum hydride was added thereto, and the mixture was heated at 110° C. for 4 hours under stirring. A toluene solution containing EPR whose terminal had been converted into Al was thus obtained.

[Synthesis of EPR Whose Terminal was Converted into OH]

While the toluene solution obtained above was kept at 100° C., a nitrogen gas was replaced by dry air, and while this temperature was kept, dry air was supplied thereto at a flow rate of 100 liters/h for 7 hours, and the reaction was terminated by adding 5 ml methanol. The reaction solution was poured into a mixed solvent of methanol (1 L)/hexane (1 L), and 1 L of distilled water was further added, and the mixture was stirred overnight. The mixture was transferred to a separatory funnel, and the organic layer was washed 3 times with 200 ml of water, and the organic layer was concentrated and vacuum-dried for 10 hours to give 100 g yellow oily polymer. When the (PS-equivalent) molecular weight of this polymer was determined by GPC, the Mw was 9260, the Mn was 4400, and the Mw/Mn ratio was 2.1.

A sample obtained by dissolving 100 mg of the polymer in 0.6 ml of heavy chloroform at 25° C. was analyzed with ¹H-NMR (JEOL GSX-270 manufactured by JEOL. Ltd.), indicating a signal at 3.3 to 3.6 ppm attributable to a methylene group adjacent to a hydroxyl group. That is, the presence of EPR having a terminal structure represented by formula (XXXIV) below was confirmed. From the integrated value, the content of OH groups was calculated to be 0.80 mol-%.

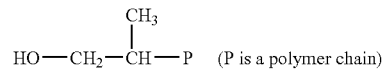

(XXXIV)
HO—CH₂—CH(CH₃)—P　　(P is a polymer chain)

(2) Synthesis of Star-Shaped Polymer 51 g of the EPR whose terminal was converted into OH obtained in (1) above was introduced into a 200-ml two-necked flask sufficiently purged with nitrogen, and 90 ml of dry toluene, 1.8 ml of triethylamine and 0.37 ml of silicon tetrachloride were added thereto, and the mixture was stirred at 50° C. for 3 hours. The resulting reaction solution was diluted with 100 ml of hexane and then filtered, and the filtrate was concentrated and vacuum-dried for 10 hours to give 43 g brown oily polymer. When the (PS-equivalent) molecular weight of this polymer was determined by GPC, the Mw was 15040, the Mn was 6150, and the Mw/Mn ratio was 2.5.

A sample obtained by dissolving 100 mg of the polymer in 0.6 ml of heavy chloroform at 25° C. was analyzed with ¹H-NMR (JEOL GSX-270 manufactured by JEOL. Ltd.), indicating a signal at 3.6 to 3.9 ppm attributable to a methylene group adjacent to an Si—O group in addition to a signal attributable to a methylene group adjacent to the hydroxyl group of the starting EPR whose terminal had been converted into OH. From the intensity ratio of the two signals, the degree of conversion of OH group was calculated to be 82%. As a result of IR analysis of this polymer, a reduction in the intensity of the peak attributable to the OH group in the vicinity of 3350 cm⁻¹ was confirmed. From the intensity ratio of the starting material to the polymer, the degree of conversion of OH group was calculated to be 81%. In addition, a vibrated peak attributable to an Si—O bond was detected in the vicinity of 1100 cm⁻¹. From these results, it was estimated that the number of arms was 3.3 in average. Further, the [η] value of the polymer was 0.18 which was higher than 0.15 i.e. the value of the starting EPR whose terminal was converted into OH. That is, the presence of a star-shaped polymer having the structure of formula (XXXV) below was confirmed.

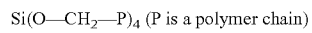
Si(O—CH₂—P)₄ (P is a polymer chain)　　　(XXXV)

Example 14

(1) Conversion of a Multifunctional Low-Molecular Compound into a Radical Polymerization Initiator 1.0 g of pentaerythritol was introduced into a 50-ml Shrenk tube sufficiently purged with nitrogen, and 10 ml of dry THF, 8.2 ml of triethylamine and 7.26 ml of 2-bromoisobutyric acid bromide were added thereto, and the mixture was stirred at room temperature for 24 hours. The resulting dark brown slurry was washed 7 times with 100 ml of 0.5 N aq. hydrochloric acid solution and 3 times with 100 ml of water. The organic layer was dried with magnesium sulfate anhydride, and the magnesium sulfate was filtered off with a glass filter (G3), and the filtrate was concentrated to give 9.7 g dark brown solid. This product was dissolved in 10 ml of benzene and purified by column chromatography to give 6 g brown solid. The resulting solid was recrystallized from hexane to give 3.7 g white bar-shaped crystal. When a sample obtained by dissolving 50 mg of the crystal in 0.6 ml of heavy chloroform at 25° C. was analyzed with ¹H-NMR (JEOL GSX-270 manufactured by JEOL. Ltd.), a signal of a methylene group adjacent to an ester group was detected at δ4.3 ppm, and a signal attributable to two methyl groups was detected at δ1.9 ppm. That is, it was confirmed that a compound having the structure represented by formula (XXXVI) below was obtained.

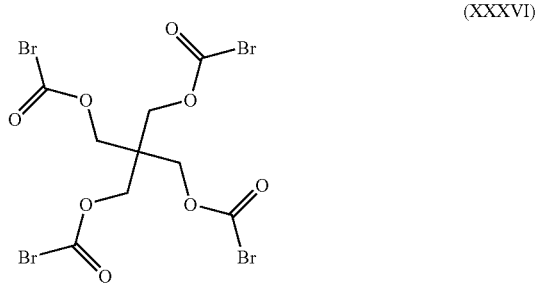

(XXXVI)

(2) Synthesis of Four-Arm-Type Star-Shaped Polymer

A 50-ml Schlenk tube sufficiently purged with nitrogen was charged with 0.81 g of the EPR macromonomer synthesized in Example 1(1), and then with 4.03 ml of o-xylene, 4.28 ml of MMA, 1.19 ml of solution of copper bromide and PMDETA in o-xylene (0.084 mmol/ml in terms of Cu atom, 0.168 mmol/ml in terms of PMDETA molecule), and 0.5 ml of o-xylene solution of the polymerization initiator (0.05 mmol/ml initiator) obtained in (1) above, and the mixture was stirred under heating at 90° C. for 8 hours. The resulting reaction solution was poured into 400 ml of methanol to precipitate a polymer. The precipitated polymer was filtered with a glass filter (G3), and the polymer on the filter was washed 3 times with 10 ml of hexane and 3 times with 10 ml of methanol, and then vacuum-dried for 10 hours to give 1.62 g solid polymer. The (PS-equivalent) molecular weight of the polymer was measured by GPC, indicating that the Mw was 117000, the Mn was 48000, and the Mw/Mn ratio was 2.4. The content of each unit in the formed polymer, as determined by NMR, was 90 mol % MMA and 10 mol % EPR. That is, a star-shaped polymer whose arm was a graft polymer having EPR in a side chain was formed by copolymerizing the EPR macromonomer with MMA by using the above initiator.

Example 15

Synthesis of a Four-Arm-Type (PMMA-g-EPR) Star-Shaped Polymer

A 100-ml Schlenk tube sufficiently purged with nitrogen was charged with 2.4 g of the EPR macromonomer synthesized in Example 9(1), and then with 34.7 ml of o-xylene, 2.14 ml of MMA, 1.19 ml of solution of copper bromide and PMDETA in o-xylene (0.34 mmol/ml in terms of Cu atom, 0.67 mmol/ml in terms of PMDETA molecule), and 2.0 ml of o-xylene solution of the polymerization initiator (0.05 mmol/ml initiator) obtained in Example 14(1) above, and the mixture was stirred under heating at 90° C. for 6 hours. The resulting reaction solution was poured into 400 ml of methanol to precipitate a polymer. The precipitated polymer was filtered with a glass filter (G3), and the polymer on the filter was washed 3 times with 10 ml of hexane and 3 times with 10 ml of methanol, and then vacuum-dried for 10 hours to give 0.82 g solid polymer. The (PS-equivalent) molecular weight of the polymer was measured by GPC, indicating that the Mw was 27000 and the Mw/Mn ratio was 1.3. The Tg of the polymer, as determined by DSC, was 58° C. The content of each unit in the formed polymer, as determined by $^1$H-NMR, was MMA:EPR=66:34 (wt %), and it was revealed that 95% of the four polymerization initiation sites possessed by the polymerization initiator contribute to initiation of polymerization. That is, a star-shaped polymer having about 3.8 PMMA-g-EPR chains was formed by copolymerizing the EPR macromonomer with MMA by using the above initiator. By observing this graft polymer under a transmission electron microscope (TEM), it was found that EPR segments and PMMA segments were finely divided in the order of several nm or less, as shown in FIG. 4.

Example 16

Synthesis of a Four-Arm-Type (PMMA-g-EPR) Star-Shaped Polymer

A 300-ml Schlenk tube sufficiently purged with nitrogen was charged with 9.8 g of the EPR macromonomer synthesized in Example 2(1), and then with 3.5 ml of o-xylene, 0.21 ml of MMA, 1.2 ml of solution of copper bromide and PMDETA in o-xylene (0.03 mmol/ml in terms of Cu atom, 0.06 mmol/ml in terms of PMDETA molecule), and 0.2 ml of o-xylene solution of the polymerization initiator (0.05 mmol/ml initiator) obtained in Example 14(1) above, and the mixture was stirred under heating at 90° C. for 6 hours. The resulting reaction solution was poured into 400 ml of methanol to precipitate a polymer. The precipitated polymer was filtered with a glass filter (G3), and the polymer on the filter was washed 3 times with 10 ml of hexane and 3 times with 10 ml of methanol, and then vacuum-dried for 10 hours to give 0.22 g solid polymer. The content of each unit in the formed polymer, as determined by $^1$H-NMR, was MMA:EPR=95:5 (wt %).

Comparative Example 1

Comparison with a Blend 0.50 g of EPR (Mn=41,000) and 0.50 g of PMMA (Mn=28,000) were introduced into a 100-ml Shrenk tube, and 20 ml of o-xylene was added thereto, and the mixture was stirred at 130° C. for 1 hour. The reaction solution was poured into 1 L of methanol, and the precipitated polymer was filtered and vacuum-dried for 10 hours to give a white solid. By observing the resulting white solid under TEM, it was revealed that the islet phase (white region) of PMMA was separated as a macro-phase in the order of several μm in the sea phase (black region) of EPR, and the EPR component and the PMMA component were essentially incompatible with each other (FIG. 5). In the (PMMA-g-EPR) star-shaped polymer in Example 15, on the other hand, there was brought about the effect that both the components were uniformly finely dispersed as shown in FIG. 4, and the PMMA chain and EPR chain were chemically bound to each other via a linkage group.

Comparative Example 2

Comparison Between the Linear Structure and the Star-Shaped Structure

Figures 2, 3, 4, 5, 6:
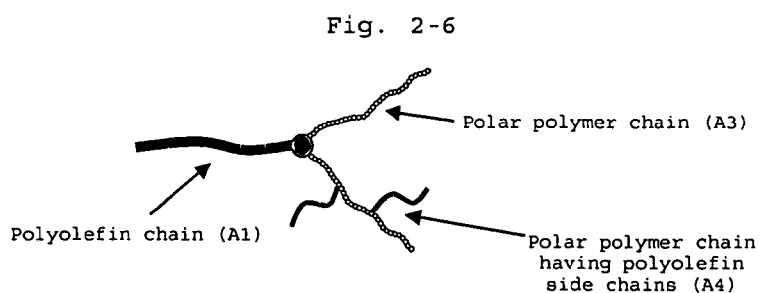

A white solid was obtained by the same procedure as in Example 15 except that (1-bromoethyl)benzene having only one polymerization initiation site was used in place of the compound having four polymerization initiation sites used as the initiator By $^1$H-NMR analysis, the composition of the resulting white solid was MMA:EPR=65:35 (wt %), which was almost the same as that of the star-shaped polymer obtained in Example 15. By observing the resulting white solid under TEM, it was revealed that the EPR phase and PMMA phase were finely dispersed, but the dispersion of both the components was inferior to that of the star-shaped polymer obtained in Example 15, and the EPR phase of several 10 nm was scattered (FIG. 6). Accordingly, it was revealed that the multi-branched polymer of the present invention whose major chain is star-shaped is excellent in the dispersibility of a plurality of polymer components.

The invention claimed is:

1. A multi-branched polymer comprising at least one block structure or graft structure represented by the following general formula (II):

(II)

wherein $P^2$ is a polar polymer chain having polyolefin side chains (A4) and said $P^2$ has a number-average molecular weight (Mn) of 500 to 1,000,000, and $P^3$ is a polymer chain having a number-average molecular weight (Mn) of 500 to 1,000,000, selected from a polyolefin chain having polar polymer side chains (A2), a polar polymer chain (A3) and a polar polymer chain having polyolefin side chains (A4); $P^2$ and $P^3$ may be the same or different from each other; $X^1$ is a linking group containing less than 200 atoms in total and containing a group selected from an ester group, an amide group and an ether group.

2. A multi-branched polymer comprising a star-shaped structure having three or more polymer chains bound to a central nucleus represented by the following general formula (IV):

(IV)

wherein n' is an integer of 3 or more; $P^6$ is a polymer chain having a number-average molecular weight (Mn) of 500 to 1,000,000, selected from a polyolefin chain (A1) obtained by homopolymerizing or copolymerizing at least one of ethylene, propylene, 1-butene, 1-hexene and 1-octene, a polar polymer chain (A3) and a polar polymer chain having polyolefin side chains (A4); a plurality of $P^6$s may be the same or different from one another provided that every $P^6$ is not the polar polymer chain (A3); and $X^3$ is a linking group of less than 200 atoms consisting of a multifunctional low-molecular compound residue derived from a multifunctional low-molecular compound (K) selected from halogenated silane, glycerin, pentaerythritol, D-glucitol, quercitol, inositol, and hexahydroxybenzene, wherein the multi-branched polymer is produced by one of the following processes:

Process S-1: a process of reacting a polymer having a functional group at the terminal thereof with the multifunctional low-molecular compound (K), with the proviso that when the multifunctional low-molecular compound (K) is a halogenated silane, then the functional group of the polymer having a functional group at the terminal thereof is a hydroxyl containing group in Process S-1; and Process S-2: a process of polymerizing an addition-polymerizable monomer (D), a ring-opening polymerizable monomer (E) and one or more monomers selected from the polyolefin macromonomers (M1) to (M3) represented by the general formulae (V) to (VII) by using, as a polymerization initiator, a multifunctional low-molecular compound having a group having an ability to initiate radical polymerization or anion polymerization, which is obtained by converting the functional group contained in the multifunctional low-molecular compound (K) into a group having an ability to initiate radical polymerization or anion polymerization;

wherein general formulae (V)-(VII) are as follows:

(V)

(VI)

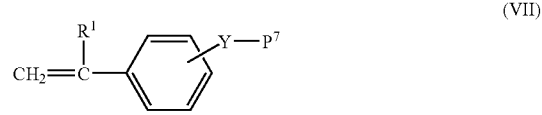

(VII)

wherein $R^1$ is a hydrogen atom or a methyl group, Y is a heteroatom or a heteroatom-containing group, and $P^7$ is a polymer chain obtained by homopolymerizing or copolymerizing an olefin represented by $CH_2{=}CHR^2$ whereupon $R^2$ is a group or an atom selected from a $C_{1\text{-}20}$ hydrocarbon group, a hydrogen atom and a halogen atom.

3. The multi-branched polymer according to any one of claims 1 and 2, wherein the polar polymer chain having polyolefin side chains (A4) is obtained by homopolymerizing a macromonomer, or copolymerizing two or more macromonomers, selected from a polyolefin macromonomer (M1) represented by the general formula (V), a polyolefin macromonomer (M2) represented by the general formula (VI) and a polyolefin macromonomer (M3) represented by the general formula (VII), or by copolymerizing at least one macromonomer selected from (M1), (M2) and (M3) with at least one monomer (B) selected from organic compounds each having at least one carbon-carbon unsaturated bond:

(V)

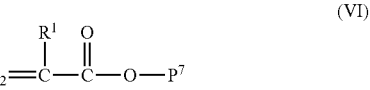

(VI)

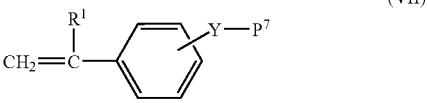

(VII)

wherein $R^1$ is a hydrogen atom or a methyl group, Y is a heteroatom or a heteroatom-containing group, and $P^7$ is a polymer chain obtained by homopolymerizing or copolymerizing an olefin represented by $CH_2{=}CHR^2$ whereupon $R^2$ is a group or an atom selected from a $C_{1\text{-}20}$ hydrocarbon group, a hydrogen atom and a halogen atom.

4. The multi-branched polymer according to claim 1, wherein the polyolefin chain having polar polymer side chains (A2) comprises a unit (C1) represented by the general formula (VIII) and a unit (C2) represented by the general formula (IX):

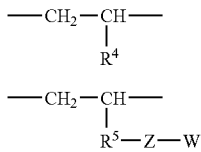 (VIII)

(IX)

—CH$_2$—CH—
　　　|
　　　R$^5$—Z—W wherein R$^4$ is a group or an atom selected from a C$_{1-20}$ hydrocarbon group, a hydrogen atom and a halogen atom, R$^5$ is a C$_{1-20}$ hydrocarbon group, Z is a heteroatom or a heteroatom-containing group, and W is a polymer chain obtained by (co)polymerizing an addition-polymerizable monomer (D), a ring-opening polymerizable monomer (E) and at least one monomer selected from polyolefin macromonomers (M1) to (M3) represented by the general formulae (V) to (VII).

5. The multi-branched polymer according to any one of claims 1 and 4, wherein the polar polymer chain (A3) is obtained by polymerizing an addition-polymerizable monomer (D) or a ring-opening polymerizable monomer (E).

6. A thermoplastic resin composition comprising the multi-branched polymer according to any one of claims 1 and 2.

7. A film, a sheet, an adhesive resin, a compatibilizing agent, a resin modifier, a resin additive, a filler dispersant or a dispersant, which comprises the multi-branched polymer according to any one of claims 1 and 2.

8. A film, a sheet, an adhesive resin, a compatibilizing agent, a resin modifier, a resin additive, a filler dispersant or a dispersant, which comprises the thermoplastic resin composition according to claim 6.

* * * * *